US005166927A

United States Patent [19]

Iida et al.

[11] Patent Number: 5,166,927

[45] Date of Patent: Nov. 24, 1992

[54] ADAPTIVE PATHFINDING NEUTRAL NETWORK FOR A PACKET COMMUNICATION SYSTEM

[75] Inventors: Ichiro Iida, Yokohama; Akira Chugo, Tokyo, both of Japan

[73] Assignee: Fujitsu Limited, Kanagawa, Japan

[21] Appl. No.: 455,323

[22] PCT Filed: Jul. 6, 1989

[86] PCT No.: PCT/JP89/00684

§ 371 Date: Mar. 6, 1990

§ 102(e) Date: Mar. 6, 1990

[87] PCT Pub. No.: WO90/00842

PCT Pub. Date: Jan. 25, 1990

[30] Foreign Application Priority Data

| | | | |
|---|---|---|---|
| Jul. 7, 1988 | [JP] | Japan | 63-170099 |
| Mar. 20, 1989 | [JP] | Japan | 1-065903 |
| Mar. 20, 1989 | [JP] | Japan | 1-065904 |
| Mar. 20, 1989 | [JP] | Japan | 1-065905 |

[51] Int. Cl.[5] .......... H04Q 11/04

[52] U.S. Cl. .......... 370/60; 370/94.1; 370/94.3; 370/54; 395/21

[58] Field of Search .......... 370/94.1, 95.3, 16, 370/60, 94.3, 54, 79; 395/22, 21

[56] References Cited

U.S. PATENT DOCUMENTS

| | | | |
|---|---|---|---|
| 4,656,622 | 4/1987 | Lea | 370/16 |
| 4,660,166 | 4/1987 | Hopfield | 364/801 |
| 4,825,206 | 4/1989 | Brice, Jr. et al. | 370/16 |
| 4,920,531 | 4/1990 | Isono et al. | 370/94.1 |
| 4,939,718 | 7/1990 | Servel et al. | 370/94.1 |
| 4,974,224 | 11/1990 | Boone | 370/16 |
| 4,991,204 | 2/1991 | Yamamoto et al. | 370/16 |
| 4,999,833 | 3/1991 | Lez | 370/60 |

OTHER PUBLICATIONS

J. J. Hopfield et al., "Neural computation of decisions in optimization problems", Biological Cybernetics, vol. 52, 1985, pp. 141-152, Springer-Verlag.

R. Hecht-Nielsen, "Neurocomputing: picking the human brain", IEEE Spectrum, vol. 25, No. 3, Mar. 1988, pp. 36-41, IEEE, New York, N.Y.

M. S. Chrystall et al., "Adaptive routing in computer communication networks using learning automata", National Telecommunications Conference, New Oreleans, La., Nov. 29-Dec. 3, 1986, vol. 1, pp. A3.2-.1-A3.2.7, IEEE, New York, N.Y.

Morishima et al., 'Automatic Rule Extraction from Statistical Data and Fuzzy Tree Search', Systems and Computers in Japan, vol. 19, No. 5, pp. 26-36 (1988).

Carpenter et al., 'The Art of Adaptive Pattern Recognition by a Self-Organizing Neural Network', IEEE--Computer, Mar. 1988, pp. 77-88.

Pourboghrat, 'Neural Network for Learning Inverse-Kinematics of Redundant Manipulators', E. I. Monthly No. EIM9102-008577 (1989).

*Primary Examiner*—Douglas W. Olms
*Assistant Examiner*—Shick Hom
*Attorney, Agent, or Firm*—Staas & Halsey

[57] ABSTRACT

An adaptive routing system is used in a network for performing a communication in a packet form obtained by adding address data and data length to the transmission information. This connects nodes having input ports and output ports arranged in a distributed manner, by the input link and output link. This system enables the network to assign the neuron elements to input ports and output ports of respective nodes one by one, inputs a network state to the neuron element to evaluate the traffic condition of the network and determines the output port assigned to the neuron element having the "1" output from among the neuron elements assigned to the output ports of the respective nodes when the outputs of respective neuron elements are not changed after reaching the balanced state, thereby enabling the output of said output port to be produced in the optimum output direction of the packet from respective nodes.

64 Claims, 34 Drawing Sheets

EXTERNAL INPUT OF CURRENT NETWORK STATUS
26
EXTERNAL INPUT OF CURRENT NETWORK STATUS
26
EXTERNAL INPUT OF CURRENT NETWORK STATUS
26
21
22
23
24
25

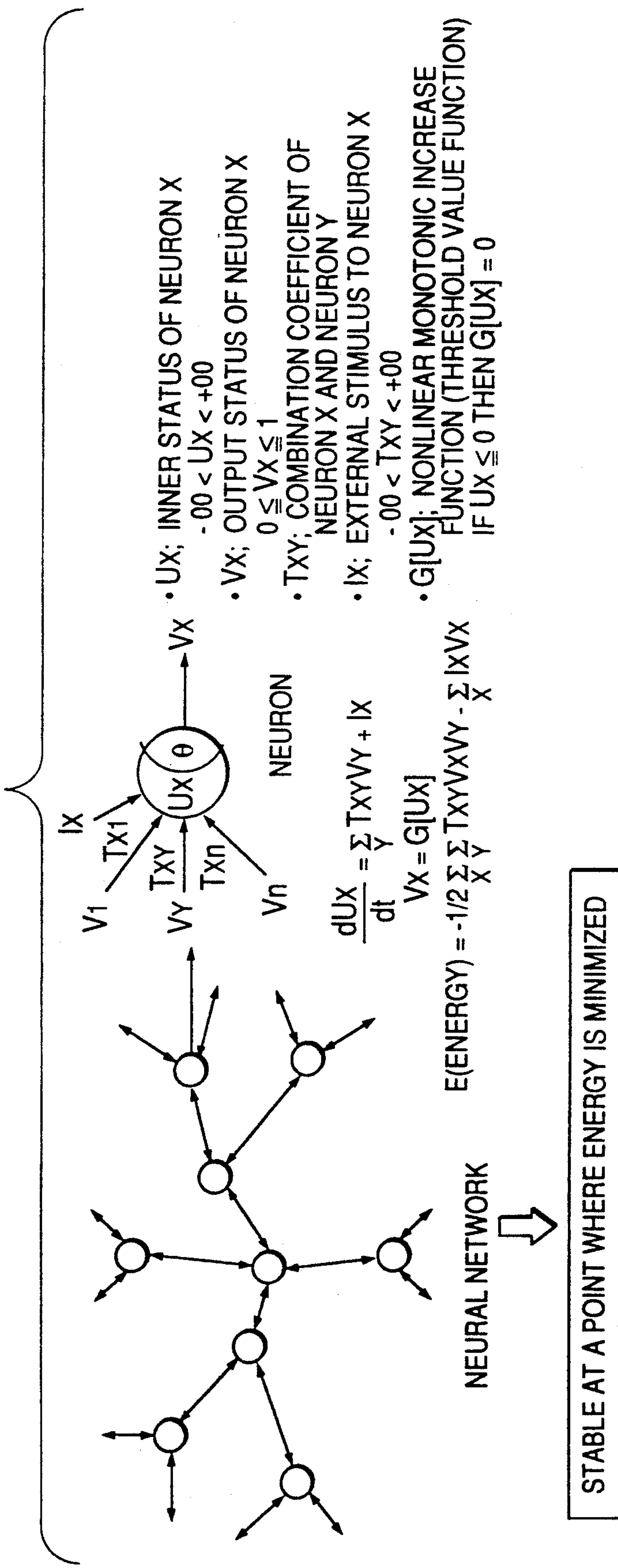
FIG. 6
NEURAL NETWORK
V1
Tx1
Ix
VY
TXY
Txn
Vn
Ux
θ
Vx
NEURON
dUx/dt = Σ TxyVy + Ix
Vx = G[Ux]
E(ENERGY) = -1/2 Σ Σ TxyVxVy - Σ IxVx
• Ux; INNER STATUS OF NEURON X
-00 < Ux < +00
• Vx; OUTPUT STATUS OF NEURON X
0 ≦ Vx ≦ 1
• TXY; COMBINATION COEFFICIENT OF NEURON X AND NEURON Y
• Ix; EXTERNAL STIMULUS TO NEURON X
-00 < TXY < +00
• G[Ux]; NONLINEAR MONOTONIC INCREASE FUNCTION (THRESHOLD VALUE FUNCTION)
IF Ux ≦ 0 THEN G[Ux] = 0
STABLE AT A POINT WHERE ENERGY IS MINIMIZED

| | ADJACENT NODE | | | |
|---|---|---|---|---|
| | X | Y | Z | |
| DESTINATION NODE A | 2 | 3 | 2 | |
| B | 2 | 3 | 2 | |
| C | 3 | 2 | 2 | |
| | | | | |

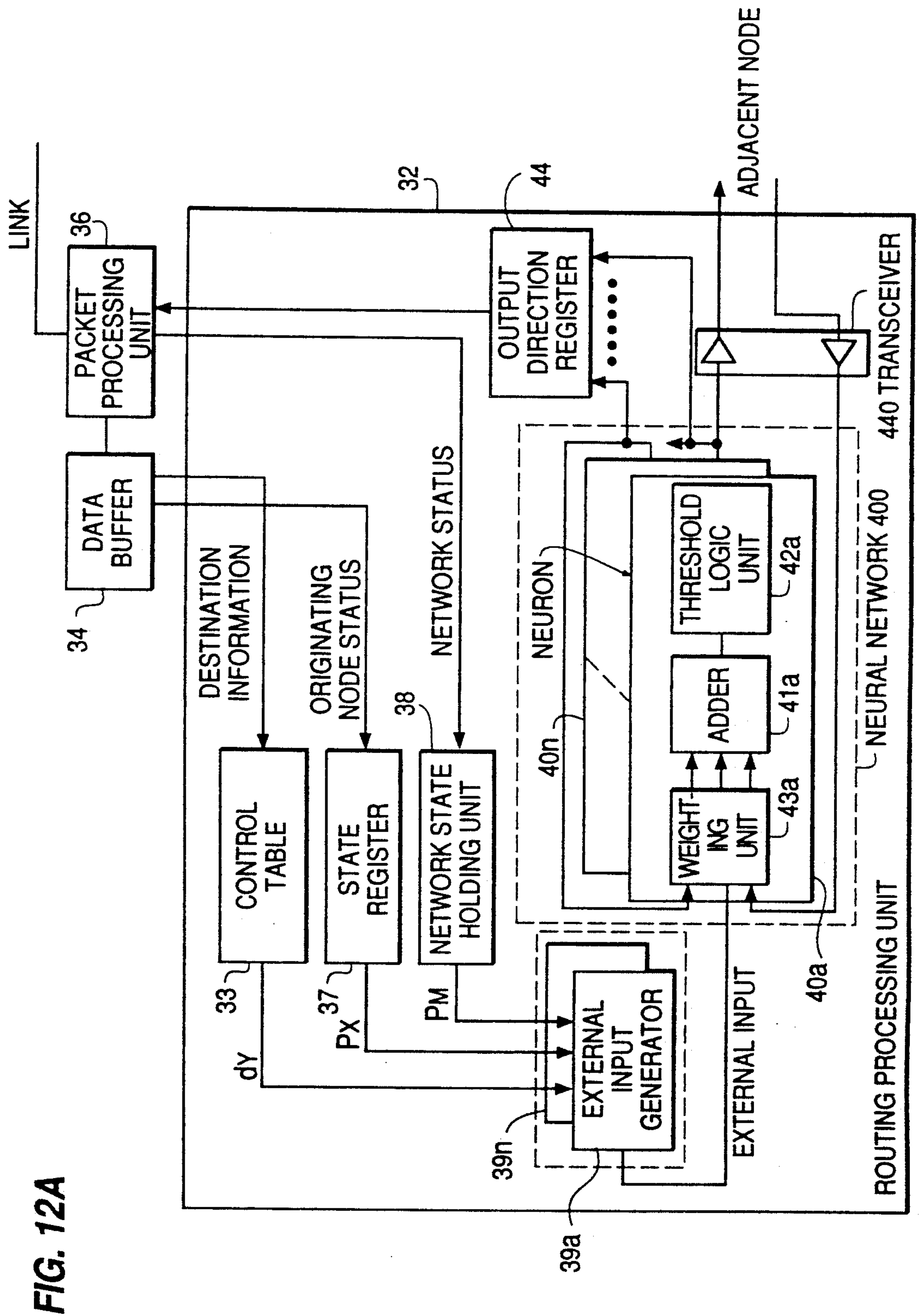
FIG. 12A
LINK
PACKET PROCESSING UNIT
36
DATA BUFFER
34
DESTINATION INFORMATION
ORIGINATING NODE STATUS
NETWORK STATUS
32
OUTPUT DIRECTION REGISTER
44
ADJACENT NODE
440 TRANSCEIVER
CONTROL TABLE
33
STATE REGISTER
37
NETWORK STATE HOLDING UNIT
38
dY
PX
PM
EXTERNAL INPUT GENERATOR
39n
39a
NEURON
40n
THRESHOLD LOGIC UNIT
42a
ADDER
41a
WEIGHT-ING UNIT
43a
NEURAL NETWORK 400
EXTERNAL INPUT
40a
ROUTING PROCESSING UNIT

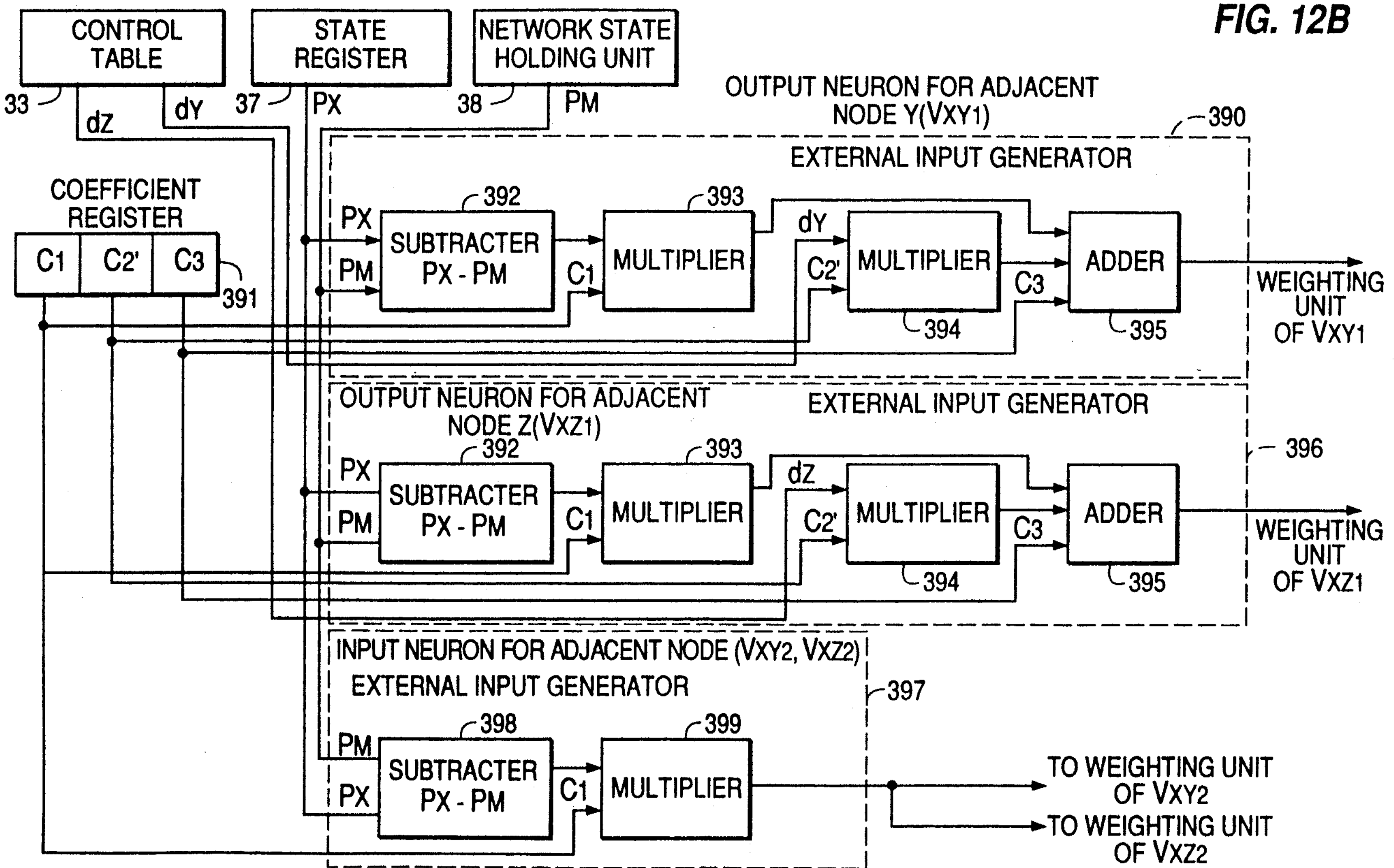
FIG. 12B
CONTROL TABLE
33
dZ
dY
STATE REGISTER
37
PX
NETWORK STATE HOLDING UNIT
38
PM
COEFFICIENT REGISTER
C1
C2'
C3
391
OUTPUT NEURON FOR ADJACENT NODE Y(VXY1)
390
EXTERNAL INPUT GENERATOR
PX
PM
SUBTRACTER PX - PM
392
C1
MULTIPLIER
393
dY
C2'
MULTIPLIER
394
C3
ADDER
395
WEIGHTING UNIT OF VXY1
OUTPUT NEURON FOR ADJACENT NODE Z(VXZ1)
EXTERNAL INPUT GENERATOR
396
PX
PM
SUBTRACTER PX - PM
392
C1
MULTIPLIER
393
dZ
C2'
MULTIPLIER
394
C3
ADDER
395
WEIGHTING UNIT OF VXZ1
INPUT NEURON FOR ADJACENT NODE (VXY2, VXZ2)
EXTERNAL INPUT GENERATOR
397
PM
PX
SUBTRACTER PX - PM
398
C1
MULTIPLIER
399
TO WEIGHTING UNIT OF VXY2
TO WEIGHTING UNIT OF VXZ2

| ADJACENT NODE | X | Y | Z |
|---|---|---|---|
| NEURON OUTPUT | 0 | 0 | 1 |

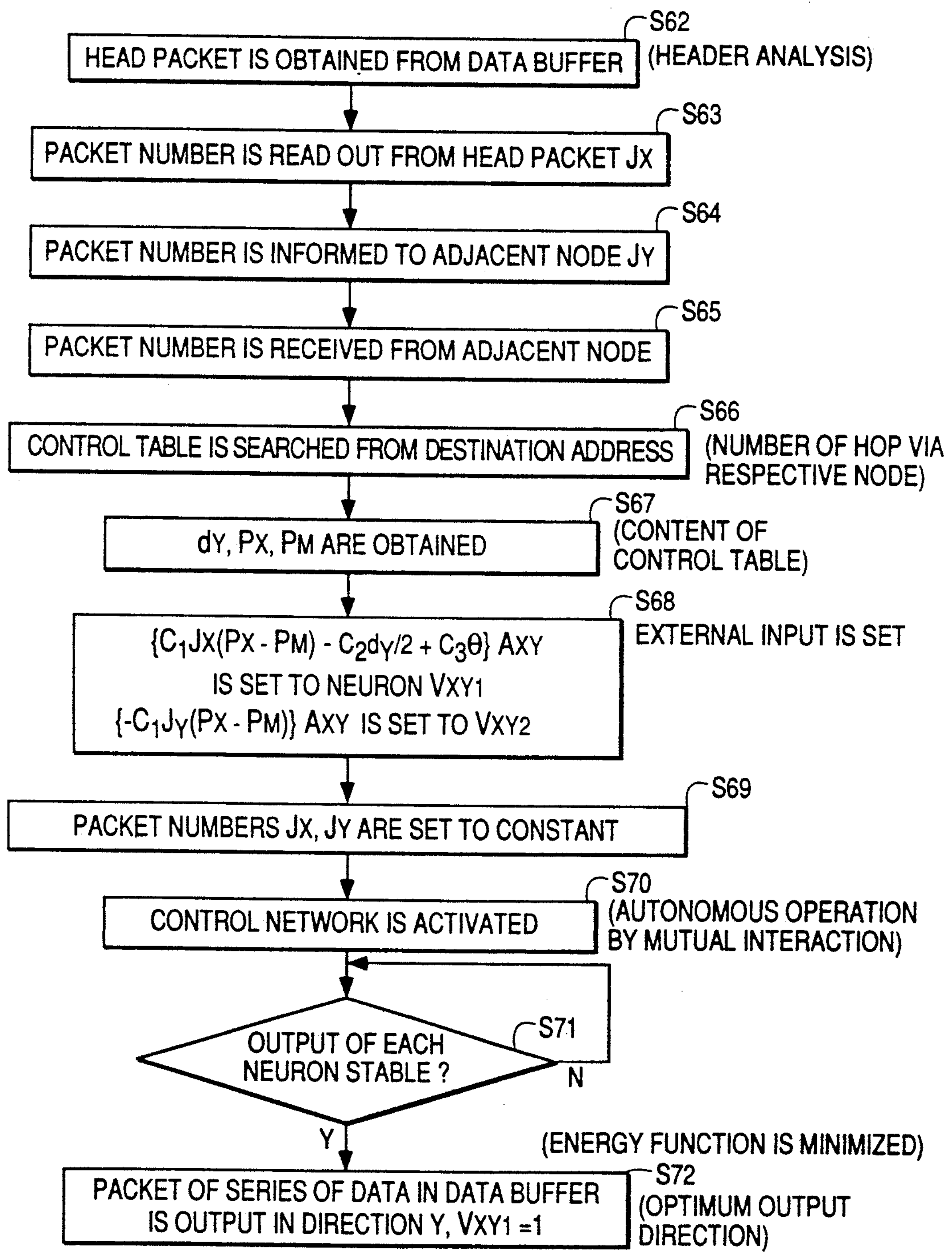
FIG. 18
S62
HEAD PACKET IS OBTAINED FROM DATA BUFFER
(HEADER ANALYSIS)
S63
PACKET NUMBER IS READ OUT FROM HEAD PACKET JX
S64
PACKET NUMBER IS INFORMED TO ADJACENT NODE JY
S65
PACKET NUMBER IS RECEIVED FROM ADJACENT NODE
S66
CONTROL TABLE IS SEARCHED FROM DESTINATION ADDRESS
(NUMBER OF HOP VIA RESPECTIVE NODE)
S67
dY, PX, PM ARE OBTAINED
(CONTENT OF CONTROL TABLE)
S68
{C1JX(PX - PM) - C2dY/2 + C3θ} AXY IS SET TO NEURON VXY1
{-C1JY(PX - PM)} AXY IS SET TO VXY2
EXTERNAL INPUT IS SET
S69
PACKET NUMBERS JX, JY ARE SET TO CONSTANT
S70
CONTROL NETWORK IS ACTIVATED
(AUTONOMOUS OPERATION BY MUTUAL INTERACTION)
S71
OUTPUT OF EACH NEURON STABLE ?
N
Y
(ENERGY FUNCTION IS MINIMIZED)
S72
PACKET OF SERIES OF DATA IN DATA BUFFER IS OUTPUT IN DIRECTION Y, VXY1 =1
(OPTIMUM OUTPUT DIRECTION)

25 CONTROL NETWORK
22 THRESHOLD VALUE ELEMENT
FAULT DETECTING MEANS
73
EXTERNAL INPUT OF CURRENT NETWORK STATUS
26
21 NODE
21
22
23
24
25
23 OUTPUT LINK
24 INPUT LINK
FAULT DETECTING MEANS
73
EXTERNAL INPUT OF CURRENT NETWORK STATUS
26
FAULT DETECTING MEANS
73
EXTERNAL INPUT OF CURRENT NETWORK STATUS
26

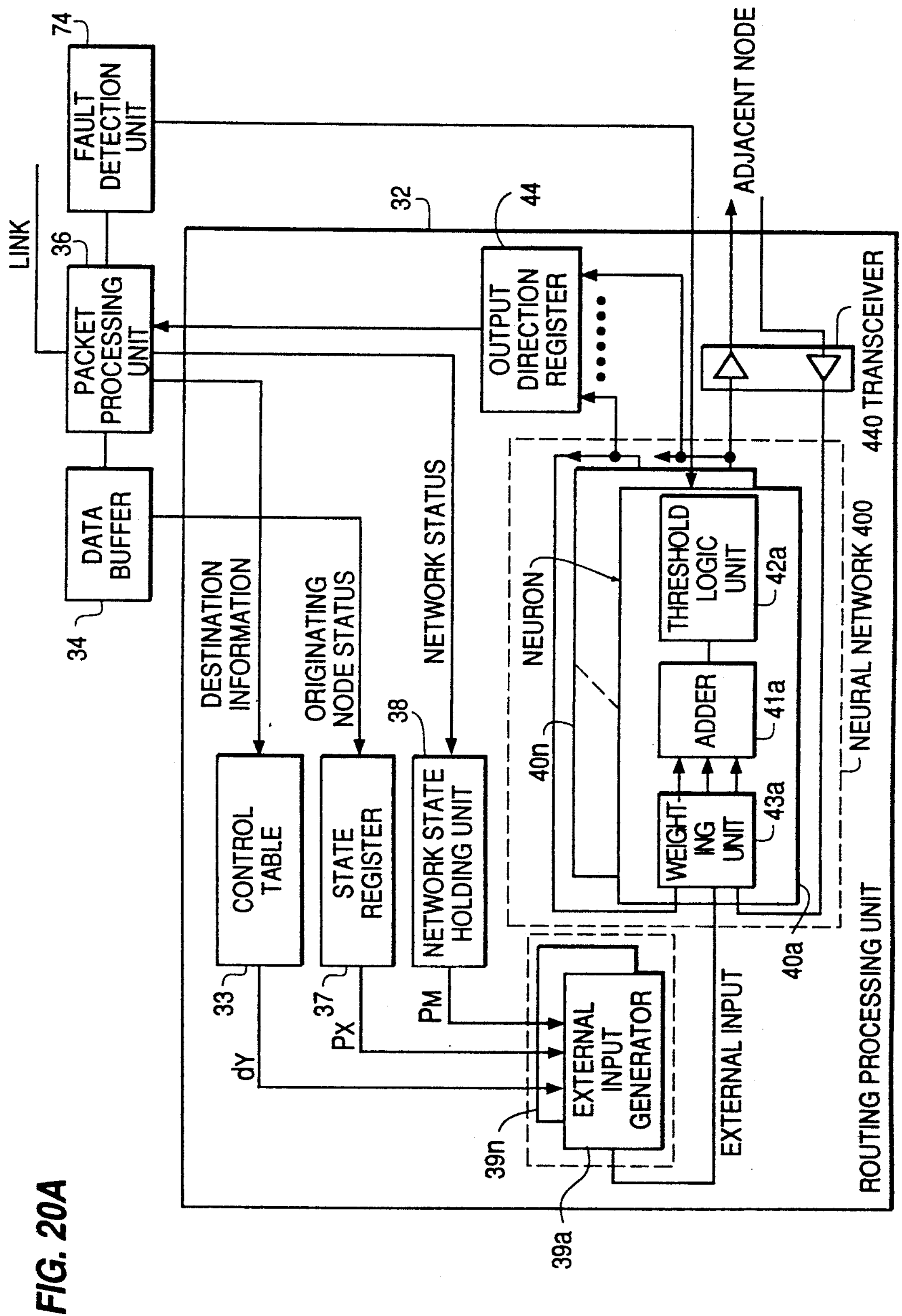

FIG. 20A
FAULT DETECTION UNIT
74
LINK
PACKET PROCESSING UNIT
36
DATA BUFFER
34
32
OUTPUT DIRECTION REGISTER
44
ADJACENT NODE
DESTINATION INFORMATION
ORIGINATING NODE STATUS
NETWORK STATUS
CONTROL TABLE
33
STATE REGISTER
37
NETWORK STATE HOLDING UNIT
38
NEURON
THRESHOLD LOGIC UNIT
42a
ADDER
41a
WEIGHT-ING UNIT
43a
40n
40a
NEURAL NETWORK 400
440 TRANSCEIVER
dY
PX
PM
EXTERNAL INPUT GENERATOR
39n
39a
EXTERNAL INPUT
ROUTING PROCESSING UNIT

NEURON
WEIGHT-ING UNIT
43
OPER-ATION AMP.
401
740
SELECTOR
FAULT DETECTING SIGNAL
FAULT DETECTING SIGNAL
CONTROL DATA FROM OTHER NODE
741
SELECTOR

25 CONTROL NETWORK
22 THRESHOLD VALUE ELEMENT
MAXIMUM BAND-WIDTH INFORMING UNIT
75
EXTERNAL INPUT OF CURRENT NETWORK STATUS
26
21
25
23
24
25
21 NODE
MAXIMUM BAND-WIDTH INFORMING UNIT
75
EXTERNAL INPUT OF CURRENT NETWORK STATUS
26
23 OUTPUT LINK
25
24 INPUT LINK
25
25
23
12
22
21
MAXIMUM BAND-WIDTH INFORMING UNIT
75
EXTERNAL INPUT OF CURRENT NETWORK STATUS
26

INPUT AND OUTPUT PORT
59
78
BANDWIDTH MANAGING UNIT
34
DATA BUFFER
76
PACKET ANALYSIS UNIT
BANDWIDTH INFORMATION COMMUNICATION UNIT
77
32
79
SY
BANDWIDTH HOLDING UNIT IN ADJACENT NODE
33
dY
CONTROL TABLE
37
BX
STATE REGISTER
38
BM
NETWORK STATE HOLDING UNIT
39n
40n
EXTERNAL INPUT GENERATOR
39a
WEIGHTING UNIT
ADDER
THRESHOLD LOGIC UNIT
43a
41a
42a
40a
400
ROUTING PROCESSING UNIT
440

FIG. 24

| SOURCE ADDRESS | DESTINATION ADDRESS | OUTPUT PORT | MAXIMUM BANDWIDTH |
|---|---|---|---|
| 1 | 6 | i | 384 kbps |
| •<br>• | •<br>• | •<br>• | •<br>• |

FIG. 27

| | | ADJACENT NODE | | | TOTAL NUMBER OF HOPS |
|---|---|---|---|---|---|
| | | X | Y | Z | |
| DESTINATION NODE | A | 2 | 3 | 2 | 7 |
| | B | 2 | 3 | 2 | 7 |
| | C | 4 | 2 | 2 | 8 |
| | | | | | |

INPUT AND OUTPUT PORT
59
HEADER ANALYSIS
57
DATA BUFFER
34
32
44
OUTPUT DIRECTION REGISTER
440
DX
92
CONSTANT CHANGING UNIT
THRESHOLD LOGIC UNIT
42a
ADDER
41a
WEIGHT-ING UNIT
43a
40n
40a
400
CONTROL TABLE
STATE REGISTER
NETWORK STATE HOLDING UNIT
38
33
37
dY
Px
PM
EXTERNAL INPUT GENERATOR
39n
39a
ROUTING PROCESSING UNIT

FIG. 33A(1)
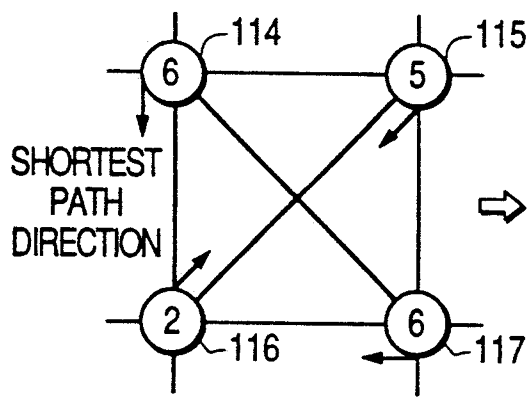
FIG. 33A(2)
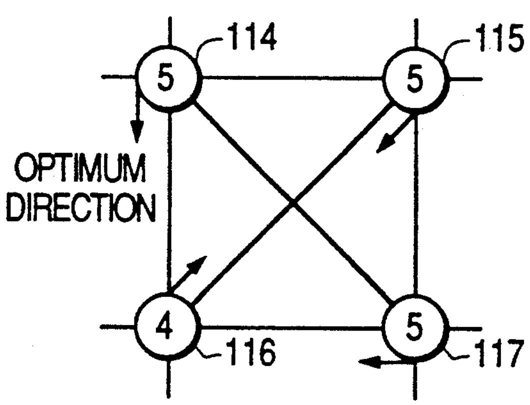
FIG. 33B(1)
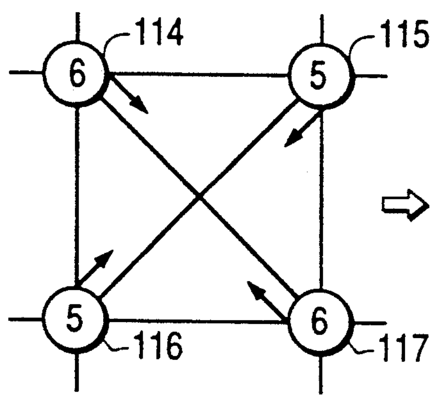
FIG. 33B(2)
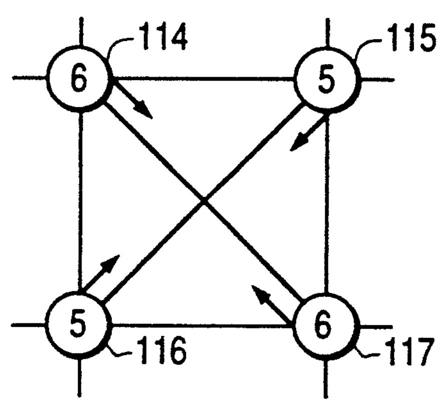
FIG. 33C(1)
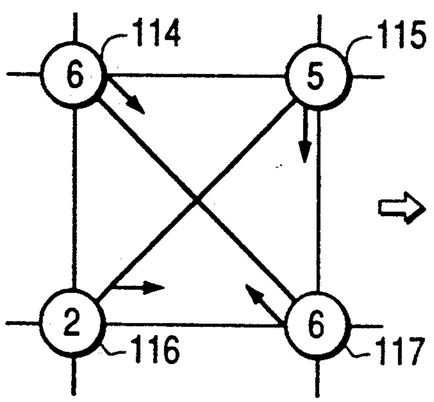
FIG. 33C(2)
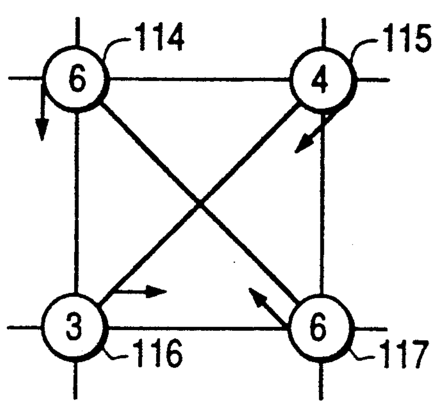

ADAPTIVE PATHFINDING NEUTRAL NETWORK FOR A PACKET COMMUNICATION SYSTEM

BACKGROUND ART

The present invention relates to communication networks including local and broad area networks, and more particularly to an adaptive routing method in a communication network. This method is flexibly adapted to enable the status of a network in a multimedia integrated network for processing various information such as ISDN to change in a mixed manner, thus realizing effective usage and high-performance communication.

As shown in FIG. 1, a future network has an increased scale, speed, variety and capacity, developing a multi-media integrated network which can process a variety of mixed information. In such integrated networks, requirements such as communication speed, reliability and real-time features change greatly with respect to time and space. Therefore, there is a great demand for a network which is flexibly adaptive to these changes in network status and able to realize effective usage and high-performance communication.

Data, such as voice or image data, which require real-time operation may be subjected to a packetexchange method routine. In this case, to avoid damage to the real-time operation it is necessary to transmit data comprising a series of plural packets without separation. Effective usage and high network performance is required to satisfy this condition.

The number of nodes in present networks is $10^2$ to $10^3$ and the transmission speed is several hundred Kbps. In future networks, the number of nodes is predicted to be $10^4$ to $10^5$ and the transmission speed to be several hundred Mbps. It is necessary to develop network control technology which will be useful for a long time to come in the future.

Packet exchange network technology is used to realize the above communication. Exchange methods for packet exchange networks include the datagram method in which no logical link is set between terminals. Here, a setting-up concept is not used, instead a virtual call method (VC) setting up a logical channel between terminals. A fixed logical link set between terminals is called a permanent logical virtual circuit (PVC).

Before a setting-up is conducted in a packet network using a general virtual call method which does not use a permanent virtual circuit, the amount of traffic to be entered into a network is first predicted and the most appropriate route is chosen to prevent predicted traffic from being concentrated in a predetermined node between respective terminals. The bus information is maintained at respective nodes. A plurality of alternate routes is also provided between terminals to prepare for and avoid a node fault or a busy condition which exceeds the predicted traffic.

FIG. 2 shows a prior art method of setting routes between terminals and a packet exchange network. In FIG. 2, the exchange network comprises 6 nodes, 1–6, and four terminals, 7–10. For example, between terminals 8 and 10, the route from node 2 to node 4 via node 3 is the most appropriate. In addition, there are two alternate routes: from node 2 via nodes 3 and 6, and from node 2- via nodes 5 and 6. When a virtual call is set up in such a network, the node containing the transmitting terminal collects the status of the network, i.e., faults or busy conditions, and selects the most appropriate route, or an alternative route. A packet is then transmitted along the route, to perform a setting up.

In a multi-media integrated large-scale network through which a great amount of data such as burst data or image data is transmitted, the width of the change of the media to be included with respect to the time and quantity becomes too large to be handled by the prior art methods. Therefore, for a virtual call, it is difficult to obtain the most appropriate route between terminals to adequately distribute network traffic, by predicting the manner of media usage.

To prepare a plurality of alternative routes, time is required to collect information from the entire network. Thus, the obtained route does not reflect the traffic condition of the current network, and the high speed and large capacity demanded by respective media cannot be provided.

FIG. 3 shows an example of the structure of a communication network system using the datagram method. In FIG. 3, nodes 11, 12 and 13 are connected to each other through links 14, 15 and 16. Respective nodes are connected to other nodes to input ports and output ports not shown in FIG. 3. Node 11 is connected to terminals A, B, and C, node 12 is connected to terminal D, and node 13 is connected to terminals E and F. Information transmitted through this network system is divided into packet units as shown in FIG. 3, with header H storing destination information attached to the head of respective packet units.

In FIG. 3, we suppose that information "a" of terminal A is transmitted to terminal D, information "b" of terminal B is transmitted to terminal E, and information "c" of terminal C is transmitted to terminal F. Nodes 11, 12 and 13 have respective routing tables 17, 18 and 19, showing which link should be selected as the data transmission path with regard to the respective destination nodes. Information "a" comprises two packets [1] and [2], information "b" comprises three packets [1]-[3] and information "c" has four packets [1]-[4].

Node 11 refers to routing table 17 which is based on the destination address attached to a packet input from terminals A, B and C through an input port and which selects an output port, thereby performing a routing. As a result, node 11 outputs packet data to link 14 and link 15 through respective output ports. For example, packet and "a [1]" and "a [2]" of terminal A and packet data "c" of terminal C are, for example, transmitted to link 15. In FIG. 3, only packet data c [4] is separated from other packet data ([1]-[3]) transmitted from the same terminal C and transmitted to link 15. This is because the traffic of link 14 is busy.

In a method which sets no logical links between terminals, namely, in a data gram method which does not use a setting-up concept, communication ends when the terminal transmits a packet into a network. The network detects the destination of the respective packet and transmits it to the terminal designated by the destination.

Only information "a" among packet data entering node 12 through link 15 is restructured as data and output to terminal D. On the other hand, the packet data "c [4]" are transmitted to link 16. Node 13 restructures packet data transmitted thrugh links 14 and 16 and outputs information "b" at terminal B and information "c" at terminal F.

So-called adaptive routing transmits information in packet units to different links in accordance with a busy status of a link or a fault of a link or node, thereby achieving effective network usage and high-performance communication. In adaptive routing, a control system in respective nodes, as shown in FIG. 4, collects the varying statuses of all the nodes as whole information, calculates the most appropriate solution, corrects the route to reach the destination and periodically realizes the content of a routing paper, in accordance with a change in network status.

However, when the scale of a network becomes large and a great amount of data such as image data is transmitted through it in a bursty manner it takes a relatively long period to calculate the most appropriate path to reach the destination node based on the time required to collect the status information. The path which is actually used for transmitting packet data only reflects the status of a network which is fairly old and does not reflect the traffic condition of the current network. Therefore, it is difficult to achieve a real-time routing adaptive to the status of a network when the change in the load is great.

For data such as voice and image, which demands real-time operation, routing must be decided individually for each packet. Consequently, delay in processing increases, variation in arrival time of a packet at a destination node increases, and performance of the real-time operation demanded by the data cannot be satisfied.

When a fault occurs in a node or link, communication becomes impossible for a long period of time while the respective nodes collect fault information of other nodes or links and calculate the most appropriate path to the destination node. All the packets transmitted during this period are disposed of and in the worst case, it is necessary to re-start communication among end terminals.

As a general rule in such routing, the processsing time for routing should be as short as possible. Thus, optimum performance cannot be constantly provided to comply with quick variations in the network if the optimum network condition for performing a calculation of the optimum path remains fixed. The optimum network condition is determined by whether or not a uniformity of loads exists at respective nodes in a network, namely, whether the load distribution is considered important and whether or not or it is considered important to enable the packet to approach the destination node as close as is possible.

DISCLOSURE OF THE INVENTION

The first object of the present invention is to realize an effective network usage and high-performance communication by locally selecting an output link of a packet from the originating node by referring to the traffic condition of the originating node and adjacent nodes consituting a network.

The second object of the present invention is to achieve effective usage of a network as a whole and high-performance communication. This is achieved by locally selecting an output link through which a series of data, for example, image data, is transmitted from the originating node based on the traffic condition of the originating node. Adjacent nodes consitute a network in which a plurality of serial packets are moved as a block without being subjected to a division.

The third object of the present invention is to instantaneously provide a reliable packet routing method which is adaptable to the network status. This is achieved by determining an alternative route within a network in a similar manner to the first and second objects without interrupting communication when network conditions change due to a fault.

The fourth object of the present invention is to instantaneously achieve setting of a virtual call path which is adaptable to the network condition without damaging the quality of the media. An output link is locally selected by referring to the traffic condition of the originating node and adjacent nodes constituting a virtual call type packet exchange network.

The fifth object of the present invention is to provide the most appropriate performance in setting a route which is instantaneously adaptive to changes in network conditions the selection condition of an output link of a packet from the originating node is changed in accordance with the load status and the distance to the destination nodes of the packet.

The sixth object of the present invention is to shorten the routing processing time necessary for locally selecting an output link of a packet from the originating node by referring to the traffic condition of the originating node and adjacent nodes which constitute the network.

FIG. 5 is a diagram for explaining the principle of the present invention. 21 is a plurality of nodes distributed in position with a plurality of input ports and output ports which are not shown, 22 is a plurality of threshold value elements, for example, neurons, assigned to each of the input and output ports of respective nodes 21, 23 is an output link connecting respective nodes, and 24 is an input link connecting respective nodes. These form a packet exchange netword in which communication is conducted using a packet transmitting method which adds control information such as address data and data length to transmission information.

In FIG. 5, control network 25, for example, a neural network, designated by a solid line, combines threshold logic elements 22 provided in respective nodes 21, i.e., combines threshold logic elements 22 of the originating node with threshold logic elements 22 assigned to input and output ports of other nodes connected by output link 23 and input link 24 with regard to respective links. Input means inputs the network condition before the output 26 receives external input designating the current network status and inputs to respective threshold logic elements 22 as the network status before the packet is output, information necessary for evaluating the traffic condition of the network after the packet output, such as the number of packets obtained by the originating nodes is input, information designating the destination of a packet to be transmitted from the originating node, and the average number of packets maintained by all the nodes within the network, before respective nodes output respective packets.

Respective threshold value elements 22 add the input from the external input of current network status 26 and to the outputs from an originating element and a plurality of adjacent threshold value elements 22 on control network 25 after weighting process. The sum is subjected to threshold value processing which produces an output of 0 or 1. Respective threshold value elements 22 weigh the respective input signals by using a combination coefficient. The outputs are added and 0 or 1 is output depending on whether or not the result exceeds a threshold value.

In FIG. 5, the interaction of threshold value elements 22 corresponding to output links 23 and input links 24 connected between a plurality of nodes 21 determines the most appropriate transmission direction of the packet at respective nodes. As a result of interpolation, packet communication can be conducted in real-time in the optimum direction in respective nodes. Respective threshold value elements 22 add inputs from external input of current network status 26 to the outputs of the originating threshold value element and adjacent threshold value elements within control network 25 after being weighed. The sum is subjected to a threshold value processing to determine the output as 0 or 1. After this mutual cooperating operation has been repeated, only the threshold value element whose output is "1" is determined from among a plurality of threshold value elements to be assigned to an output port of the originating mode when the network reaches a balanced condition. Thus the output port assigned to such a threshold value element is determined as the output direction of a packet from the originating node.

When respective nodes transmit a single packet at a certain timing, an objective function is determined in such a manner that the status in which the evaluation function is minimized comprises an equivalent network status. This status is provided so as not to concentrate the data in a predetermined node at the following timing, but to select the output direction in which the distance to the destination node is shortest. This enables the optimum direction in which a packet is outputted from the originating node to be selected.

Next, the adaptive routing method of the present invention is explained in more detail as applied to a neural network. The present invention deals with routing as an optimization problem of obtaining a combination of packet output directions in which the following two evaluation functions are simultaneously optimized. Two objective functions are used. One is for averaging loads of all the nodes and the other is for providing the shortest distance to the destination nodes for respective packets within a network at a timing t+1, after the respective nodes move the packets to the adjacent nodes at a timing t. The solution of the problem is obtained by minimizing the energy of the neural network.

Namely, the operation of respective neurons is defined by a state equation (1) in the neural network shown in FIG. 6. It is known that the output status becomes stable where the energy function (3) defined by the total neural network is a minimum.

$$\frac{dU_x}{dt} = \sum_{Y} T_{XY}V_Y + I_X \quad (1)$$

$$V_X = G(U_X) \quad (2)$$

$$E(\text{energy}) = -\tfrac{1}{2}\sum_{X}\sum_{Y} T_{XY}V_XV_Y - \sum_{X} I_XV_X \quad (3)$$

where, $U_X$ is the internal state of a neuron X, $V_X$ is the output state of neuron X, $I_X$ is the external input to neuron X, $T_{XY}$ is the synaptic interconnection of neurons X and Y, and G is a nonlinear monotonically increasing function, for example, a threshold value function. In detail, each respective neuron corresponds to an input link or an output link of a node within a network.

FIG. 7 shows the connection status of two nodes in the present invention. In FIG. 7, node X is connected to node Y through an input link and an output link. Threshold value elements (neurons) on the node X side are the pair comprising $V_{XY1}$ on the output link side and $V_{XY2}$ on the input link side. Threshold value elements (neurons) on the node Y side are the pair comprising $V_{YX1}$ on the output link side and $V_{XY2}$ on the input link side. The neuron (threshold value element) is classified as that corresponding to the input link and that corresponding to the output link, the former is called "the input(side) neuron" and the latter is called "the output(-side) neuron" hereinafter.

As shown in FIG. 7, in a neural network in which a combination between neurons exists only within a node or between adjacent nodes, an input to optional neuron XYZ is expressed as follows.

$$\sum_{X'}^{N}\sum_{Y'}^{N}\sum_{Z'}^{Z} T_{XYZ,X'Y'Z'}V_{X'Y'Z'} + I_{XYZ} \quad (4)$$

Where $T_{XYZ,\ X'Y'Z'}$ is a synaptic interconnection between a neuron XYZ and neuron X'Y'Z', and where $V_{X'Y'Z'}$ is the output of neurons X'Y'Z' other than the originating neuron. $I_{XYZ}$ is an external input to the originating neuron and corresponds to the input from external input of current network status 26 in FIG. 5.

The function of the network is given in the following equation.

$$E = -\tfrac{1}{2}\sum_{X}^{N}\sum_{Y}^{N}\sum_{Z}^{Z}\sum_{X'}^{N}\sum_{Y'}^{N}\sum_{Z'}^{Z} T_{XYZ,X'Y'Z'}V_{XYZ}V_{X'Y'Z'} - \sum_{X}^{N}\sum_{Y}^{N}\sum_{Z}^{Z} I_{XYZ}V_{XYZ} \quad (5)$$

The energy function E of a neural network is represented by a term including the total sum of the products of the outputs $V_{XYZ'}$ and $V_{X'Y'Z'}$ from two neurons and synaptic interconnections $T_{XYZ}$ and $T_{X'Y'Z'}$ between them, and a term including the total sum of an output $V_{XYZ}$ of respective neurons and external input $I_{XYZ}$ to the neuron. The value of energy function E decreases in accordance with the state of the network. Namely, with a change in output of respective neurons the state in which the value of the energy function E becomes a minimum complies with the balanced status (stable status) of a network.

Therefore, an objective function for evaluating a problem in communication network routing from the viewpoint of effective network usage and high performance communication is achieved. A synaptic interconnection is determined to make the objective function correspond to the above energy function E one by one, and an external input is also determined to provide a balanced state in which the objective function, namely, energy function E, is made to be a minimum.

By incorporating an external input into the objective function corresponding to the destination of a packet and the state of a node, respective neurons within a network can be determined in accordance with the state of the node.

The objective function is considered as an optimization problem in which, when respective nodes in the network move respective packets to adjacent nodes at a certain timing, a set of output directions is obtained to minimize the objective function corresponding to the state of the network, which in turn changes as a result of a movement of a packet. Independent variable numbers $V_{XYZ}$ (0 or 1) corresponding to input and output links of respective nodes one by one are defined as follows:

$V_{XY1}=1$: A packet is transmitted to node Y at node X.

$V_{XY1}=0$: Packet H is not transmitted to node Y at node X.

$V_{XYZ}=1$: Node X receives a packet from node Y.

$V_{XYZ}=0$: Node X does not receive a packet from node Y.

In the present invention the objective function $\phi$ of a network is defined as follows.

$$\phi = C_1 \sum_X^N \left( P_X + \sum_Y^N A_{XY}V_{XYZ} - \sum_Y^N A_{XY}V_{XY1} - P_M \right)^2 + C_2 \sum_X^N \sum_Y^N d_Y A_{XY} V_{XY1} + C_3 \sum_X^N \left( \sum_Y^N A_{XY}V_{XY1} - \Theta_X \right)^2 + C_4 \sum_X^N \sum_Y^N (A_{XY}V_{XY1} - A_{XY}V_{YX2})^2 \quad (6)$$

where $P_X$ represents the number of packets node X currently has, $P_M$ is the average number of packets which respective nodes in the whole network have, $d_Y$ represents the distance of a routing in which a packet is transmitted from node X to a destination node through node Y by a number of a relay links to the destination node, for example, and $\theta X$ is a number which becomes "1" when node X has a packet and "0" when node X does not have a packet. $A_{XY}$ is a number which becomes "1" when node X is connected to an adjacent node Y and "0" when node X is not connected to an adjacent node Y. The value of $A_{XY}$ is determined upon designing the network.

The first term in the equation represents the load distribution of the whole network. Namely, as a result of moving a single packet from respective nodes to adjacent nodes, how far or how different is the number of packets at respective nodes from the average number of packets which respective nodes have within the network. The second term represents the total distance from the originating node to the destination node of the moved packet. The third and fourth terms represent restriction conditions for independent variable numbers $V_{XYZ}$ in the first and second items respectively. The third term indicates that, when a packet does not exist in node X ($\theta_X=O$) it does not send a packet to any adjacent node Y $$\left( \sum_Y^M A_{XY}V_{XY1} = 0 \right).$$

In other words, the third term becomes "0" when the packet exists ($\theta=1$) and only one output direction of the packet is determined. The fourth term indicates that transmitting a packet from node X to node Y should be equal to receiving a packet from node X by node Y ($A_{XY}V_{XY1} = A_{XY}V_{YX2}$).

In other words, minimizing the objective function $\phi$ of equation (6) means obtaining a set of $V_{XYZ}$ which minimizes the sum of the first term and the second term among sets of $V_{XYZ}$, making both the third and fourth terms equal to 0. The adjacent node Y, in which $V_{XY1}$ is equal to "1" when the function $\phi$ corresponding to the energy function E of the neural network becomes a minimum, is determined to be the transmission destination of the packet from node X. Coefficients $C_1$, $C_2$, $C_3$ and $C_4$ of equation (6) are determined by a policy which considers which term of equation (6) is important to design an actual network. For example, $C_1$ or $C_2$ is determined to be larger depending on whether or not the load distribution within the network is considered more important than the distance to the object node or whether or not the distance is considered more important than the load distribution.

The objective function $\phi$ is made to correspond to the energy function E one by one, thereby obtaining synaptic interconnection and external input. The synaptic interconnection generally corresponds to the term representing the product of the ouput of two neurons and can be a constant which is fixed by the structure of the network. The external input of respective neurons is provided as follows by obtaining the coefficient of $V_{XY1}$ and $V_{XY2}$.

Neuron $V_{XY1}$(output side):

$$\{C_1(P_X - P_M) - C_2 d_Y/2 + C_3\Theta_X\}A_{XY} \quad (7)$$

Neuron $V_{XY2}$(input side):

$$-C_1(P_X - P_M)A_{XY} \quad (8)$$

Therefore, in the control units of respective network nodes, the above external input may be input to respective neurons in the originating node when the packet moves.

The adaptive routing of the present invention is explained in FIG. 8. Load information of respective nodes and the number of hops representing the distance to the destination node of the packet to be output from the originating node, namely, the number of relay links, is provided as external input from the node of the actual network to the neuron of the neural network. Respective neurons in the control network (i.e. a neural network) mutually interact by using the external input and the output of adjacent neurons to designate the optimum output direction of the packet based on the output status of the neuron in a stable state. The neural network, at this time, operates such that the neurons communicate between adjacent nodes and so that routing can be conducted autonomously based on the local information of respective node.

BRIEF DESCRIPTION OF THE DRAWINGS

FIG. 6 shows a principle of a neural network, FIG. 12A shows a block diagram of the routing processing unit of the first embodiment, FIG. 12B shows a detailed structure of the external input generator, FIG. 18 shows a flowchart of the packet output operation at nodes in the second embodiment, performed by the CPU 31, FIG. 20A shows the third embodiment of the routing processing unit, FIG. 24 shows an example of the content of the bandwidth managing unit, FIG. 27 shows an example of the content of the control table in the fifth embodiment, FIG. 33 shows an example of the result of the computer simulation of the adaptive routing according to the present invention.

PREFERRED EMBODIMENT

Figure 1B:
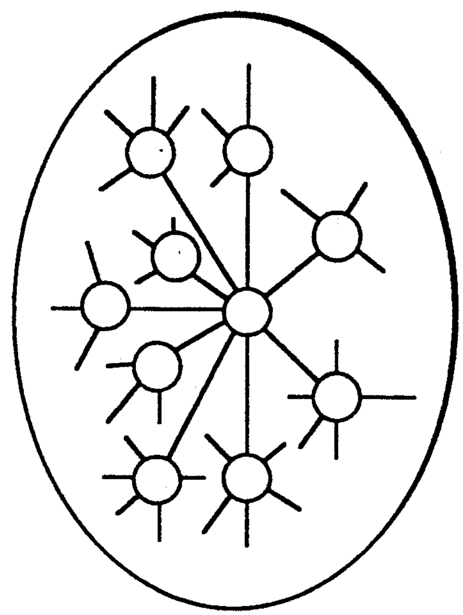
FIG. 1 shows a future trend in the development of communication networks.
Figure 1A:
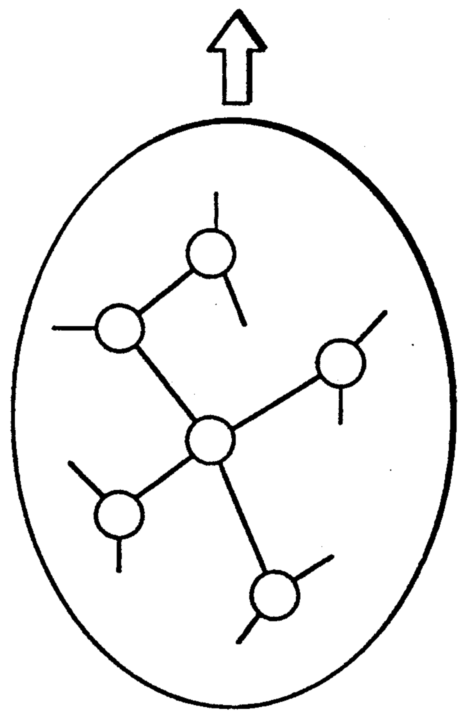
Figure 2:
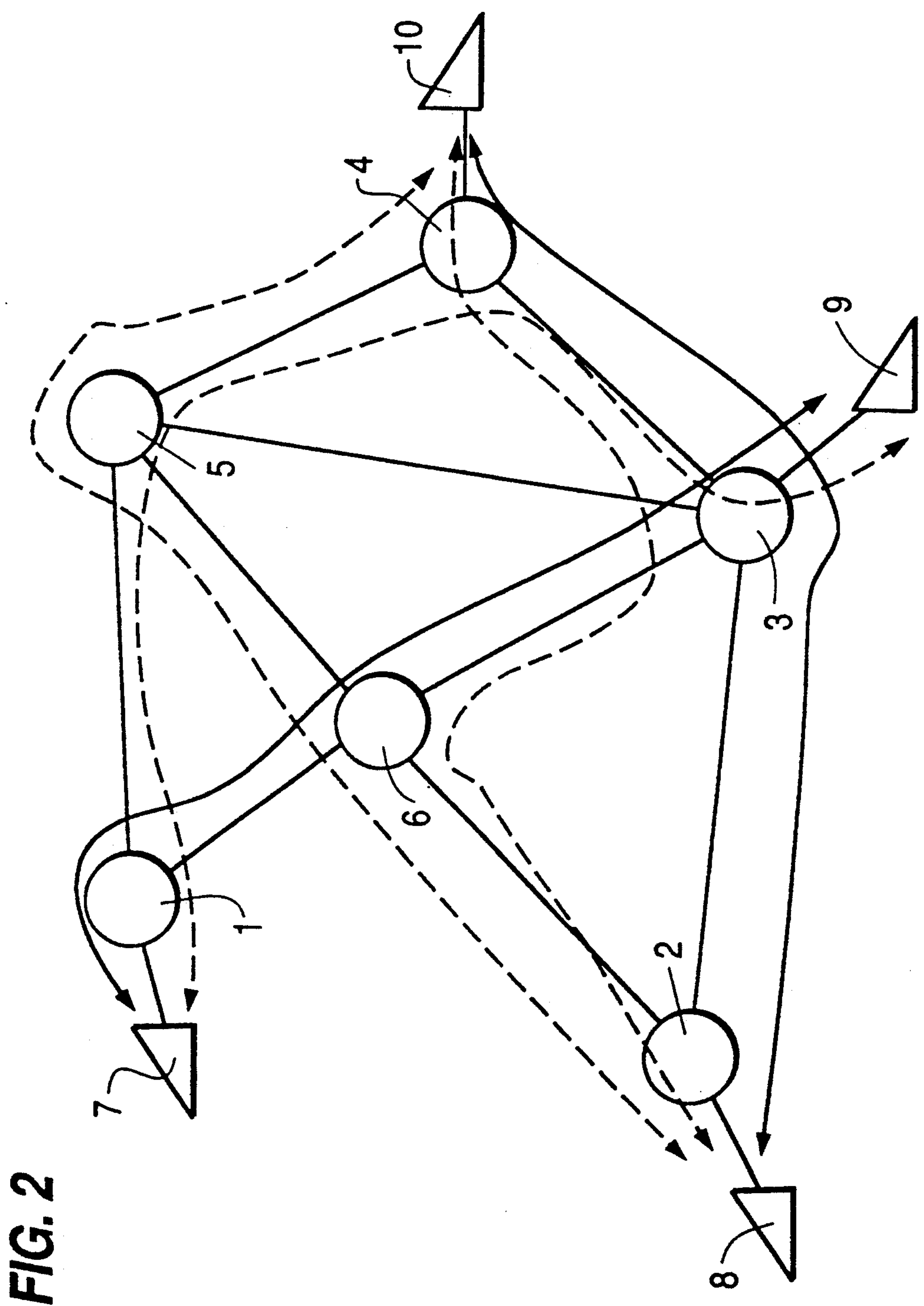
FIG. 2 is a block diagram of the prior art method of determining routes between terminals in the packet exchange method.
Figure 3:
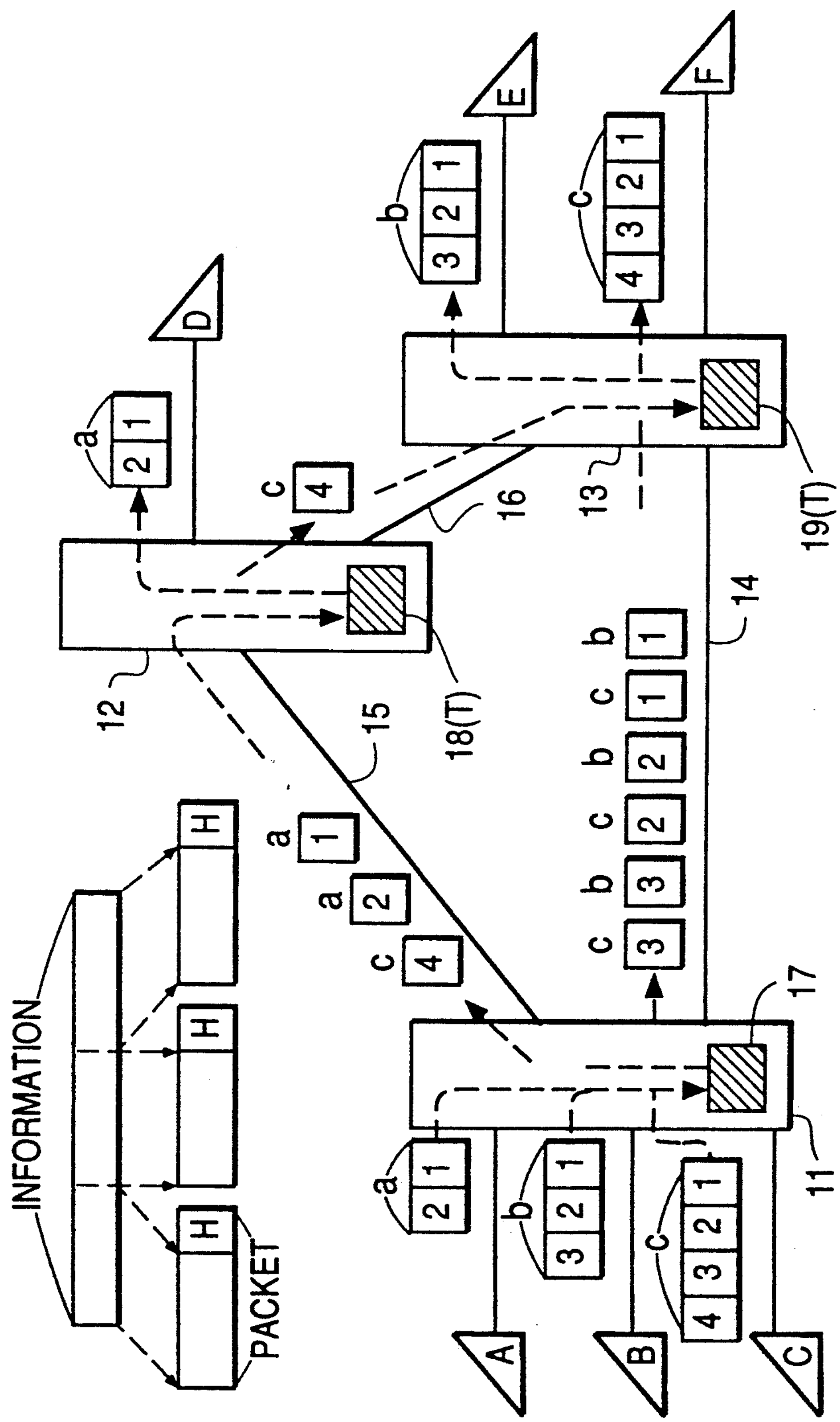
FIG. 3 is a block diagram of an example of a structure of a prior art communication network system using the data gram method.
Figure 4:
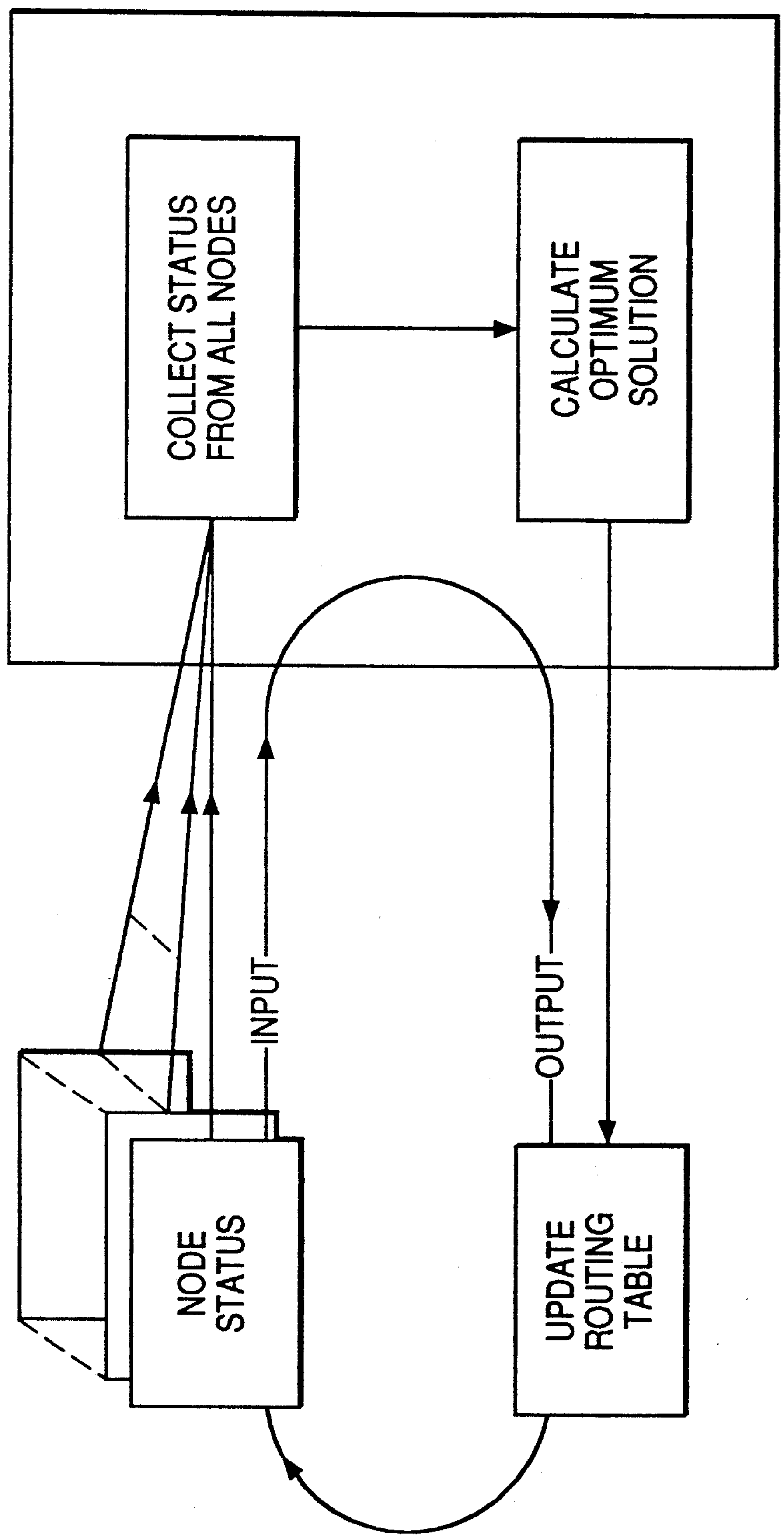
FIG. 4 is a view for explaining the problem of the prior art routing method.
Figure 5:
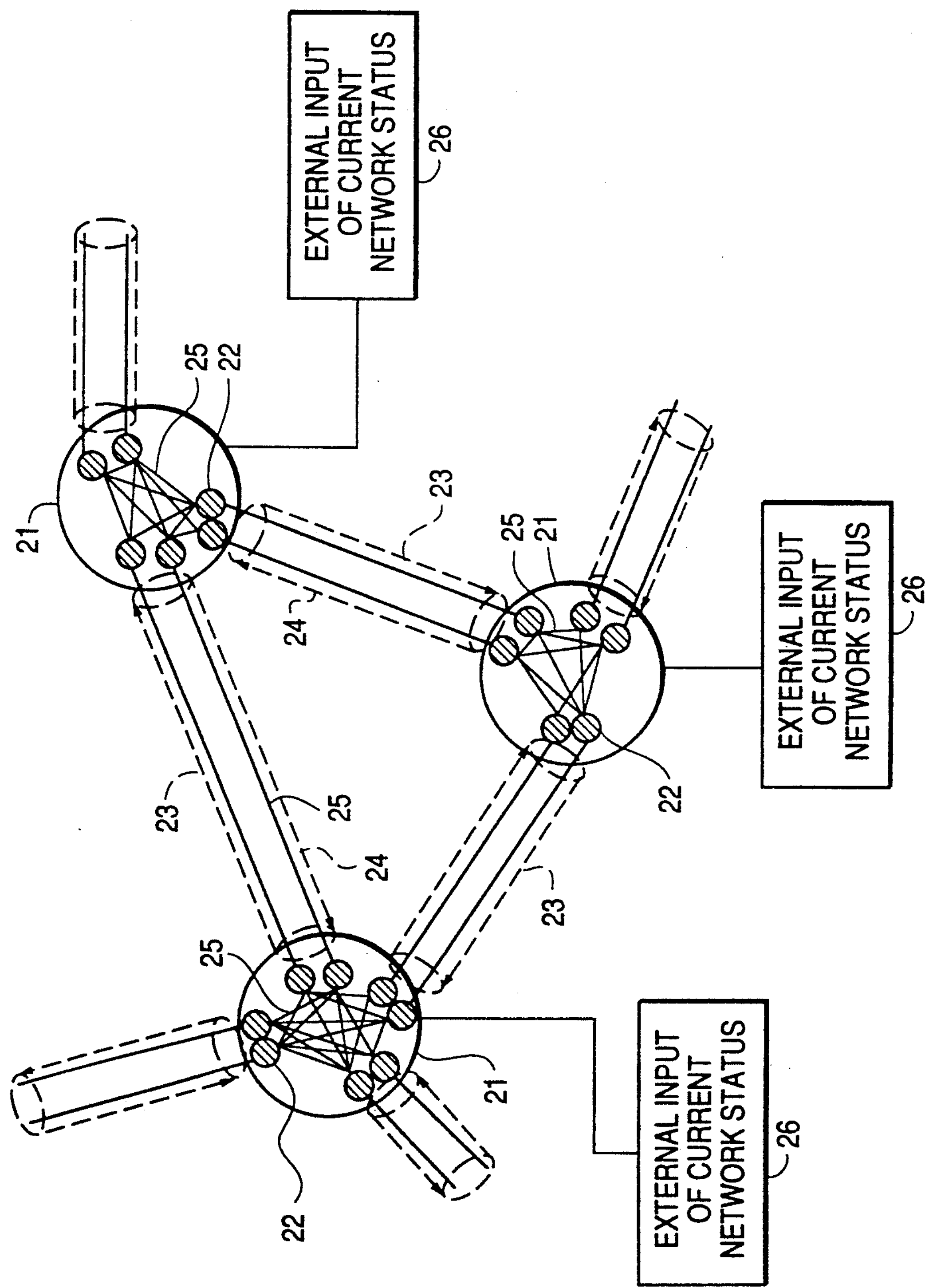
FIG. 5 shows a principle structure of the present invention.
Figure 7:
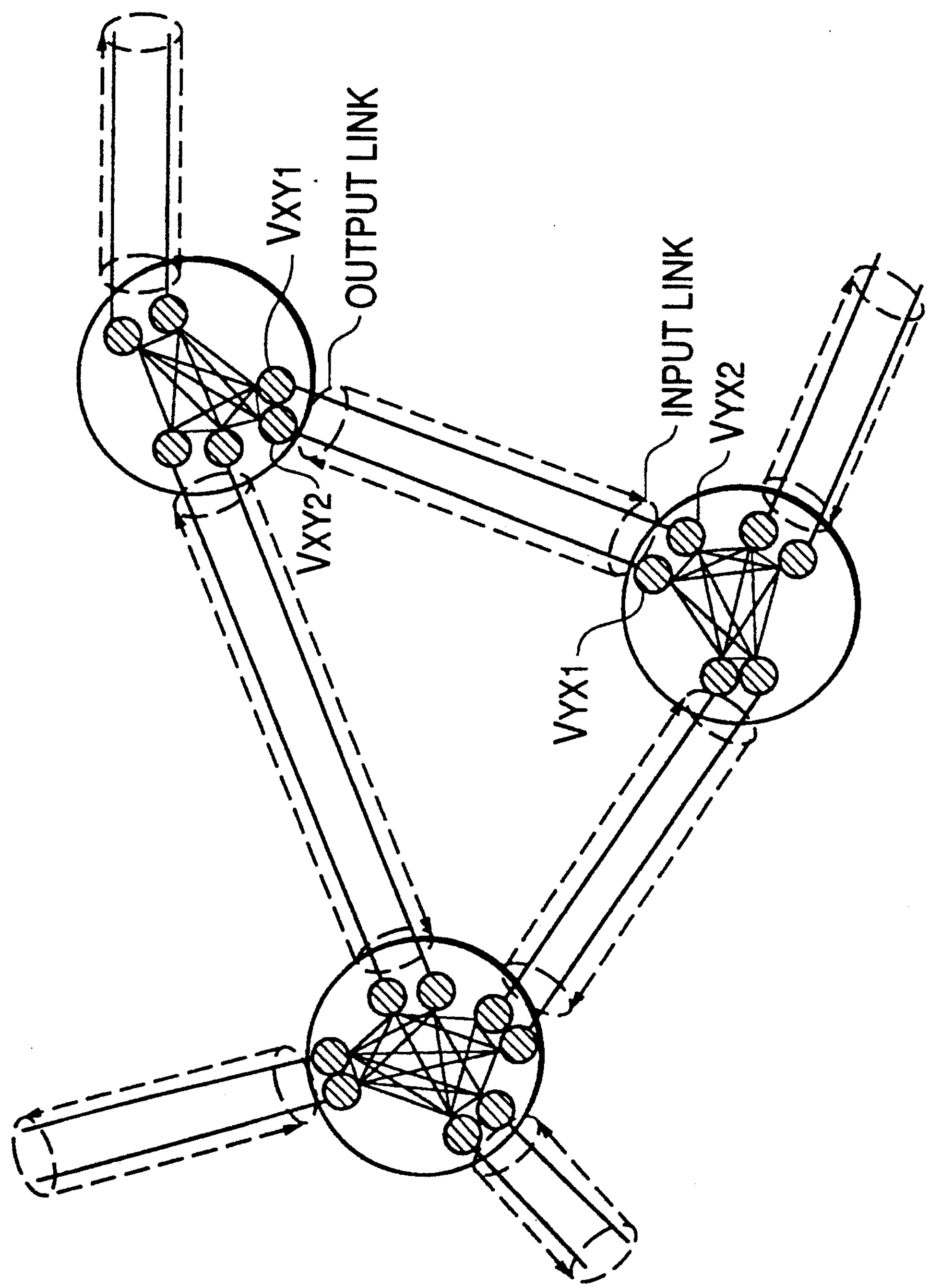
FIG. 7 is a view of the connection between two nodes according to the present invention.
Figure 8:
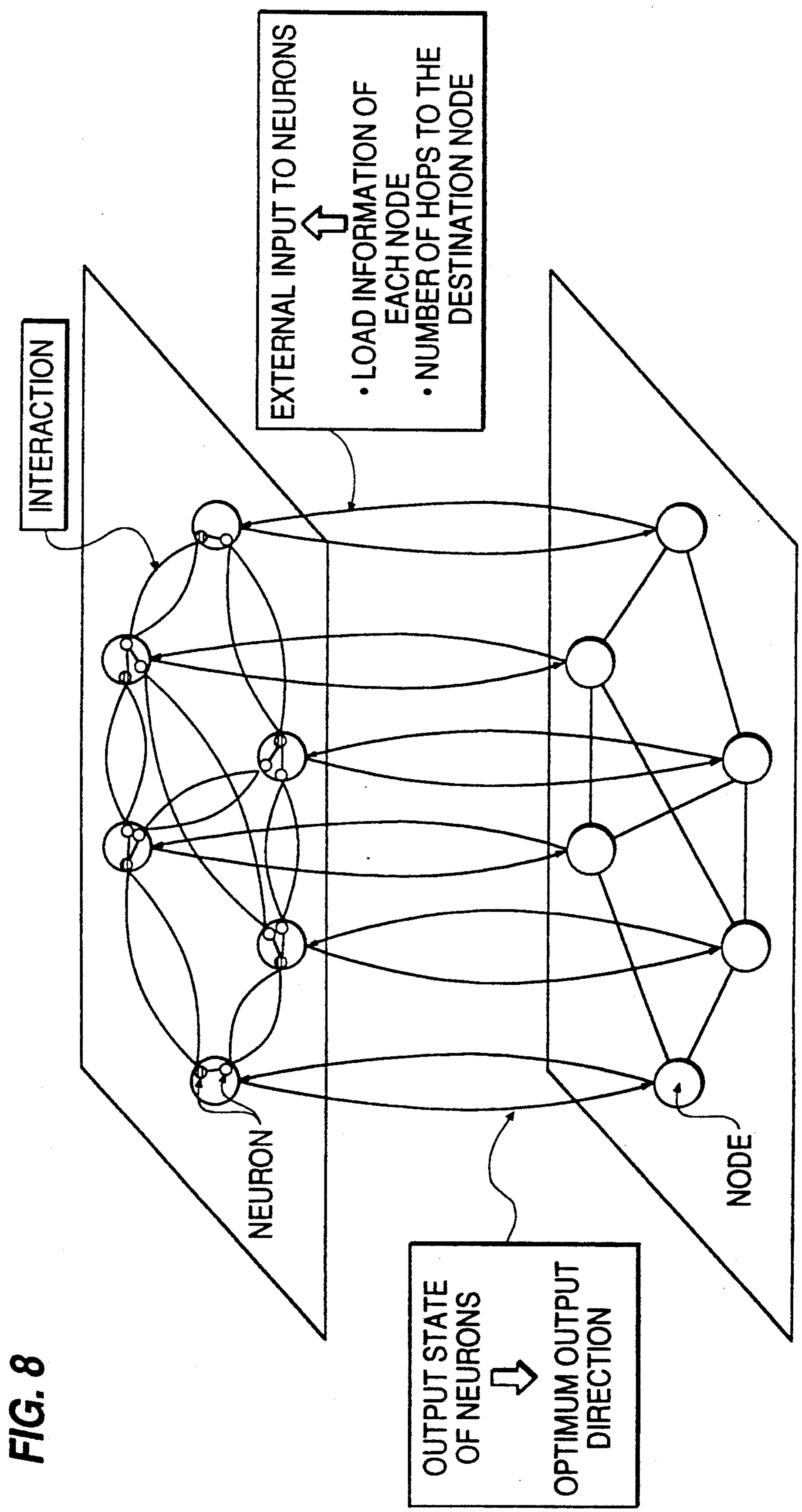
FIG. 8 shows an adaptive routing concept in the present invention.

An embodiment to realize the first object of the present invention corresponding to the principle diagram shown in FIG. 5, is explained as the first embodiment.

Figure 9:
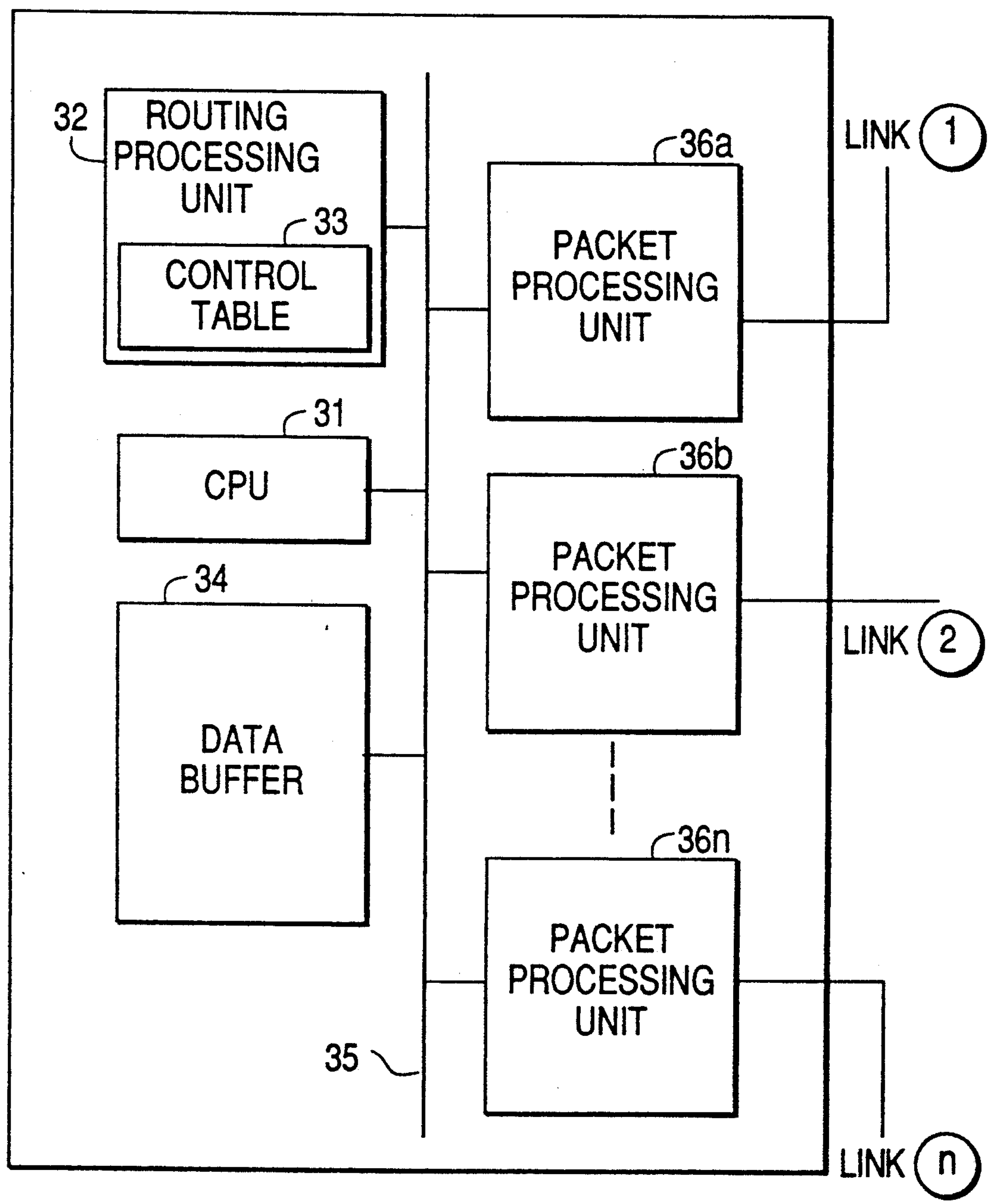
FIG. 9 shows a structural view of the node used in the first embodiment of the present invention.

The structure of a node relating to the first embodiment of the present invention is shown in FIG. 9. 31 is a CPU for performing control operations, 32 is a routing processing unit for substantially performing a routing processing, 33 is a control table for storing the distance from the originating node to the destination node as the number of relay links, i.e., the number of hops with regard to respective adjacent nodes, 34 is a data buffer for storing packet data to be input and output, 36a to 36n are packet processing units which correspond to links and which perform input and output control of packet data, and 35 is an internal bus for collecting respective structural elements. In the node formed above, packet data, for example, input from the input link (1), is subjected to a header analysis at packet processing unit 36a to provide destination information. The packet data from which the header is removed is stored in data buffer 34.

Figures 10, 11:
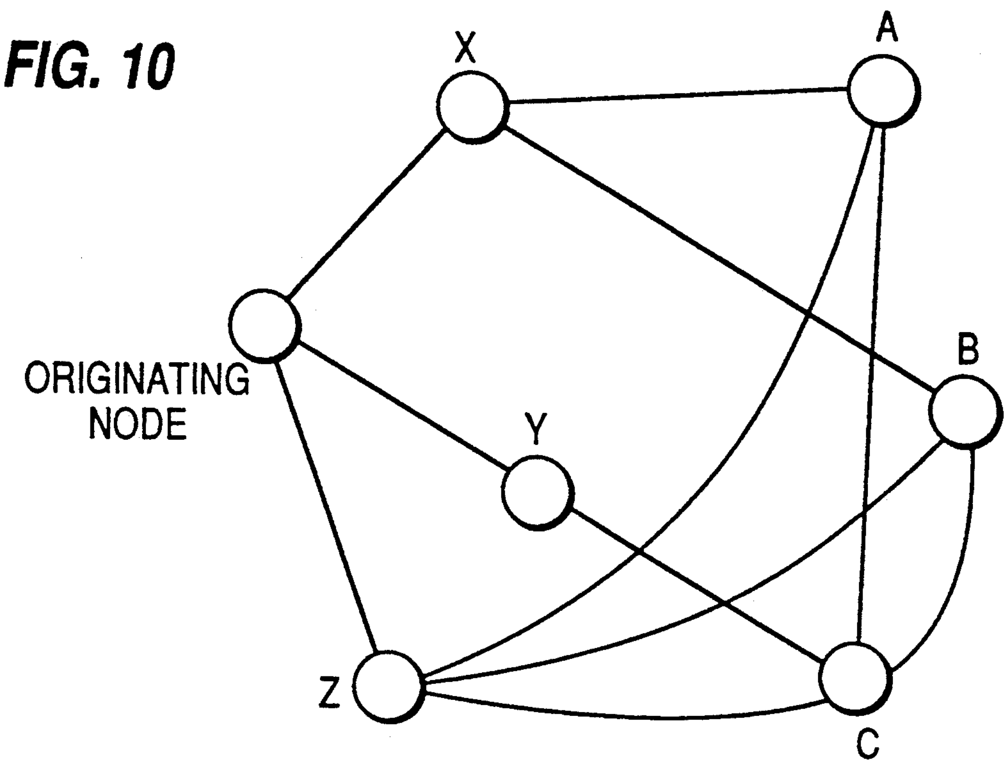
FIG. 10 shows a view of the connection status of respective nodes.
FIG. 11 shows an example of the content of the control table.

The content of control table 33 in FIG. 9 is explained by referring to FIGS. 10 and 11. FIG. 10 shows node connections, and FIG. 11 shows a control table 33 corresponding to the node connection of FIG. 10. In FIG. 10, where the originating node transmits data to node A, the number of relay links, i.e., the number of hops, differs depending on through which of adjacent nodes X, Y and Z data is transmitted to node A. Where data is transmitted through node X, the number of hops is two. Where data is transmitted through node Y, the number of hop is three. And where data is transmitted through node Z, the number of hops is two.

FIG. 11 shows control table 33 representing the number of hops with regard to respective adjacent nodes when an originating node transmits data to a destinaton node. The columns represent the destination nodes which are viewed from the originating nodes, with the rows representing the adjacent nodes. The number of hops when transmitting data to destination node C are three, two and two for adjacent nodes X, Y and Z, respectively.

FIG. 12A shows a block diagram of routing processing unit 32 in the first embodiment. This unit is constructed as follows. Control table 33 stores the number of hops $d_Y$ to the destination node, state register 37 shows the number of packets $P_X$ maintaned in the originating node, network state holding unit 38 maintains the average number of packets $P_M$ maintained in respective nodes in the whole network, and external input generators 39a . . . 39n combine $d_Y$, $P_X$ and $P_M$ as an external input corresponding with each neuron as the value of $d_Y$ differs depending on the neuron. Neurons 40a to 40n are n threshold value elements within the node. Adding unit 41 performs an adding processing within respective neurons and for example, adding unit 41a is provided in neuron 40a. The threshold logic unit 42a to 42n perform a threshold value processing, and weighting unit 43a to 43n performs a weighting operation with regard to respective input to the adding unit within the respective threshold value element. Output direction register 44 maintains the output direction of the packet which is transmitted from the originating node to the adjacent nodes. Transceiver 440 transmits a neuron status signal between adjacent nodes through links combining a neuron of the originating node with a neuron of adjacent nodes in control network 25 as a control link with the adjacent nodes. N neurons 40a to 40n constitute a neural network 400.

FIG. 12B shows the detailed structure of external input generator 39a to 39n. It shows the external input generator in the node X for two adjacent nodes Y and Z. As described above, the external input generator combines external input or stimulus shown by the equations (7) and (8). The external input shown by the equation (7) is combined with the output neuron and the external input indicated by the equation (8) is combined with the input neuron, thereby producing output from the external input combining unit to the weighting unit 43*a* to 43*n*.

External input generator 390 for the output neuron ($V_{XY1}$) of the adjacent node Y uses $d_Y$ of control table 33, $P_X$ of state register 37, $P_M$ of network states holding unit 38, and coefficients of respective items of the equation (7) stored in the coefficient register. The first term of equation (7) is obtained from subtractor 392 and multiplier 393 and the second term is obtained from multiplier 394. The sum of the first item, the second term and the third item is obtained from the adder 395 and output to corresponding weighting unit. Coefficient $C_{2'}$ in coefficient register 391 corresponds to $-C_2/2$ of the equation (7). External input combining unit 396 for the output neuron ($V_{XZ1}$) of the adjacent node Z combines the external input in a similar manner to the external input generator 390 in the adjacent node Y output neuron. The number of relay links to the destination node used by multiplier 394 is the value dz when signals are transmitted through the node Z. Further, adjacent node input neuron ($V_{XY2}$, $V_{XZ2}$) external input combining unit 397 obtains an external input from the equation (8) by using subtractor 398 and multiplier 399.

Figure 12C:
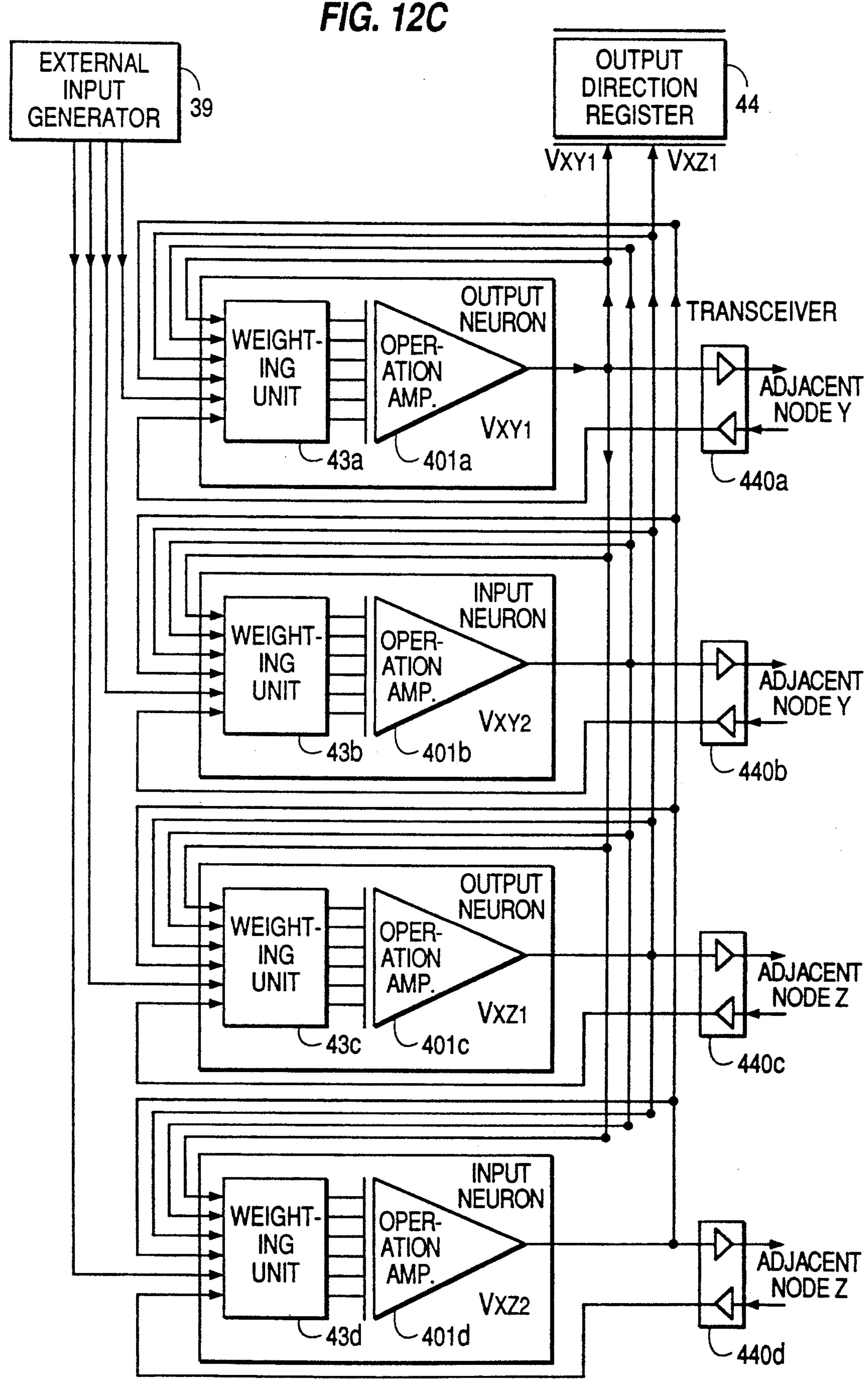
FIG. 12C shows a concrete neural network structure.

FIG. 12C shows a concrete structure of neural network 400 constituted by a plurality of neurons 40*a* to 40*n* in FIG. 12A. FIG. 12C shows a neural network having the two adjacent nodes Y and Z in a manner similar to the network shown in FIG. 12B. Two output neurons $V_{XY1}$ and $V_{XZ1}$ correspond to the output link to the adjacent node, and two input neurons $V_{XY2}$ and $V_{XZ2}$ correspond to the input link. These neurons comprise weighting unit 43*a*, and operation amplifier 401*a* corresponding to adding unit 41*a* and threshold logic unit 42*a*. Weighting units 43*a* to 43*d* include neurons corresponding to the adjacent nodes and receive the output of the adjacent neurons in the neural network, the output from the originating neuron and the output from the external input generators 39*a* to 39*d*, namely, the outer input. The output of the output neuron is provided to the corresponding input neuron at the adjacent node through transceiver 440*a* and 440*c* and at the same time is provided to output direction register 44. The output of the input neuron is provided to the corresponding input neuron of the adjacent nodes through transceivers 440*b* and 440*d*. The output of the input neuron $V_{XY2}$ is output to the node Y because node X communicates with the node Y side to determine whether or not node X receives the packet from node Y, based on the value of the independent variable $V_{XY2}$ defined by the objective function recited in equation (6). Similarly, as to the output neuron $Y_{XY1}$, node Y communicates with node X to determine whether or not node Y receives the packet from node X, based on the value of the independent variable $V_{YX2}$.

In FIG. 12A, the destination information is derived from the packet inputted by the link by means of packet processing unit 36 and the packet is stored in data buffer 34. The number of hops from adjacent nodes to destination nodes with regard to respective neurons of control table 33 is searched using destination information derived from packet processing unit 36, and is input to external input generator means 39*a* to 39*n* corresponding to respective neurons. Status information of the originating node, namely, the number of the packets $P_X$ stored in state register 37 and the value of $P_M$ maintained by network state holding unit 38, namely, the average value obtained by adding status information (the number of the maintained packets) of respective nodes periodically transmitted from all the nodes in the network are input to external input generators 39*a* to 39*n* corresponding to respective neurons.

Respective neurons, i.e., threshold logic elements 40*a* to 40*n*, repeat the operation in which weighting units 43*a* to 43*n* weight the outputs from external input generators 39*a* to 39*n* corresponding to respective neurons, the output of all the neurons in the originating unit and the output from the corresponding neurons in the adjacent nodes adder 41*a* adds them to obtain the sum, and threshold logic unit 42*a* performs a threshold logic processing of the sum. This enables the output of the threshold logic unit 42*a* to be entered into the other neurons. At this time, to synchronize the neuron within the originating node with the neuron of adjacent nodes, the status of neurons of the orgination node is periodically sampled and entered into respective neurons in the adjacent nodes.

The communication condition between nodes is indicated by a level signal of "0" or "1" conducted along a control signal line. By repeating the operation of the interaction, the status of the neurons is exchanged between themselves and the output of respective neurons reaches the balanced status, i.e. a stable status within an extremely short period. The output port corresponding to the only neuron, which produces the output "1", within the node is determined as the optimum output direction of the packet, excluding the fault direction. This direction represents how the packet of data to be subjected to a routing should be moved to prevent the data from concentrating at the special node and to enable the direction of the data to be selected such that the data approaches the destination node.

The output direction register 44 maintains the status of the output neuron to correspond with the output port. CPU 31 reads the value of the register in the stable status, thereby realizing routing of the packet stored in data buffer 34. Namely, the packet is transmitted from the output port corresponding to the neuron having the value of the output direction register 44 equal to "1".

Figures 13, 14:
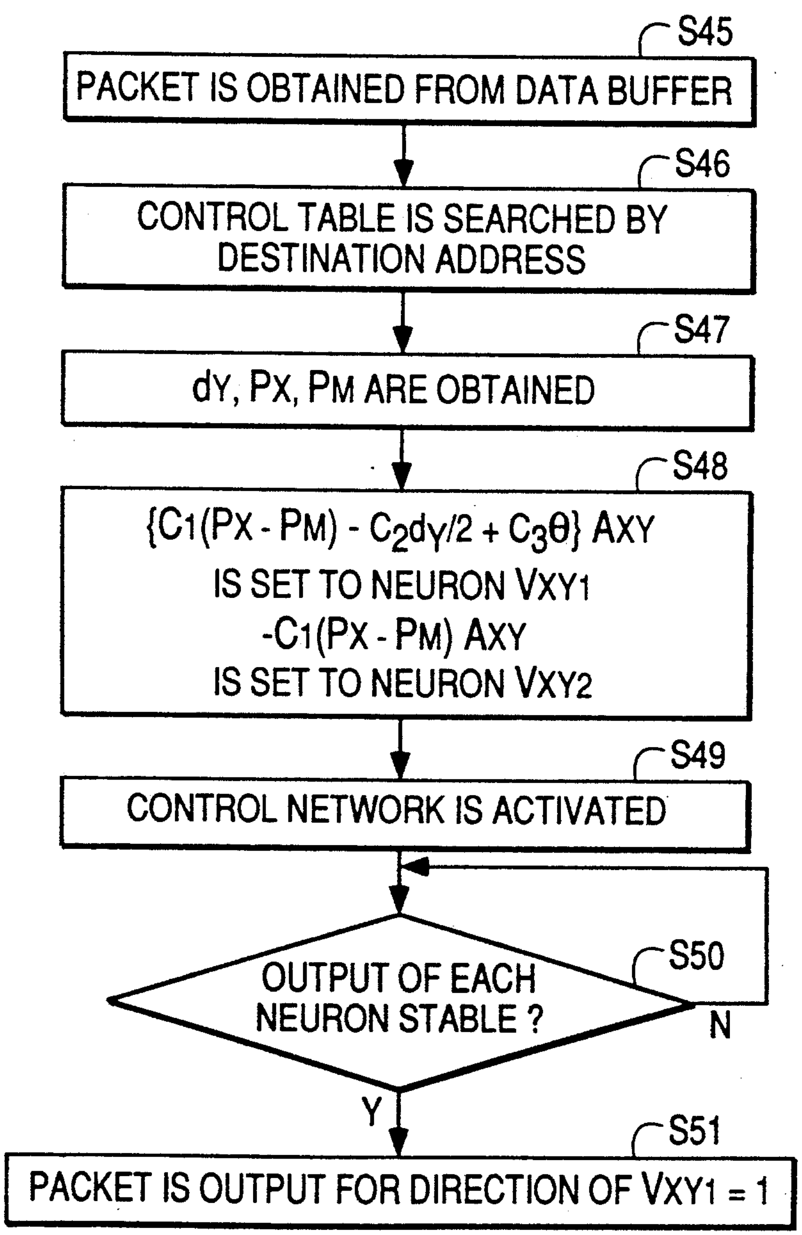
FIG. 13 shows a relationship between the neuron output and the adjacent node.
FIG. 14 shows a flowchart of the packet output operation at nodes in the first embodiment, performed by the CPU 31.

FIG. 13 shows the contents of output direction register 44, namely, an example of a relationship between adjacent nodes and the output of the neuron corresponding to the adjacent nodes. Only the neuron output corresponding to adjacent node Z and the packet from the originating node is outputted in the direction of the adjacent node Z.

FIG. 14 is a flow chart showing an output operation of the packet at node X in the first embodiment, performed by the CPU 13. The packet is obtained from data buffer 34 at step S45, control table 33 is searched by the destination address within a packet at S46, and the number of hops $d_Y$ which corresponds to the number of the adjacent node through which the packet is transmitted. Next, at S47 $d_Y$ is obtained from control table 33, $P_X$ from state register 37, and $P_M$ from network state maintaining unit 39. At S48, an external input of equations (7) and (8) is input to output side neuron $V_{XY1}$ and input side neuron $V_{XY2}$.

Thereafter, at S49, control network 25, designated by a solid line in FIG. 5, is activated and an autonomous operation can be conducted based on mutual cooporation between neurons. As a result, the output of the respective neurons is judged to be stable at S50 and then the packet of data buffer 34 is outputted in the direction of $V_{XY1}=1$, namely, in the optimum direction Y in which the energy function E is minimized.

The adaptive routing used in accordance with the second object of the present invention, namely, where a plurality of series of packets such as image data is moved simultaneously without being divided within the actual network is explained.

Figure 15:
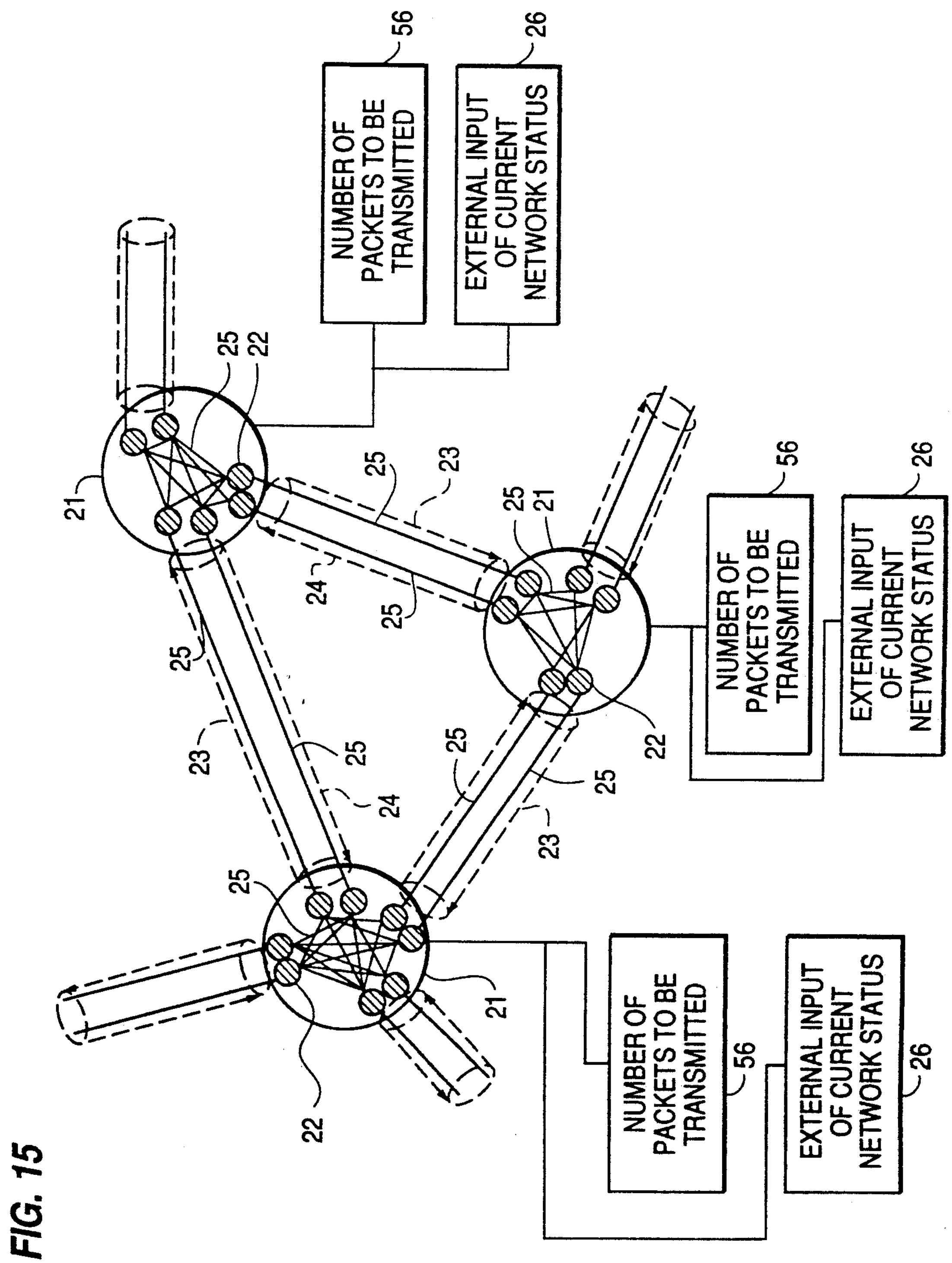
FIG. 15 represents a principle of the second embodiment of the present invention.

FIG. 15 is a drawing for explaining the principle of the second embodiment. Transmitting packet number informing means 56 (added to the drawing of FIG. 5) communicates the whole packet number of a series data to be next outputted from the originating node between the adjacent nodes. The total packet number of the series data is supposed to be added to the head packet of the series of data. External input of current network status 26 produces information for evaluating the traffic condition of the network before respective nodes output a series of packet data. The number of packets of series data subject to a routing in the originating node and adjacent nodes along with the information shown in FIG. 5 is included in such packet data.

The operation of the threshold value element, for example, the operation of assigning a neuron to the input link and output link one by one, is the same as that shown in FIG. 5. The packet number of a series of data to be moved at a time without being divided in a network, such as image data, is communicated between adjacent nodes. Based on this information, the transmission direction of a series of data at respective nodes 21 is determined in real time using the interaction of threshold value elements 22, thereby enabling the packet of a series of data to be transmitted.

Respective nodes transmit as a block a series of data maintained in the nodes as a plurality of packets. Then at the next timing, the output direction is selected such that data is prevented from concentrating at a specific node, and such that the data is transmitted closest to the destination node. This is achieved by minimizing the objective function which is determined such that the state of minimizing the objective function is minimized corresponding to the state in which the network is balanced, thereby enabling the network to be adapted to the change of load in the network, decreasing the number of routing processes and further selecting the output path through which respective data approaches closest to the destination node. As a result, the packet delay time within the network can be suppressed and becomes short.

The objective function $\phi$ of the network is defined with regard to the second embodiment as follows:

$$\phi = C_1 \sum_X^N \left( P_X + \sum_Y^N J_Y A_{XY} V_{XYZ} - J_X \sum_Y^N A_{XY} V_{XY1} - P_M \right)^2 + C_2 \sum_X^N \sum_Y^N d_Y A_{XY} V_{XY1} + C_3 \sum_X^N \left( \sum_Y^N A_{XY} V_{XY1} - \Theta_X \right)^2 + C_4 \sum_X^N \sum_Y^N (A_{XY} V_{XY1} - A_{XY} V_{YXZ})^2 \quad (9)$$

where $P_X$ represents the number of packets currently in node X, $P_M$ is the average value of the number of the packets of respective nodes within the whole network, $J_X$ is the number of packets in a series of data which is subjected to a routing within node X, and $J_Y$ represents the number of packets subjected to a routing at adjacent node Y. $d_Y$, $\theta_X$, $A_{XY}$ and respective items have the same meaning as in the equation (6).

The synaptic interconnection is obtained by making objective function $\phi$ correspond one by one to the energy functions E. The synaptic interconection generally corresponds to a product ($V_{YYZ} V_{X'Y'Z'}$) of the ouputs from two nodes. The routing which is the object of the problem, includes the number of packets $J_X$ and $J_Y$ as parameters. An external input to respective neurons can be given by obtaining a coefficient of $V_{XY1}$ and $V_{XY2}$ as follows.

Neuron $V_{XY1}$(output side):

$$\{C_1 J_X (P_X - P_M) - C_2 d_Y/2 + C_3 \Theta_X\} A_{XY} \quad (10)$$

Neuron $V_{XY2}$(input side):

$$-C_1 J_Y (P_X - P_M) A_{XY} \quad (11)$$

Therefore, in the control unit of respective nodes within the network, the above external input is input to respective neurons of the originating node upon transmitting a head packet of a plurality of packets constituting a series of data. Namely, the packet number $J_X$ transmitted from the originating node and the packet number $J_Y$ transmitted from the adjacent node are input to the respective neurons as a weighting constant of a combination relationship.

Figure 16:
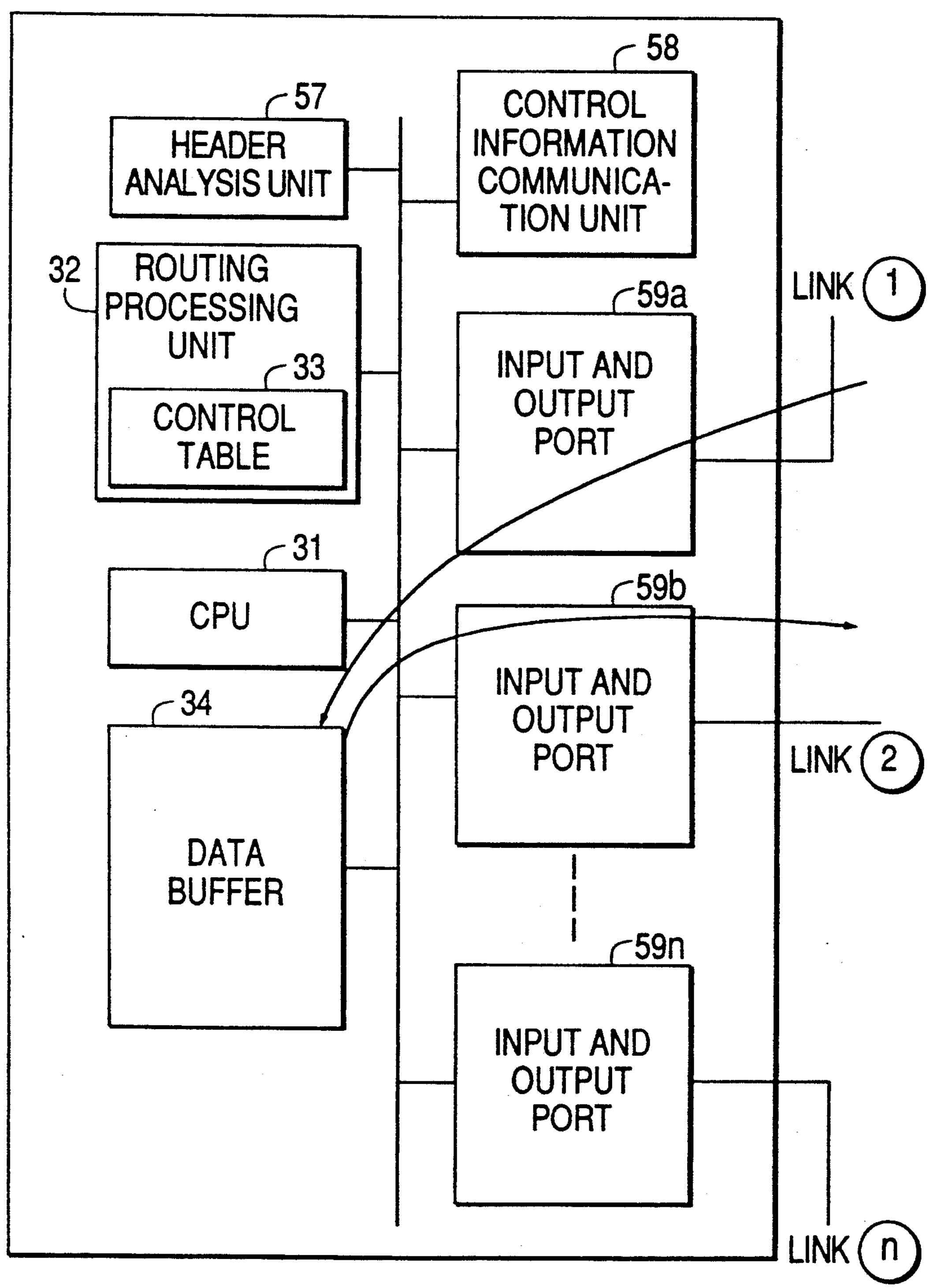
FIG. 16 shows a block diagram of the structure of the nodes in the second embodiment of the present invention.

FIG. 16 shows a block diagram of the node of the second embodiment of the present invention. The node comprises CPU 31, routing processing unit 32 for performing an actual routing processing, control table 33 for storing the distance from the originating node to the destination node as the number of relay links, namely, the number of hops, header analysis unit 57 for analyzing a header of the packet, control information communication unit 58 for communicating, between the originating node and the destination node, the number of packets comprising a series of data which should be output next, data buffer 34 for temporarily storing the packet data, input and ouput ports 59*a*, 59*b* . . . 59*n* for being provided to correspond to a link to the adjacent nodes. The content of control tables 33 is the same as in FIG. 11.

For example, header analysis unit 57 obtains destination information which shows the destination node of all the packets comprising a series of data and the number of packets in a series of data from the head packet of a series of data received by input and output port 59*a* through link (1) and the packets are stored in data buffer 34. The series of data is produced in a burst manner and is divided into a plurality of packets at the terminal. The head packet of the series of data represents the number of packets showing how many packets the series of data is divided into. The extracted packet is set in control information communication unit 58 within the originating node. A plurality of packets following the head packet is not subjected to the above operation and is automatically stored in data buffer 34.

Figure 17A:
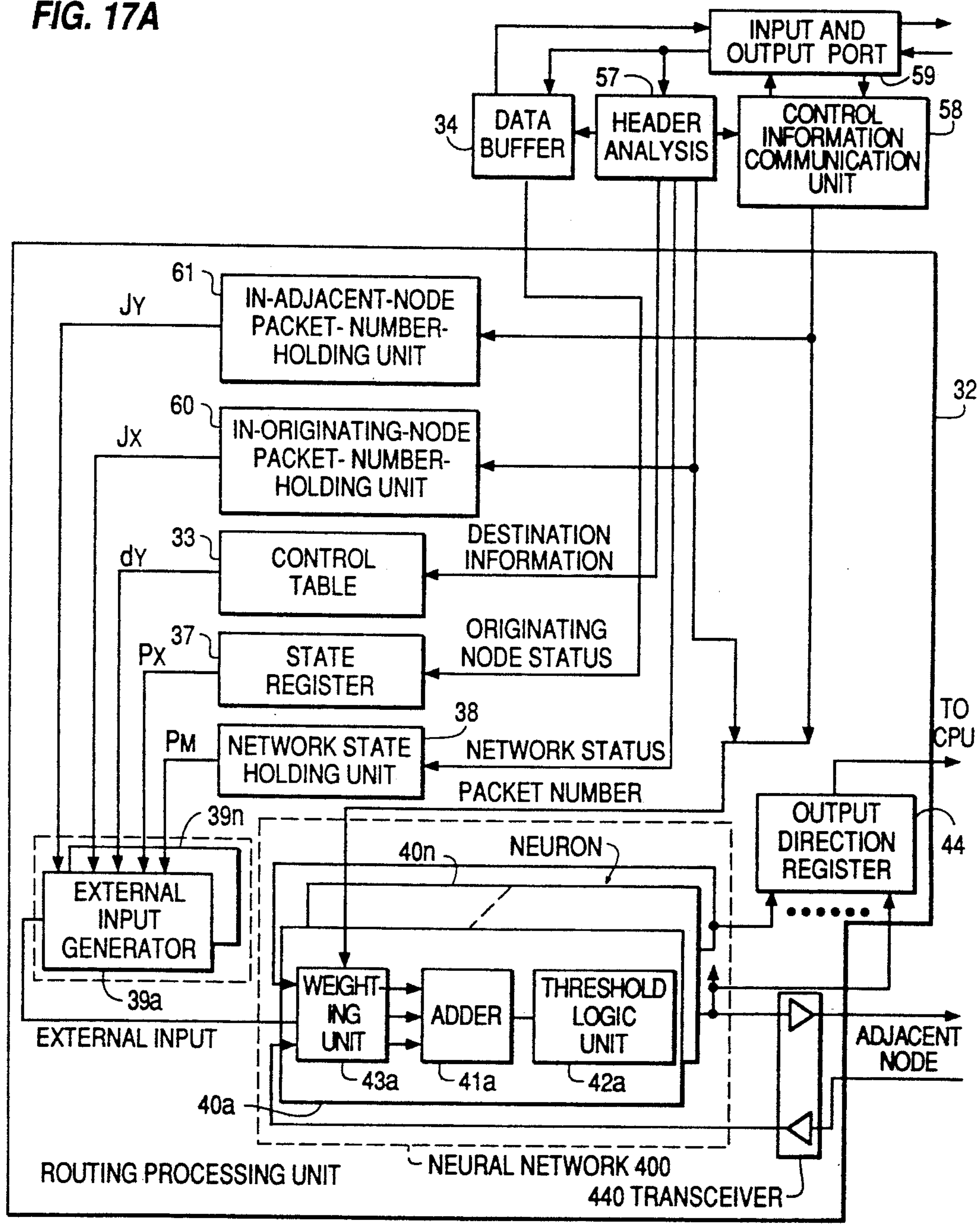
FIG. 17A shows a structural view of the routing unit of the second embodiment.

FIG. 17A shows a structural view of the routing unit of the second embodiment. The structure of routing processing unit 32 is the same as that of the first embodiment shown in FIG. 12A except that packet number maintaining unit 60 for maintaining the packet number $J_X$ which is the subject of a routing in the orginating node is added, and packet number maintaining unit 61 for maintaining the packet number $J_Y$ which is the subject of a routing in adjacent node Y is also added.

Header analysis unit 57 extracts the destination information and the number of packets in a series of data from the head packet received by input and output port 59 and the packets are stored in data buffer 34. The number of extracted packets is set in the originating node packet number maintining portion 60, weighting unit 43a for the threshold value element and control information communication unit 58.

Figure 17B:
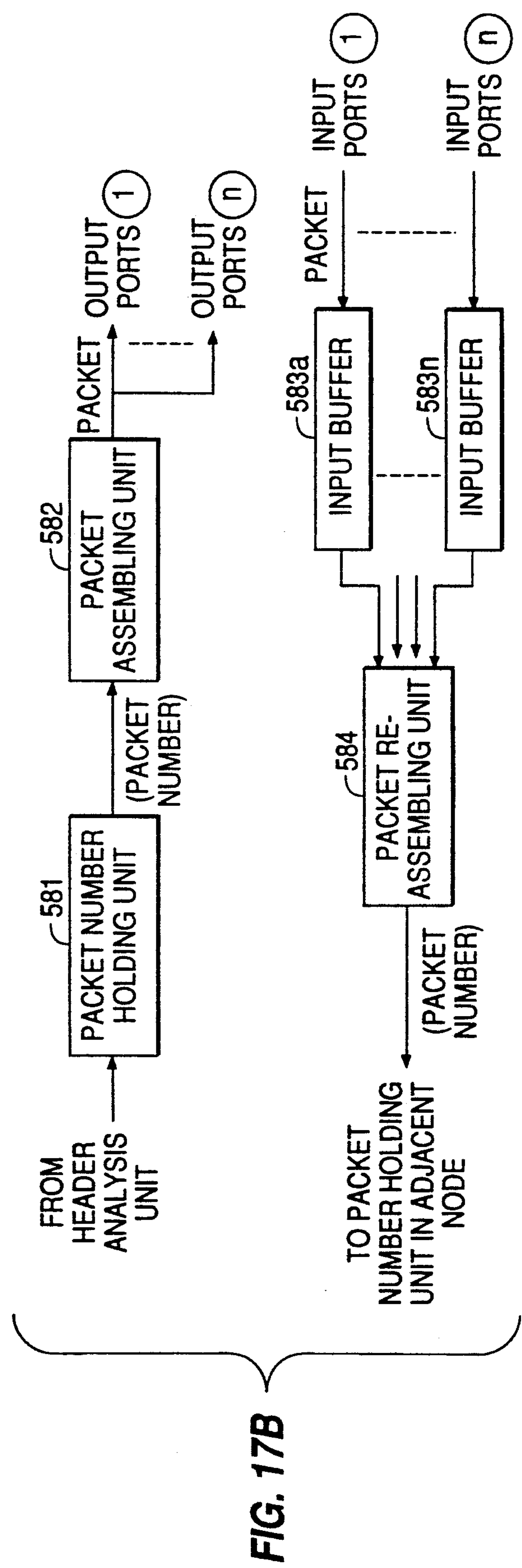
FIG. 17B shows a structural block diagram of the control information communication unit.

FIG. 17B is a structural block diagram of a control information communication unit. Packet number holding unit 581 receives the packet number from header analysis unit 57 and the value stored in packet number holding unit 581 is converted to a packet format by packet assembling unit 582. It is then transmitted to respective output ports within input and output ports 59. The packets received by input and output ports 59 are stored in input buffers 583*a* to 583*n* corresponding to respective input ports, and are thereafter input to packet reassembling unit 584. Therefore, the number of packets in a series of data for which adjacent respective nodes perform a routing is stored in adjacent node packet number holding unit 61 and weighting units 43*a* to 43*n* within respective neurons.

In FIG. 17A, designation information extracted from header analysis unit 57 is used to search control table 33 to obtain the number of hops from the adjacent node to the destination node for respective neurons which are input to external input generators 39*a* to 39*n*. The status of the originating nodes (the number of obtained packets $P_X$) stored in the state register 37 is input to respective external input generators 39*a* to 39*n* of corresponding neurons. The state information of respective nodes (the number of maintained packets) periodically transmitted from all the nodes in the network are subjected to addition and averaging to provide values which are input to combining external input generators 39*a* to 39*n*. External input generators 39*a* to 39*n* have a structure similar to FIG. 12B. External input of equations (10) and (11) are obtained by using packet numbers $J_X$ and $J_Y$ which are subject to a routing between the originating node and adjacent nodes.

Respective threshold logic 40*a* to 40*n*, namely, the neuron in FIG. 17A, repeat an interaction which is similar to that in FIG. 12A. The status of neurons are exchanged and the outputs of respective neurons reach the balanced state, namely, a stable state, within an extremely short time. At this time, the output port corresponding to the output neuron which produces only one output "1" is considered as the output direction of the head packet and the following packets. The direction represents how the series of data to be subjected to a routing should be moved to prevent data from concentrating at a specific node and to enable the series of data to approach the destination node. The following packets are transmitted to the output port, depending on the value stored in output direction register 44, without going through routing processing unit 32 and without any condition. Therefore, the value of the output register 44 is fixed until the whole series of packets is output.

FIG. 18 is a flow chart showing a packet output operation of node X in the second embodiment, performed by CPU 31. The head packet is obtained from data buffer 34 at S62 and the packet number $J_X$ is read out from head analysis unit 57 at S63. Next, the number of the packet is notified to the adjacent node through control information communication unit 58 and input and output port 59 at S64. The number of the packet $J_Y$ which is the subject of routing at the adjacent node is received from the adjacent node at S65. At S66, control table 33 is searched from the destination address within a head packet and the number of hops $d_Y$ via respective adjacent nodes is obtained.

$d_Y$ is obtained from control table 33, $P_X$ from state register 37, and $P_M$ from network state holding unit 38 at S67. The external input of the equations (10) and (11) is set at output side neuron $V_{XY1}$ and input side neuron $V_{XY2}$, respectively, at S68. The packet numbers $J_X$ and $J_Y$ are set as constants at S69.

Thereafter, control network 25, shown by a solid line in FIG. 15, is activated and an antonomous operation is conducted by an interaction between neurons. As a result of the operation, if the output of respective neurons are judged to be stable at S71, the packet of a series of data stored in data buffer 34 are outputted in a direction corresponding to $V_{XY1}=1$, namely, the optimum direction Y in which the energy function E becomes a minimum.

In the second embodiment, it is assumed that the routing of the packet of a series of data is conducted synchronously with regard to all the nodes, but it is thought that in practice the routing is conducted synchronously with regard to respective nodes. There exists a case in which when a certain node is about to perform a routing processing of the head packet of the series of data, the adjacent node has already completed routing processing of the head packet and sequentially produces the following packets. In this case, the number of packets in the series of data obtained from the adjacent node is equal to the number of packets of the data sequentially and currently outputted from the originating node. The output of the adjacent node is fixed at "1". Thus, the neuron of the originating node recognizes that the neuron of the adjacent node has reached a stable state and operates to stabilize the other neuron. Thus, neurons whose states as a whole are stable become adaptable to the load of a network in which packets sequentially outputted by adjacent nodes are input.

Adaptive routing according to the third object of the present invention, namely, an adaptive routing where a fault occurs and thus the network changes further, is explained by referring to the third embodiment of the present invention.

Figure 19:
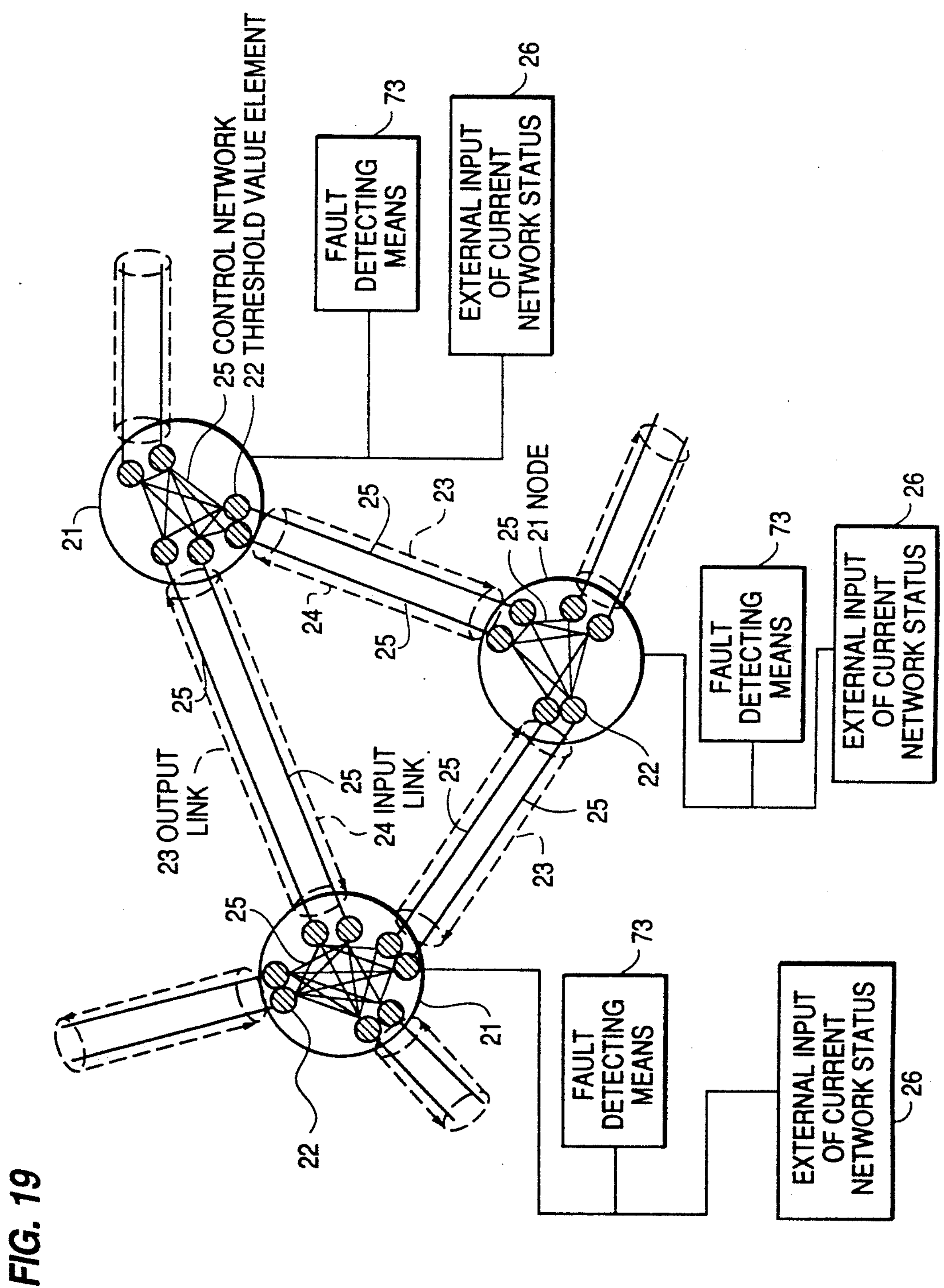
FIG. 19 shows a principle of the third embodiment of the present invention.

FIG. 19 is a principle diagram of the third embodiment of this invention. Fault detecting means 73 added to FIG. 5 detects a fault occurring in any of a plurality of nodes adjacent to the originating node, output link 23, which connects the adjacent node to the originating node, or input link 24. Then, both the input value to the threshold logic element 22 corresponding to the input link 24 from the direction of a portion where a fault has occured and the output value of threshold logic element 22 corresponding to output link 23 toward the direction of a portion where the fault has occured are made "0". Thus, both the input and output values are fixed. This "0" fixing is conducted to realize the routing of the packet to avoid the portion in which the fault occurrs. Fault detecting means 73 releases the designation upon correcting the fault.

The operation of external input of current network status 26 and respective threshold logic elements 22 are similar to those shown in FIG. 5.

The following constraints are considered. The input to threshold logic element 22 corresponding to input link 24 is transmitted from the portion in which the fault occurrs, to the threshold logic element 22 corresponding to the input link 24, and the output from threshold logic element 22 corresponding to the output link 23 is transmitted to the portion in which the fault occurrs, and both such input and output are compulsorily fixed at 0. In other words, the input and output of threshold logic element 22 relating to the fault is fixed at 0 and the portion in which the fault occurs is not selected as a route. Under such constrains the optimum transmission direction of the packet at respective nodes is determined in real time from a mutual operation of threshold logic element 22. This enables a packet communication to be conducted. Respective threshold value elements 22 add the input from external input of current network status 26, the outputs from the originating element and the adjacent threshold value elements 22 within control network 25 after a weighting process and perform threshold value processes to provide outputs of "0" or "1". This operation is conducted repeatedly and, as a result, the output ports assigned threshold logic element 22 having the output "1" at a balanced state of the network are determined as the direction in which the packet from the originating node is output.

When respective nodes successively transmit single packets at a certain time, an output direction is selected to prevent the data from being concentrated at a specific node and from becoming close to the destination node at a following time. Therefore it is necessary to determine the objective function such that a state in which the objective function is minimized complies with the balanced state of the network. Thus, it is possible to select the optimum output path which is adaptive to fault occurrence in the network and in which respective data become close to the destination node.

The objective function of the network of the third embodiment is similar to equation (6) and the external input is similar to the equations (7) and (8).

The structure of the node is the same as that of FIG. 9, except that a fault detecting unit is connected to an internal bus where the fault detecting unit detects a fault within the originating node and detects a fault in the adjacent node (including the input and output link) based on the contents of the packet received by packet processing unit 36 in FIG. 9, and that routing process unit 33 is partly different as is later described. The content of control table 33 is the same as that in FIG. 11.

Figure 20B:
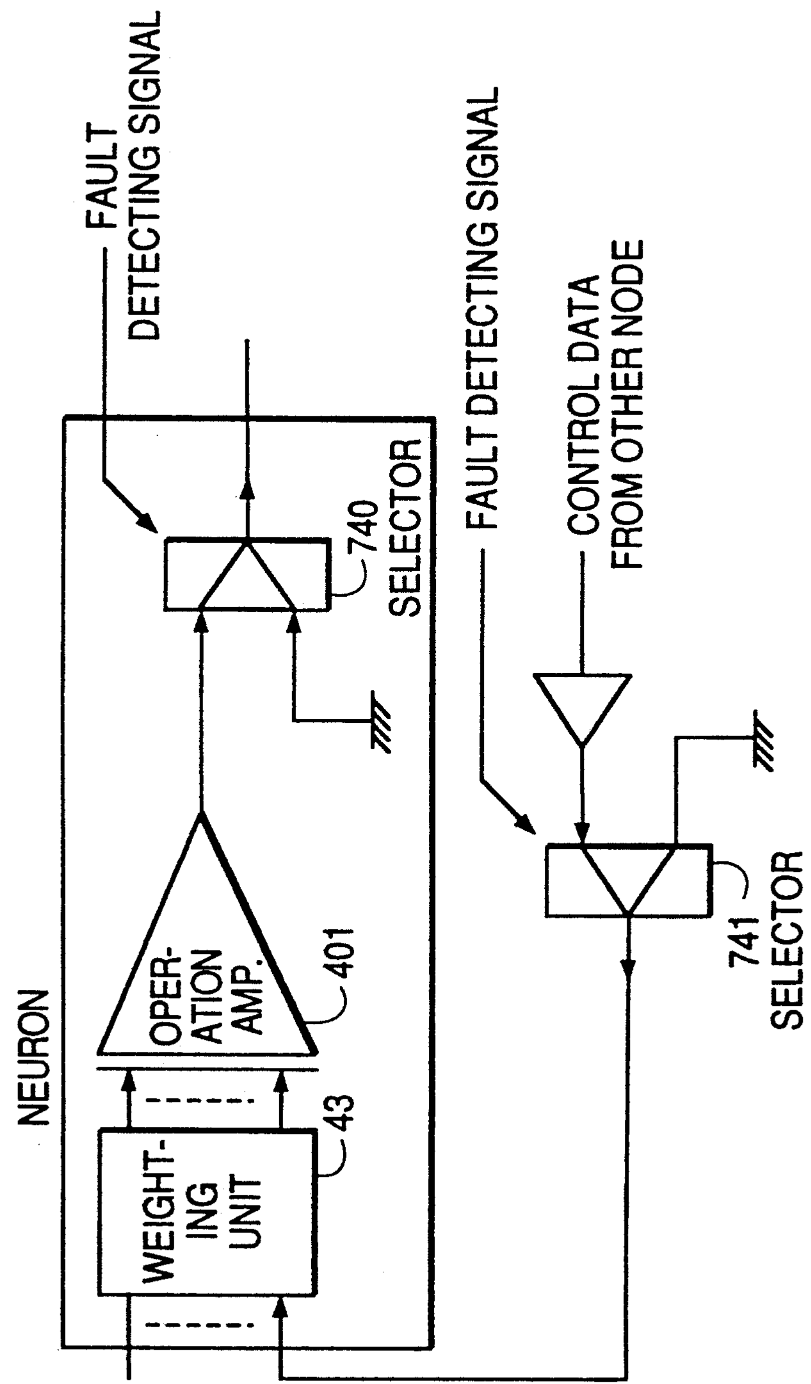
FIG. 20B shows a block diagram of an input and output reset circuit of a neuron upon detection of a fault.

FIG. 20A shows a routing processing unit of the third embodiment of. This is similar to the first embodiment shown in FIG. 12A except that a fault detection signal is input to respective neurons 40*a* to 40*n* from fault detection unit 74 provided externally from routing processing unit 32. A neuron input and output reset circuit is provided on the input and output side of respective neurons 40*a* to 40*n* as shown in FIG. 20B, and unlike as in FIG. 12A. Selectors 740 and 741 are provided on the output side of respective operation amplifiers 401*a* to 401*d* within a neural network as shown in FIG. 12C. The fault detection signal from fault detection unit 74 compulsorily switches the input and output of the neuron corresponding to the input and output link connected to the node from which the fault is detected to be 0 by switching to the earth side of selectors 740 and 741. The fault detecting unit 74 detects the fault of the adjacent node side (including a link) based on a content of a packet from the adjacent node when the content of the packet is input to packet process unit 36. As a result, the input to be transmitted from the the direction of the fault in a network, and the output to be transmitted to the the direction of the fault are both fixed at 0 on control network 25.

When a fault occurs in the originating node, the fault detection signal from fault detecting unit 74 switches selector 740 provided on the output side of the respective neurons to the earth side, thereby fixing the neuron output to the adjacent node at "0".

The contents of the output direction register 44 are similar to that shown in FIG. 13, showing the output direction of the packet from the originating node under the condition that the fault detecting unit 74 fixes to "0" with the input and output of the neuron corresponding to the input and output link in the direction of the fault occurrence. The flowchart of the output operation of the packet at node X is the same as that in FIG. 14.

The fourth embodiment of this invention will now be explained. This embodiment realizes the fourth object, namely, adaptive routing in a packet exchange network using a virtual call method.

Figure 21:
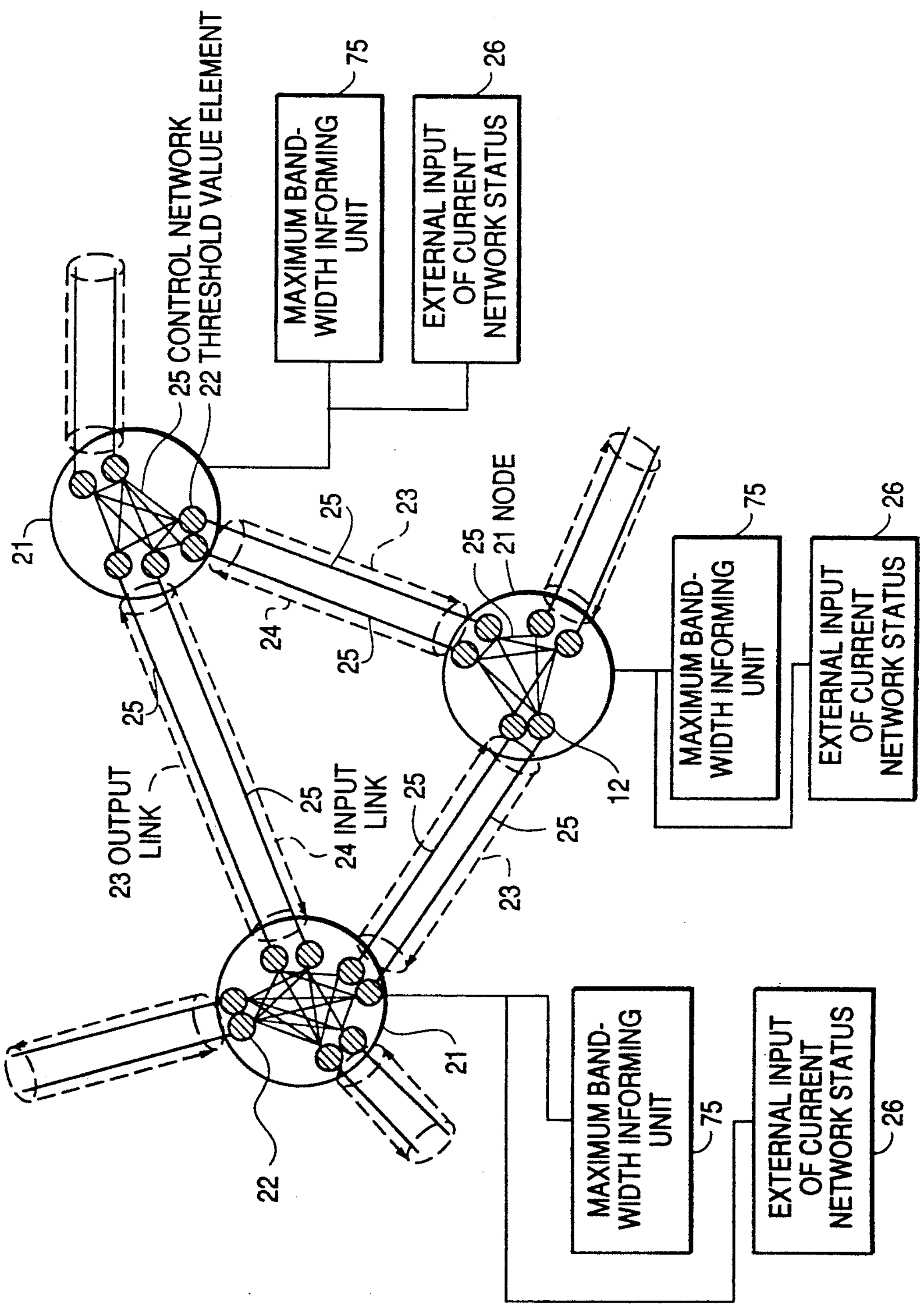
FIG. 21 shows a principle of the fourth embodiment of the present invention.

FIG. 21 shows the principle of the fourth embodiment. Maximum bandwidth communicating unit 75 is added to the embodiment shown in FIG. 5. This unit 75 communicates information designating the maximum bandwidth used for a communication set up by setting up packets used for a virtual call which should be outputted next from the originating node between adjacent nodes. The information showing the maximum bandwidth used for communication is added, for example, to a setting-up packet at the terminal side. The present embodiment uses the sum of maximum bandwidths assigned to a virtual call in respective nodes constituting a network as an index for evaluating the traffic condition in the packet exchange network using the virtual call method. For example, a maximum bandwidth of 64 Kbps is provided to a setting-up packet of the voice communication and a maximum bandwidth of 384 Kbps is provided to compressed movable image data communication. The sum of the maximum bandwidths used for respective communications is obtained, thereby clarifying the allowance in the band range which respective nodes can use.

External input of current network status 26 inputs, to the respective threshold logic elements 22 as before-output network information for a setting-up packet, information for evaluating the traffic condition of the network after the output of the packet, such as the sum of the maximum bandwidths assigned to the virtual call in the originating node, the destination information of a setting-up packet to be transmitted, the maximum bandwidth assigned to the setting-up packet which is subject to routing in adjacent nodes, or the average value of the sums of the maximum bandwidth assigned to the virtual call in all the nodes in the network.

As shown in FIG. 21, where a plurality of virtual calls is set up in the network, the maximum bandwidth assigned to the setting-up packet to be transmitted from respective nodes is communicated by maximum bandwidth informing means 75. The transmission direction of the set-up packet maintained by the respective nodes is determined in a real time by interaction between threshold logic elements 22, based on the sum of the maximum bandwidths of the virtual calls assigned to respective nodes and the maximum bandwidth information obtained from maximum bandwidth informing means 75. This enables the virtual call path to be obtained. Respective threshold logic element 22 adds the input from external input of current network status 26, the output of the adjacent threshold logic element 22 and the originating node in control network 25 after a weighting process and an output of "0" or "1" is determined after threshold value processing. By repeating this process, the output port to which the threshold logic element 22 (i.e. output neuron) having an output value of "1" in the balanced state in the network is assigned as the output direction of the setting-up packet.

When respective nodes transmit their setting-up packets at a certain time, the objective function is minimized such that the bandwidth assigned by the virtual call at the certain time is not concentrated at a predetermined node and the setting-up packets become closest to the destination node. The objective function is determined such that the state in which the objective function is minimized complies with the balanced state of the network. Therefore, that output link is selected, which is adaptive to the fault and busy status of the network and which enables respective setting-up packets to approach the destination node, thereby determining a virtual call path which can be adapted to a network state.

The objective function $\phi$ in the network in the fourth embodiment is determined to be similar to that of FIG. 5. The fourth embodiment is different from the embodiment shown in FIG. 5 in that the packet to be moved is a set-up packet and the load distribution within the network is evaluated as the distribution of the sum of maximum bandwidths assigned to virtual calls at respective nodes. The evaluation function $\phi$ is expressed in the following relation, $$\phi = C_1 \sum_X^N \left( B_X + \sum_Y^N S_Y A_{XY} V_{XYZ} - B_M \right)^2 + C_2 \sum_X^N \sum_Y^N d_Y A_{XY} V_{XY1} + C_3 \sum_X^N \left( \sum_Y^N A_{XY} V_{XYZ} - \Theta_X \right)^2 + C_4 \sum_X^N \sum_Y^N (A_{XY} V_{XY1} - A_{XY} V_{YXZ})^2 \quad (12)$$

where $B_X$ is the sum of the maximum bandwidth assigned to the virtual call at repsective nodes, $B_M$ is the average value of the sum of the maximum bandwidth in all the nodes within the network, and $S_Y$ is the maximum bandwidth assigned to the set-up packet which is subject to routing in adjacent nodes Y. The meanings of $d_Y$, $\theta_X$ and $A_{XY}$ are the same as in the equation 6.

The first term of the equation represents how much larger the sum of the bandwidths required for transmitting a set-up packet from node X to other nodes and receiving from other nodes, a set-up packet to which the maximum use band $S_Y$ is assigned, is than the sum of bandwidths assigned to virtual calls at respective nodes in the network, namely, the total of the distribution of sum of the maximum bandwidth within the whole network. The meaning of the second, third and fourth terms are the same as in equation (6).

Next, the synaptic interconnection corresponds to the term comprising the product of the outputs from two nodes. The routing to be obtained is determined by the parameter of the maximum bandwidth $S_Y$ added to a setting-up packet, which is the subject of the routing at adjacent nodes. The external input provided to respective neurons is given as follows by obtaining a coefficient of $V_{XY1}$ and $V_{XY2}$.

Neuron $V_{XY1}$ (output side):

$$\{C_2 d_Y/2 + C_3 \Theta_x\} A_{XY} \quad (13)$$

Neuron $V_{XY2}$ (input side):

$$-C_1 S_Y (B_X - B_M) A_{XY} \quad (14)$$

Therefore, in a control unit controlling respective nodes within the network, upon moving the set-up packet, the above described external is input to respective neurons within the originating node and the maximum bandwidth $S_Y$ assigned to the set-up packet maintained in adjacent nodes is also input to them as a constant of the synaptic interconnection.

Figure 22:
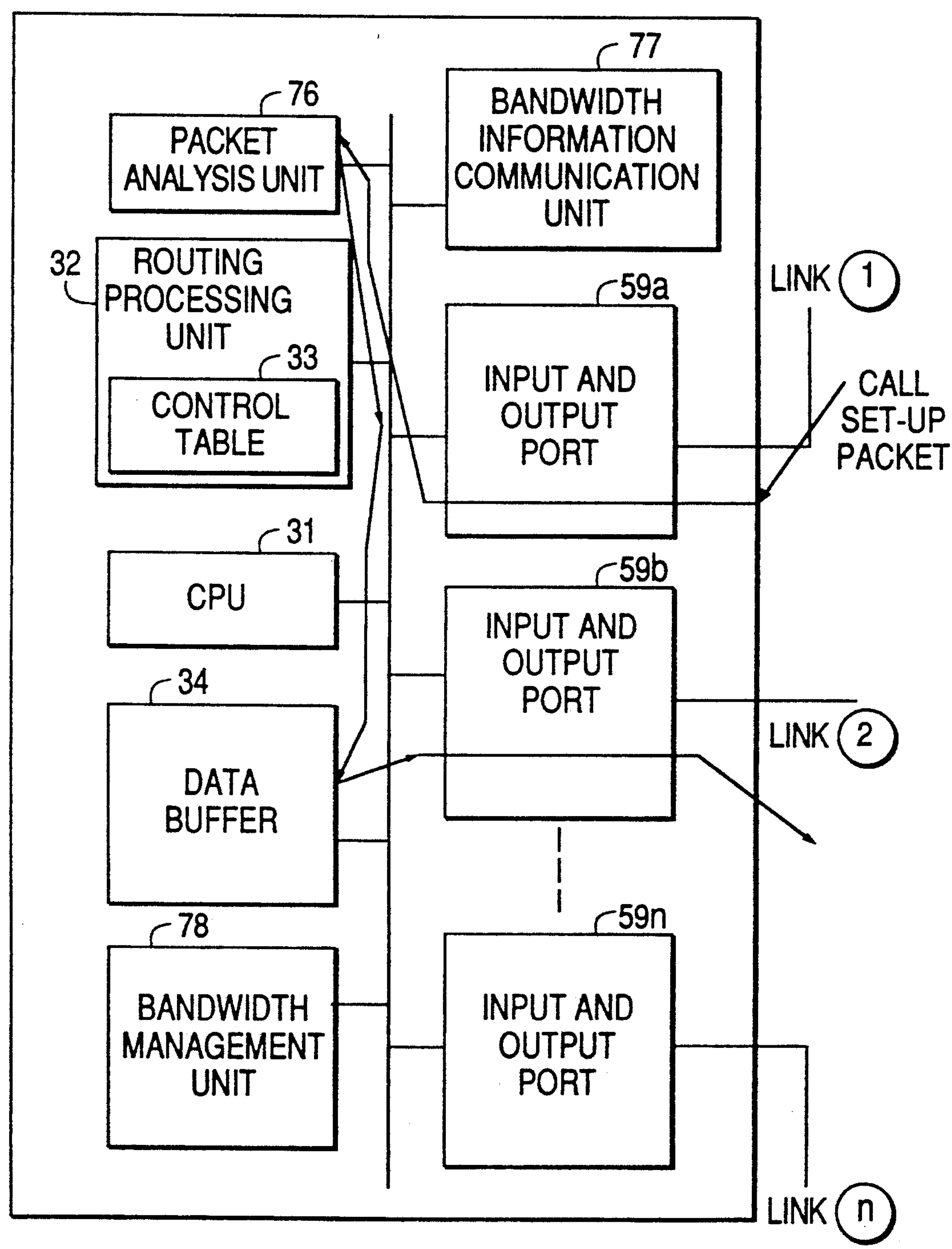
FIG. 22 shows a block diagram of the node structure of the fourth embodiment.

FIG. 22 is a block diagram showing the structure of the node in the fourth embodiment. This structure is similar to the second embodiment of FIG. 16, but it differs in that packet analysis unit 76 is provided in place of head analysis unit 57, band information communication unit 77 is provided in place of control information communication unit 58 and further, band management unit 78 is added. Packet analysis unit 76 extracts the destination information and the maximum use band from the set-up packets. Bandwidth information communication unit 77 communicates the maximum bandwidth, assigned to the set-up packet to be next outputted between the other node and the present node. Bandwidth management unit 78 manages the maximum bandwidth assigned to a virtual call at the originating node to be managed per call. The structure of band information communication unit 77 is similar to that of the control information communication unit shown in FIG. 17B. Bandwidth information communication unit 77 differs from the control information communication unit shown in FIG. 17B only in that, in place of the number of packets which are a subject of the routing, the maximum bandwidth to which the set-up packet is assigned, is assembled into the packet type between the adjacent nodes and communicated between each other.

Packet analysis unit 76 extracts the destination information representing the destination nodes of the set-up packet and the maximum bandwidth from the set-up packet received from input and output ports 59a through a link (1) and the maximum bandwidth is set by band information communicating unit 77 within the originating node. The maximum bandwidth used for communication set-up is assigned at the terminal side. The set-up packet is stored in data buffer 34 until the output path is determined. The content of control table 33 is the same as in FIG. 11.

Figure 23:
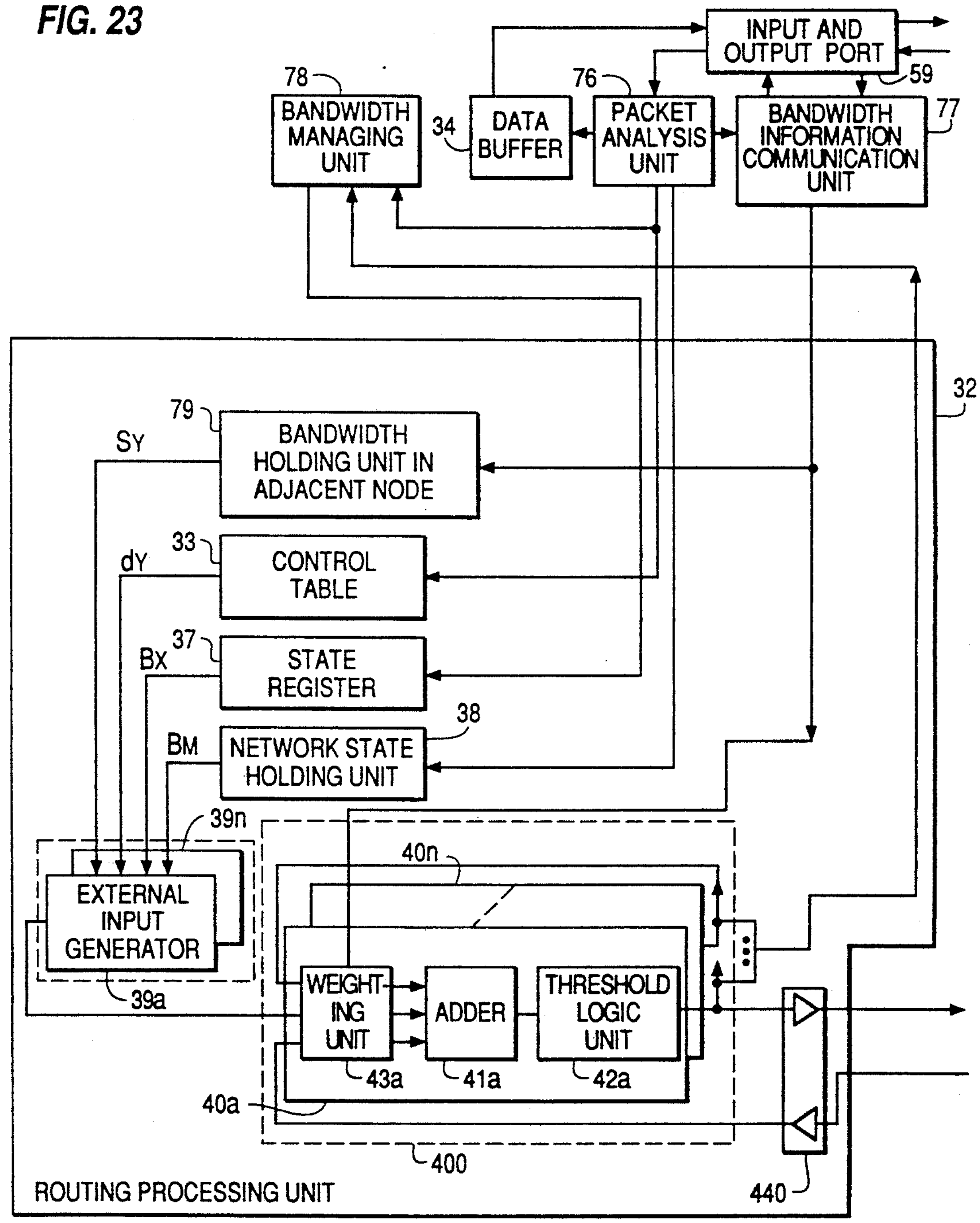
FIG. 23 shows a structure of the routing processing unit in the fourth embodiment.

FIG. 23 shows a structural block diagram of an embodiment of routing processing unit 32. Routing processing unit 32 comprises control table 33 for storing the number of hops $d_Y$ from the originating node to the designating node; unit 79 for maintaining a bandwidth used in adjacent nodes to maintain the maximum bandwidth applied to a set-up packet which is subjected to a routing in an adjacent node; state register 37 for designating the sum $B_X$ of the maximum bandwidth assigned to a virtual call in the originating node; network status holding unit 38 for maintaining the average value $B_M$ of the sum of the maximum bandwidth assigned to a virtual call at respective nodes in the whole network; external input generators 39a to 39n for combining $S_Y$, $d_Y$, $B_X$ and $B_M$ as external inputs (corresponding to respective neurons as $S_Y$ and $d_Y$ differ depending on the neuron); n threshold value elements, namely, neurons 40a to 40n, in a node; an addition unit for performing an addition processing in respective neurons, such as addition unit 41a within the neuron 40a; threshold logic unit 42a for performing threshold value processing; and weighting unit 43a for weighting the input to the addition unit of the threshold element.

Packet analysis unit 76 extracts the destination information and maximum bandwidth from a setting-up packet received by input/output port 59. The packet is stored in data buffer 34. The extracted maximum bandwidth is set in bandwidth information communication unit 77, which assembles the set maximum bandwidth into a packet and transmits it to input/output port 59 to inform the adjacent nodes. Bandwidth information communicating unit 77 obtains the maximum bandwidth $S_Y$ of the call set-up packet received by the input/output port 59 and is subjected to a routing by the adjacent node and sets the value of maximum bandwidth $S_Y$ in unit 79 for holding the bandwidth used in the adjacent nodes, and in weighting unit 43a. On the other hand, the number of hops from the adjacent node to the destination node in control table 33 is searched by using the destination information extracted from packet analysis unit 76 and is input to external input generators 39a to 39n corresponding to respective neurons. Further, the sum $B_X$ of maximum bandwidths at the originating node stored in state register 37, and the value of $B_M$ maintained in network state holding unit 38, namely, the value obtained by averaging the bandwidth information (the sum of the maximum bandwidth of respective nodes) in respective nodes periodically transmitted from all the nodes within the network, are input to external input generators 39a to 39n corresponding to respective neurons. The value $S_Y$ of the unit for maintaining the bandwidth used in the adjacent node is also input to external input generators 39a to 39n. External input generators 39a to 39n have structures similar to that shown in FIG. 12B. They output the external input given by equations (13) and (14).

Respective neurons repeat the mutual cooperation in a similar manner to the first embodiment and states exchanged between the neurons and their respective outputs reach a balanced, i.e., a stable state within an extremely short period. At this point, the output port corresponding to the output neuron which has only one "1" output is determined as the output direction of the setting-up packet. This direction represents how a setting-up packet to be used for a routing is moved to prevent the bandwidths used for the virtual call from concentrating at the predetermined node and to enable the setting-up packet to approach the destination node. The number of output ports of the transmitting and receiving node addresses is added to the setting-up packet and the maximum bandwidths are set in frequency band managing unit 78. After the setting-up is completed, the routing of the data packet is conducted based on the value stored in bandwidth managing unit 78.

FIG. 24 shows an example of the content of frequency band managing unit 78 provided inside respective nodes. As described above, frequency band managing unit 78 stores the addresses of the transmitting node and receiving nodes for the call setting-up, the output port number through which signals are output to adjacent nodes and the maximum bandwidth used for virtual call with regard to respective setting ups of the virtual calls provided by the originating node. By obtaining the sum of maximum bandwidths for respective virtual calls, the sum $B_X$ of maximum bandwidths at the originating nodes can be obtained.

Figure 25:
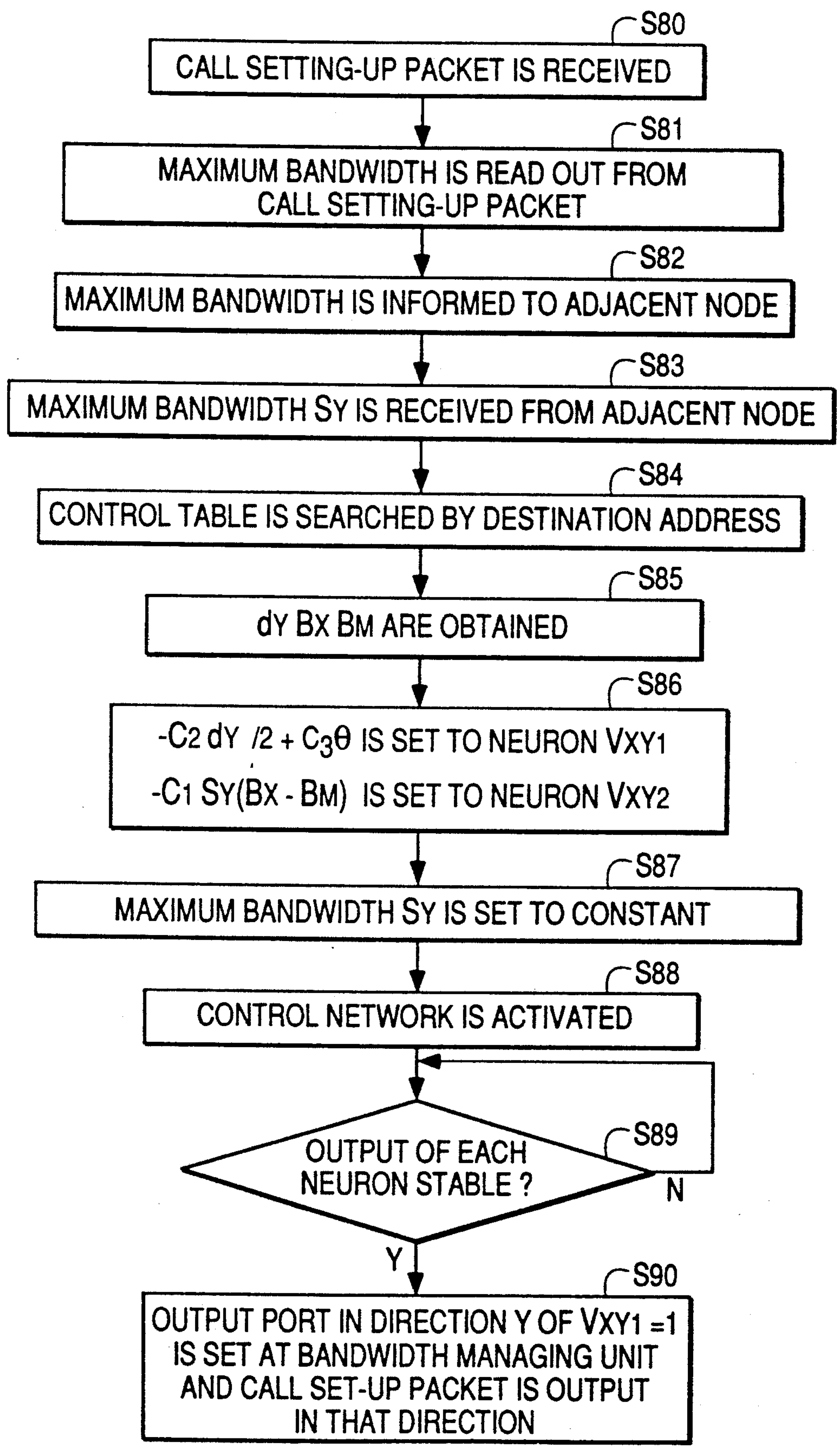
FIG. 25 shows a flowchart of the packet output operation at a node in the fourth embodiment, performed by the CPU 13.

FIG. 25 is a flowchart of the output operation of the call setting-up packet at node X in the fourth embodiment, performed by the CPU 13. Input/output port 59 receives a setting-up packet at S80 and reads the maximum bandwidth from packet analysis unit 76 at S81. The maximum use frequency band is informed to adjacent nodes through bandwidth information communication unit 77 and input/output port 59 at S82, and the maximum bandwidth $S_Y$ assigned to the setting -up packet which is a subject of a routing from one adjacent node to another is received at S83. Then, at S84, control table 33 is searched based on the destination address of the setting-up packet and transmitted from the originating node and the number of hops $d_Y$ through respective adjacent nodes is obtained at S85. $d_Y$ is derived from control table 33, $B_X$ from state register 37 and $B_M$ from network state holding unit 38. At S86, external input includes in the equations (13) and (14) the output side neuron $V_{XY1}$, and the input side neuron $V_{XY2}$. The maximum bandwidth $S_Y$ of the setting-up packet which is subjected to a routing at the adjacent node is set as the constant at S87.

Thereafter, control network 25, designated by a solid line in FIG. 21, is activated at S88 and an autonomous operation is conducted by the interaction between neurons. When, at S89, the output of respective neurons is judged to be stable at S89, the direction of $V_{XY1}=1$, namely, the output port of the optimum direction Y in which the energy function E becomes minimum (for minimum), is set in bandwidth management unit 78. A call setting-up packet in data buffer 34 is outputted in the optimum output direction Y.

The fifth embodiment of the present invention provides optimum performance in accordance with a load state of the effective node in the network and the distance of the packet to the destination node, in accordance with the fifth object of the present invention.

Figure 26:
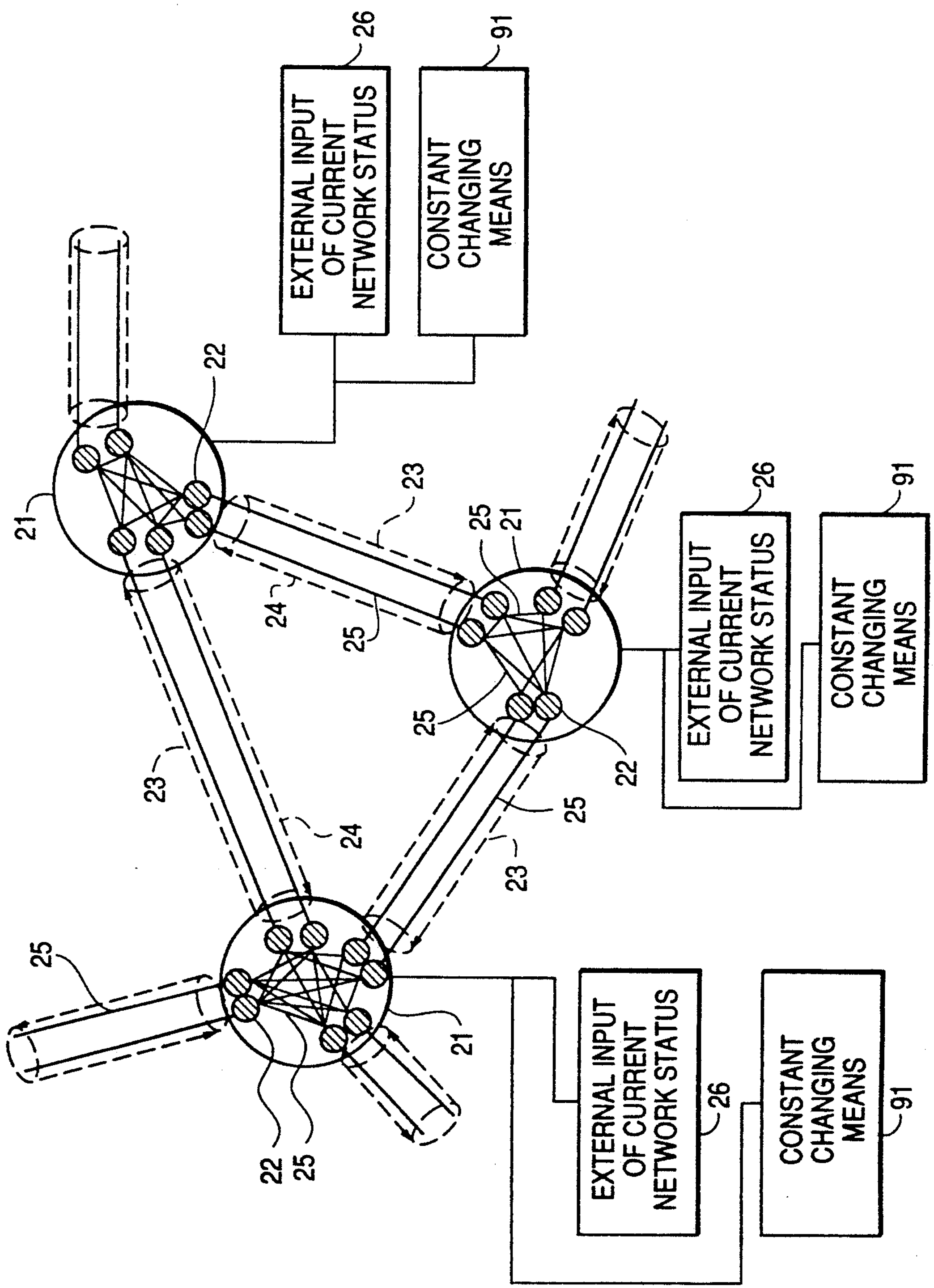
FIG. 26 shows a principle of the fifth embodiment of the present invention.

FIG. 26 shows the principle of the fifth embodiment. When respective threshold value elements 22 add the input from external input of current network status 26 to the output from adjacent threshold logic element 22 and the originating element in control network 25, constant changing means 91 added to the configuration of FIG. 5 modifies the constant in accordance with the state of the load of respective nodes in the network and the distance of the packet from the destination node.

External input of current network status 26 inputs the number of packets owned by the originating node, averages the values of the packets maintained by respective nodes in the network the number of relay links from the originating node to the destination node through respective adjacent nodes and the total value of respective relay link numbers to respective threshold logic element 22, as the information of the network state before the output in order to evaluate the traffic condition of the network. The operation of repective threshold value elements 22 in this embodiment is similar in that in the first embodiment.

Equation (6) is a basic equation in objective function $\phi$ of the network relating to the present invention. Equation (6) gives the minimum sum of the terms for distributing the network load (first term) and for producing the packet on the shortest path (second item). The relation is constant as the coefficients $C_1$ and $C_2$ are fixed. Therefore, where the load in the network is heavy, the constant for the distribution term is made larger than that for the distance term. However, where the network load is all light, the shortest path is not selected and the direction in which the loads are subjected to the average. Therefore, the packet cannot reach the destination mode easily. This causes the problem that the delay within the network increases and the information for which real-time transmission is important cannot be transmitted. In the reverse case, when the constant of the second term is made larger than that of the first term, the operation of distributing the load is suppressed and the direction in which the distance has priority is selected. Therefore, even if the network as a whole is busy, concentration of the load cannot be avoided. When similar constants are used for two terms, there is a problem that optimum performance cannot always be provided in accordance with the state of the network. Therefore, it is important to obtain the optimum output depending on the instantaneous situation of respective node units in the network and the distance to the destination of the packet, even though equation (6) for the outer input to the neuron yields a constant value irrespective of the busy situation of the network.

This embodiment is aimed at realizing a routing which can be instantaneously adapted to the state of the network without damaging the quality of information. When respective threshold value elements 22 add the sum of the products of the outputs from the originating element and adjacent threshold value element in control network 25, and the constant corresponding to the outputs, constant changing means 91 modifies the constant in accordance with the average number of packets maintained by respective nodes in the network. The sum of the relay links from the originating node to the destination node through respective adjacent nodes i.e. the sum of the relay links is input to external input of current network status 26 for obtaining the external input.

As described above, the constant is changed in accordance with the state of the network and the distance to the destination node of the packet which is subjected to a routing. Thus, the packet near the destination node selects the direction in which it becomes closest to the destination without taking an alternate route and the packet far from the destination node selects a link in a detouring direction. This ensures that the packet can be transmitted to the destination node.

In the fifth embodiment, the objective function $\phi$ is provided as shown in the following equation in $P_X$, $P_M$, $d_Y$, $\theta_X$, which are similar to equation (6).

$$\phi = C_1 P_M D_X \sum_X^N \left( P_X + \sum_Y^N A_{XY} V_{XYZ} - \sum_Y^N A_{XY} V_{XY1} - P_M \right)^2 + C_2 \sum_X^N \sum_Y^N d_Y A_{XY} V_{XY1} + C_3 \sum_X^N \left( \sum_Y^N A_{XY} V_{XY1} - \Theta_X \right)^2 + C_4 \sum_X^N \sum_Y^N (A_{XY} V_{XY1} - A_{XY} V_{YXZ})^2 \quad (15)$$

The first term of equation (15) is different from that of equation (6) in that the products of the number of the average packet and the sum of the hops to the designation node is the constant. Therefore, the constant can change depending on the state of the network and the distance. The external input to respective neurons at this time is expressed as follows.

Neuron $V_{XY1}$(output side):

$$\{C_1 P_M D_X (P_X - P_M) - C_2 d_Y/2 + C_3 \Theta_X\} A_{XY} \quad (16)$$

Neuron $V_{XY2}$(input side):

$$-C_1 P_M D_X (P_X - B_M) A_{XY} \quad (17)$$

Therefore, in the control units of respective nodes within the network, the above external input is input to respective neurons in the originating node when the packet is moved, and the sum of the average values of the number of packet maintained by respective node in the network and the number of hops to the destination node may be inputted to respective neurons in the originating node as a constant of a synaptic inter-connection.

The structure of the node in the fifth embodiment is similar to that in the second embodiment shown in FIG. 16, except that it does not use control information communication unit 58. Therefore, the drawing of the structure of the node is omitted.

FIG. 27 shows the content of control table 33 in the fifth embodiment. This is similar to that in FIG. 11 and the total number of hops from the originating node to the destination node through adjacent nodes is stored in the control table.

Figure 28:
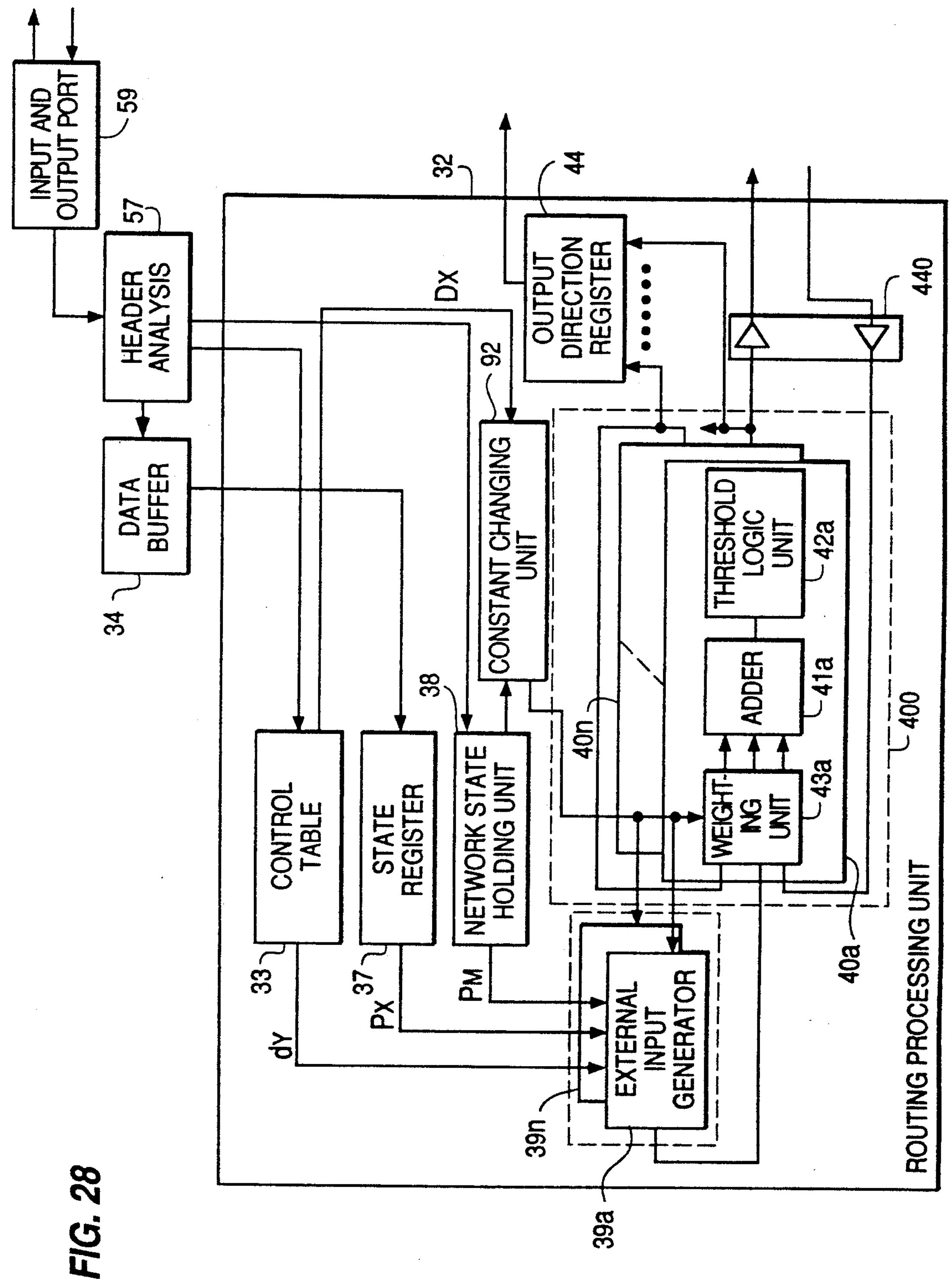
FIG. 28 shows a structure of the routing processing unit in the fifth embodiment.

FIG. 28 is a block diagram showing the structure of routing processing unit 32 in the fifth embodiment. This unit is the same as in the first embodiment in FIG. 12, except that it includes constant changing unit 92 and the output of output direction register 44 is output to CPU 31. The operation of the fifth embodiment is the same as that of the embodiment shown in FIG. 12A, except that the total $D_X$ of the number of hops from the originating node to the destination node is input to constant changing unit 92 from control table 33, such that the average number $P_M$ of packets obtained by respective nodes in the network is input to constant changing unit 92 from network state holding unit 38, and that external input generators 39*a* to 39*n* combine the external input by using the output of the constant changing unit 92. Thus, weighting unit 43 performs a weighting operation. External input generators 39*a* to 39*n* have a structure similar to that of in FIG. 12B and external inputs in equations (16) and (17) are obtained by using the sum $D_x$ of the number of hops to the destination node in addition to $P_X$, $P_M$, $D_X$ and the content of the constant register 391. The respective neurons repeat a mutual cooporation operation. Thus, a state is exchanged between the neurons and the output of the neuron reaches a stable state within an extremely short period.

At this time the output port corresponding to only the output neuron designating the output "1" is determined as the output direction of the subject packet for the routing.

Figure 29:
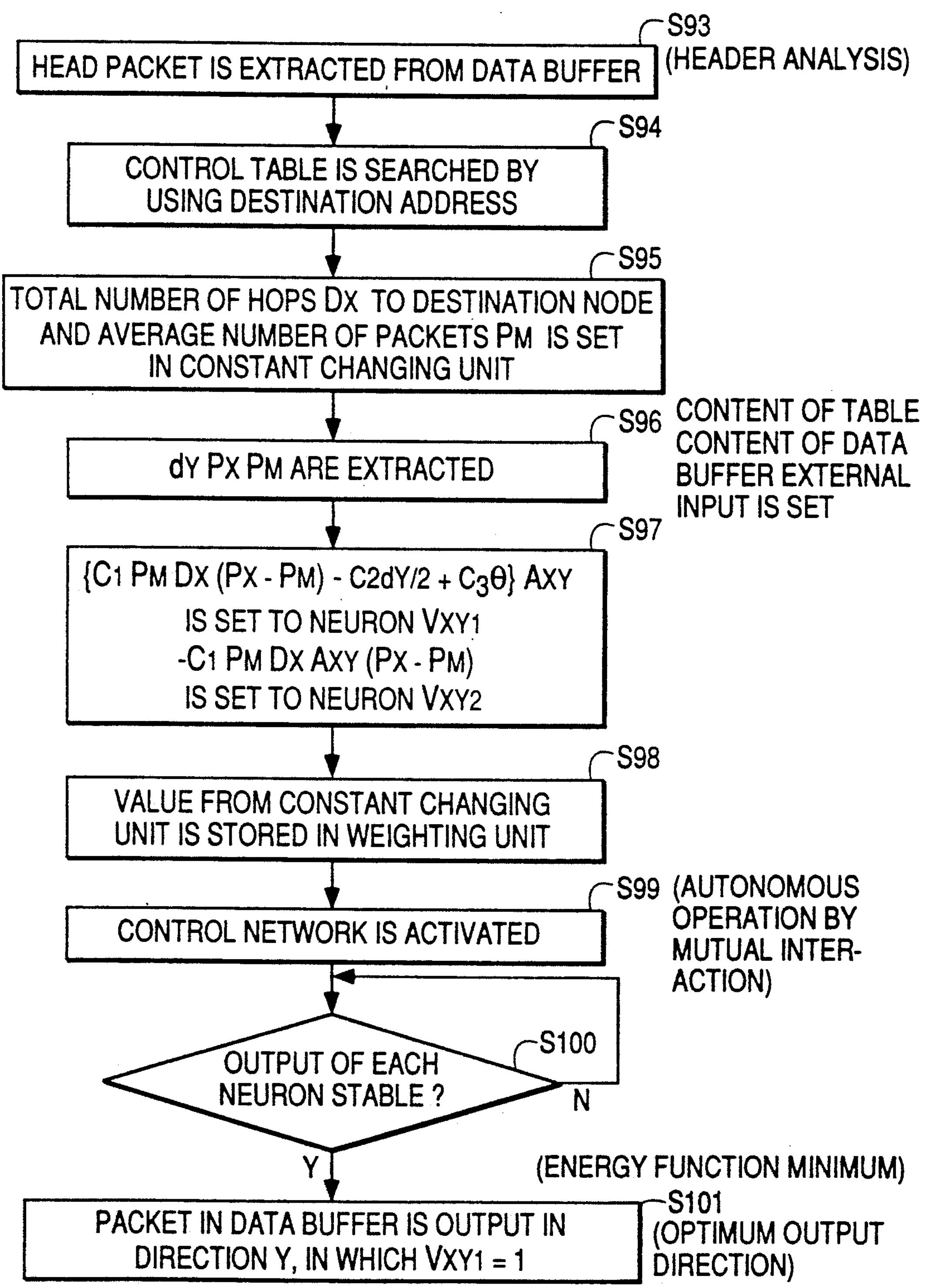
FIG. 29 shows a flowchart of the packet output operation of the node X in the fifth embodiment, performed by the CPU 13.

FIG. 29 is a flowchart of the packet output operation at the node in the fifth embodiment, performed by CPU 31. At S93, the head packet is extracted from data buffer 34 and head analysis unit 57 analyzes the header. At S94, the number of hops to the destination node is searched from control table 33 using the destination address. At S95, the total $D_X$ of the number of hops to the destination node and the average number $P_M$ of the packet are set in constant changing unit 92. At S96, $d_Y$, $P_X$ and $P_M$ are extracted from control table 33, state register 37 and network status holding unit 38, respectively. At S97, external input to equations (16) and (17) are set. At S98, the value output from constant changing unit 92 is stored in weighting unit 43. At S99, control network 25 is activated. At S100, an autonomous neuron operation is carried out using the mutual interaction of the neurons until the output of respective neurons become stable. Thereafter, at S101, the packet in data buffer 34 is output.

The sixth embodiment of the present invention for an adaptive routing in which the routing processing time is short in accordance with the sixth object of the present invention is explained.

Figure 30:
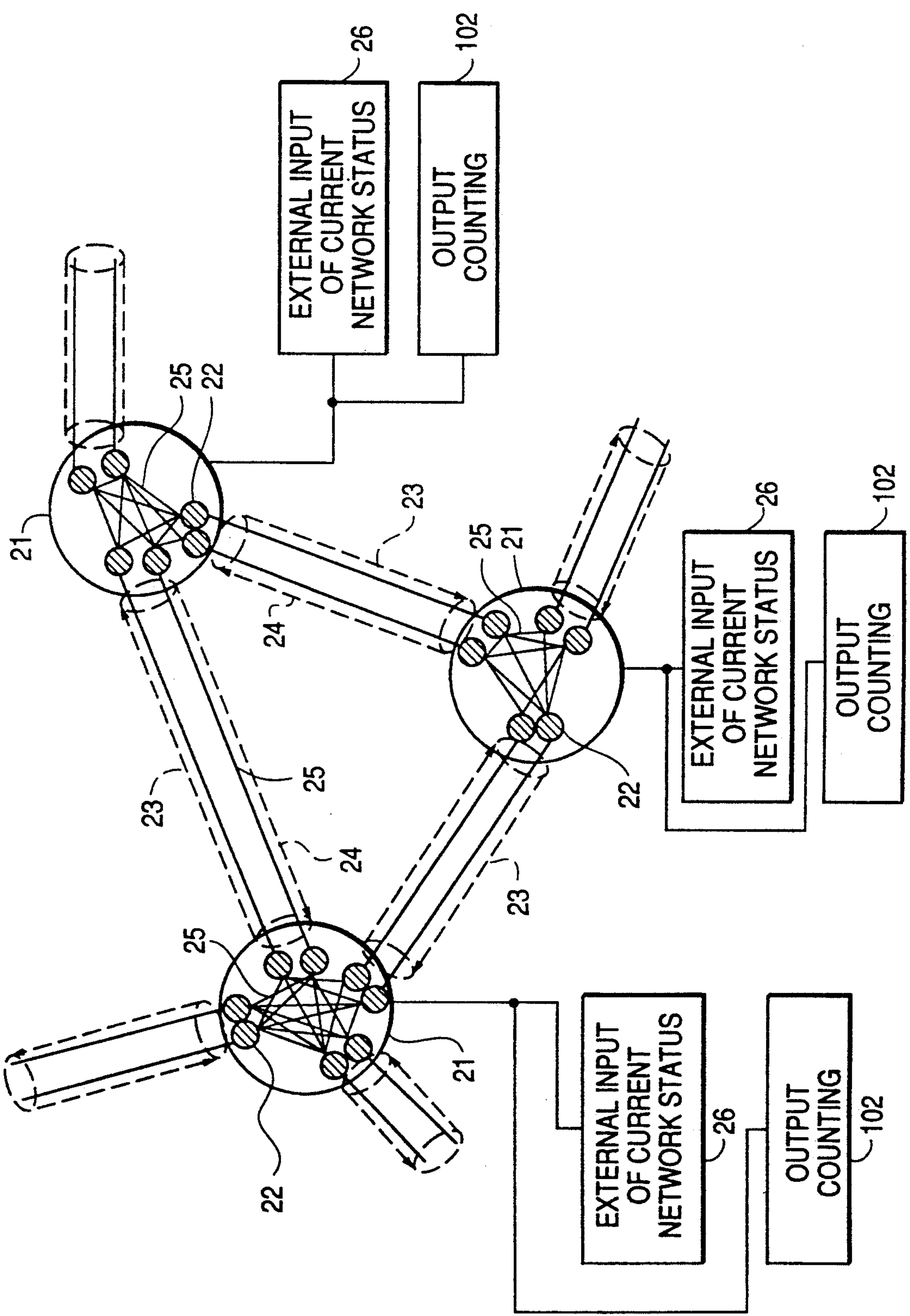
FIG. 30 shows a principle of the sixth embodiment of the present invention.

FIG. 30 shows the principle of the sixth embodiment. Output counting means 102 added to the configuration shown in FIG. 5 counts how many times the output from respective threshold value elements 22 corresponding to the output port in the nodes become "1". At this time, respective threshold logic elements 22 add the input from external input of current network status 26 to the output from the originating element and adjacent threshold logic element 22 in the control network 25 after the weighting process, and the addition result is subjected to threshold processing, thereby producing an output of "0" or "1". These operations are then repeated.

Respective threshold value elements 22 repeat the mutual interaction in a similar manner to that shown in FIG. 5, thereby producing an output "0" or "1". In the sixth embodiment, an output port corresponding to threshold value elements 22 in which the output becomes "1" most often within the predetermined time, is determined as the output direction of the packet.

When routing is started, that is, when the mutual cooperative operation of threshold value element is started, the threshold value elements in the node in a state in which the restriction condition is easily satisfied becomes stable first. That is, the threshold value element in the node in a state in which the node in the direction in which the packet is transmitted is identical to the node which receives the packet when the adjacent nodes forming the shortest path to the destination node are empty and when the threshold value element first becomes stable. Thereafter, the remaining threshold logic element becomes stable, thus satisfying the restriction condition. It may take a long time for all the threshold value elements to become stable, depending on the relation between the state of the network load and the distance to the destination node. Thus, the routing processing time should be set to a maximum, thereby causing the routing processing time to become long in accordance with the increase in network scale, and making it difficult to obtain an output direction which can be adapted to the change in load.

The sixth embodiment is aimed at resolving the above problem. Respective threshold value elements 22 repeatedly produce outputs of "1" or "0" immediately after the start of routing for the given load conditions. Thereafter, respective threshold value elements 22 progressively provide "1" or "0" more often. Finally, the respective threshold value elements 22 become stabilized and consistently provide either "1" or "0". When the repetition of "1" or "0" continues for a relatively long period and it takes time for the output of the threshold value element to become stable, the output direction of the packet does not affect the objective function. Thus, it is not necessary to wait until the output of the threshold value elements 22 stabilize at "1" or "0". Therfore, the output links 23 corresponding to the threshold value elements 22 which produce "1" many times within a predetermined time period is determined as the output direction of the packet. Therefore, the routing processing period can be shorter than when waiting for all the threshold value elements 22 to become stable. In the above embodiment, the third term of equation (6), representing the principle concept of the evaluation function, becomes "0", namely, the output direction of the packet is determined to be only one as a result of the stabilization of the output of respective neurons. Sometimes a plurality of neuron outputs stabilizes at "1" depending on how the coefficients $C_1$ to $C_4$ of respective terms of equation (6) are selected. The present embodiment can also be used to solve such problems.

The evaluation function corresponding to the sixth embodiment is the same as equation (6) and the external input is the same as that used in equations (7) and (8).

A structural view of the node in the sixth embodiment is omitted because it is the same as in the second embodiment, namely, that obtained by excluding only control information communication unit 58 from FIG. 16, in a similar manner to the node in the fifth embodiment. The content of control table 33 is the same as that shown in FIG. 11.

Figure 31:
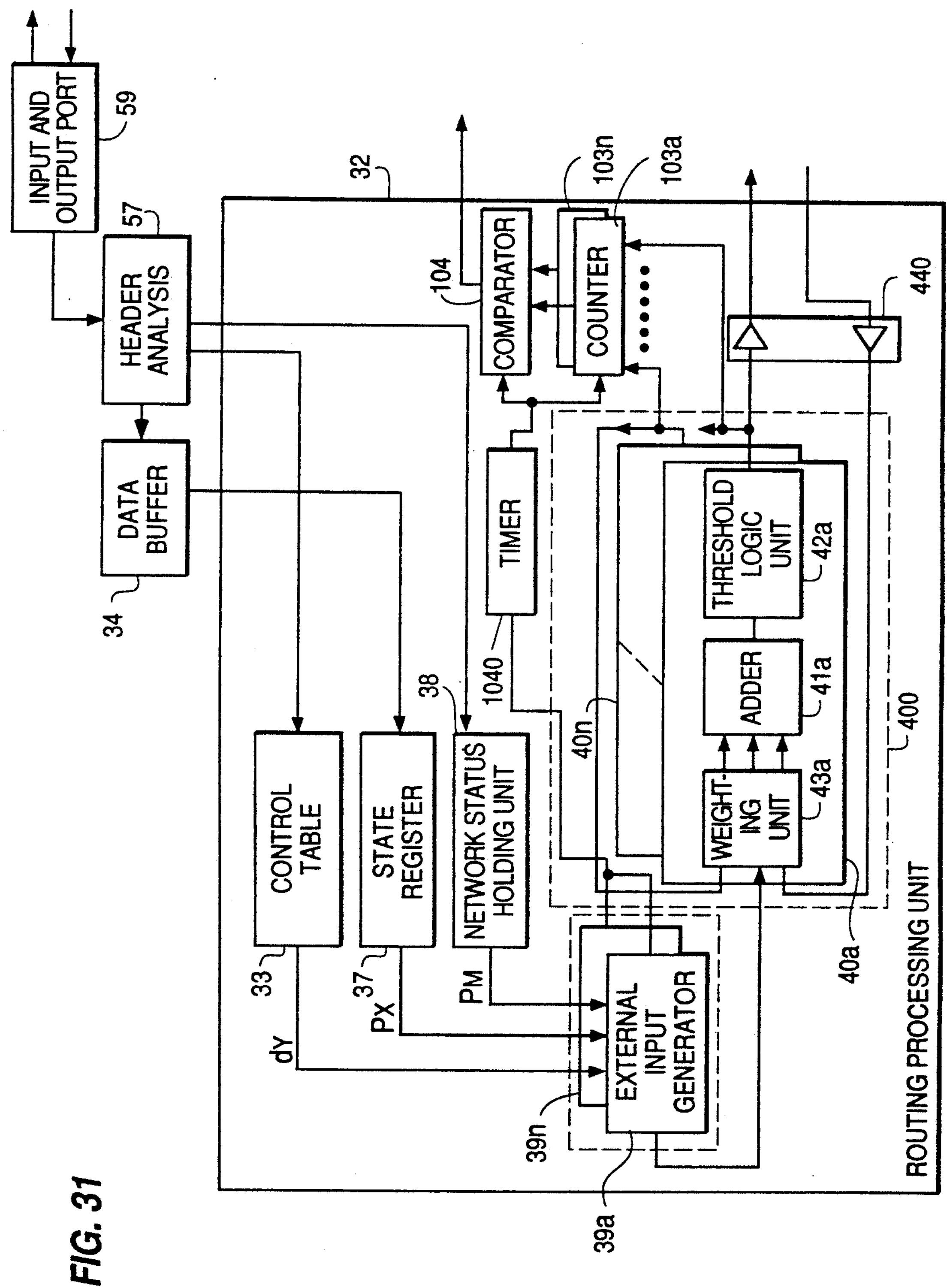
FIG. 31 shows a structure of the routing processing unit of the sixth embodiment.

FIG. 31 is a structural block diagram of the routing processing unit in the sixth embodiment. This unit has a similar structure to that of FIG. 12A, except for the following structures. Counters 103*a* to 103*n* count how many times the output of the threshold value element corresponding to the output links among neurons 40*a* to 40*n* becomes "1" Comparators 104 compare the output of these counters. When external input generators 39*a* to 39*n* output the external input to respective neurons 40*a* to 40*n*, timer 1040 is activated simultaneously with control network 25 in FIG. 30 and determines the time taken for comparators 104 to compare the count values of counters 103*a* to 103*n*.

Figure 32:
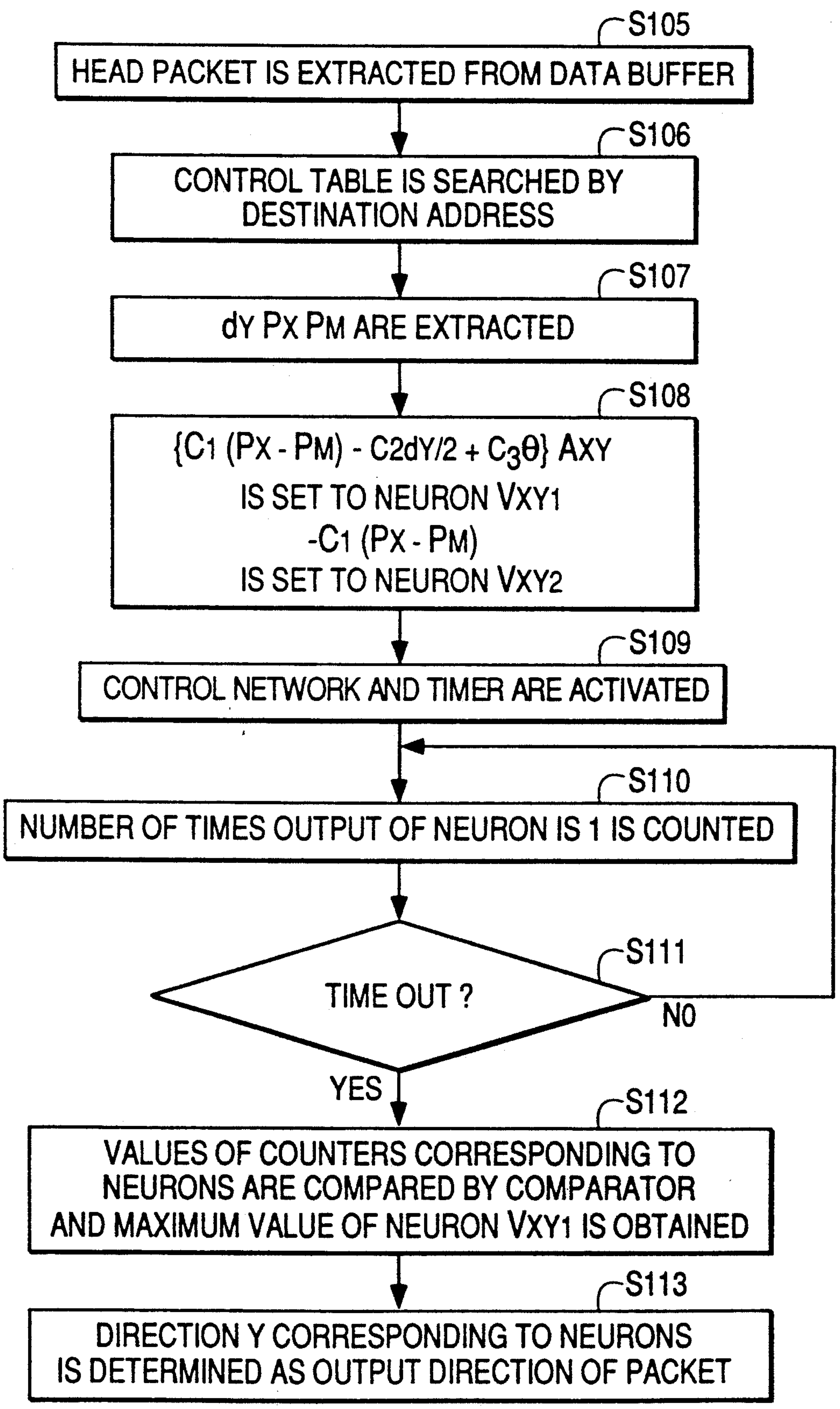
FIG. 32 shows a flowchart of the packet output operation of the node in the sixth embodiment, performed by the CPU 13

FIG. 32 is an output operation flowchart of the packet at the node in the sixth embodiment, performed by CPU 31. First, the head packet is extracted from data buffer 34 at S105 and the header is analyzed by head analysis unit 57. At S106, the number of hops through respective adjacent nodes is searched from control table 33 by using the destination information extracted by head analysis unit 57. At S107, dy is extracted from control table 33, $P_X$ from state register 37 and $P_M$ from network state holding unit 38. At S108, an external input in equations (7) and (8) is set in respective neurons. Thereafter, at S109, timer 1040 together with control network 25 of FIG. 30 are activated. At S110, the output of respective output neurons becomes "1" when timer 1040 exceeds the allowable time at S111. The values of counters 103*a* to 103*n* corresponding to respective output neurons are compared by comparator 104 and the neuron corresponding to the counter with the maximum counting value is obtained. At S113, the direction corresponding to the neurons is determined as the output direction of the packet. A mutual interaction of neurons is conducted until timer 104 is time-over at S111. The period by which the timer 1040 exceeds the allowable time can be determined not only by the time but also by the renewal number of the neuron state. That is, the period necessary to renew the neuron state is given as the sum of the neuron processing period and the signal propagation delay time for the average distance between nodes. The number of renewals of the state corresponds to the value determined one by one by the timer. In this case, when the neuron state is renewed for predetermined numbers, the counter values can be compared.

As described above, after an exchange of state is conducted between a predetermined number of neurons, the values of the counters corresponding to respective units in the nodes are compared. The output link corresponding to the neuron which produces "1" most frequently is then determined as the output direction of the packet. This direction represents how the packet to be subjected to the routing should be moved to prevent data from concentrating at the predetermined node and to enable the packet to reach the destination node most quickly.

Finally, simulation of the adaptive routing according to the present invention is explained by referring to a mesh network of, for example, four nodes,. for brief explanation. FIG. 33 shows a network state before the packet is output. The circled numeral represents the number of packets maintained by respective nodes 114 to 117 and the arrow designates the direction of the shortest path to the destination node. The right side of the drawing shows the state after the packet has been output and the number of packets at respective nodes after one packet is output in the direction shown by arrow. This is the optimum direction obtained by the result of adaptive routing.

FIG. 33A shows the case where the load is not balanced before the packet is output and FIG. 33B shows the case where the load is relatively balanced before the packet is output. In both cases, the shortest path direction is selected, thus showing that the balancing state of the load does not conflict with the selection of the shortest path. FIG. 33C shows the case where the load is unbalanced and where the packet output in the shortest path direction causes it to become further unbalanced. The simulation result shows that the packet is output in a direction which optimizes the two conflicting objects.

As described above, according to the present invention, the output directions of packets of respective nodes are independently determined autonomously and locally depending on the mutual interaction operation of the neuron provided to correspond to a link connecting the nodes, and the routing can be realized instantaneously and adaptively according to the state of the network.

Routing processing may be applied to only the head packet of a long series of data such as image data, and the delay in processing the whole network can be greatly shortened.

Even if a network fault occurs, adaptive routing can be conducted to avoid the faulty portion, thus increasing network reliability.

Further, in the packet exchange network of the virtual call method, the maximum band width used for communication at respective nodes can be made uniform by performing an adaptive routing of the set-up packet and providing a path for the virtual call which can be adapted to the network state.

The adaptive routing method for determining the evaluation function for evaluating the state of the network can be further modified. Namely, the state of the network load distribution and the distance from the packet to the destination node is not only input to the neuron as an outer input but may also be deflected on the constant used for the weighting addition thereby enabling the output direction of the packet to be conducted more adaptively when the network as a whole is busy. To increase the load distribution, the direction of the output is selected to be on the alternate path. Conversely, when the network as a whole is not busy, the shortest path to the destination node is selected. The object of the load distribution is weakened at the node near the destination node and the direction in which the packet comes closest to the destination node is selected. As the packet approaches the destination node, the constant is changed, thus drawing it toward the destination node. Thus, the packet can reach the destination node within a short period of time, thereby providing an effective adaptive routing.

Even if adaptive routing is employed, the period necessary for routing tends to be long. In accordance with the increase in the network's scale, mutual cooperation of the neuron can be cut off within a predetermined time. The output link direction corresponding to the neuron which most often produces "1" is selected. Then, irrespective of the network scale, adaptive routing can be conducted within a constant processing time, thus increasing speed. When the outputs of respective neurons are not stable, the output direction of the packet may be determined in a desired direction. As described above, the present invention makes it possible for routing of a packet to be adapted to changes in network state in a multi-media integrated network and contributes to the effective utilization of the network and high performance communication.

What is claimed is:

1. An adaptive routing system for a network using a packet exchange method for performing a communication in a packet form obtained by adding control information including address data and data length to transmission information, and connecting, by means of an input link and an output link, nodes having input ports and output ports disposed in a distributed manner, said adaptive routing system comprising:

control network means for assigning threshold logic elements one by one to the input ports and output ports of the nodes, and for mutually connecting the threshold logic elements;

external input means of a current network status for inputting information of a network status before an output of a packet to said respective threshold logic elements, said information enabling the traffic condition of the network to be evaluated after the packet output and before the respective nodes output packets; and determining means for determining the output direction of the packets from respective nodes, by enabling each said threshold logic elements to add an input from said input means to an output of an adjacent threshold element and to an output of the originating element and adjacent elements in the control network after a weighting process to produce an addition result, and by producing an output of "0" or "1" by applying a threshold logic to the addition result, said determining means repeating said addition and production, and determining the output port assigned to the threshold logic element having the output of "1" from among the threshold value element assigned to a plurality of output ports of respective nodes in a balanced state in which the outputs of respective threshold logic elements are not changed, as being in the output direction of the packet from respective nodes.

2. The adaptive routing system according to claim 1 wherein neurons are respectively assigned to each of the input and output ports of said nodes as a threshold logic element, said neurons being mutually connected to provide a neural network as a logical control network.

3. The adaptive routing method according to claim 1 wherein said external input means is provided at the nodes and inputs the number of packets at the originating node, the average number of packets at respective nodes in the network and the number of relay links from the originating node to the destination node of the packet, through respective adjacent nodes, as the information of the external input of current network status, said information enabling the traffic condition of the network after the output of the packet to be evaluated before the packet is output to respective nodes.

4. The adaptive routing method according to claim 1 wherein the sum of the products of the outputs from the originating element and from the adjacent threshold elements, and the weighting coefficients for said respective outputs is compared with a reference value, with "1" being produced if it is larger than the reference value and "0" being produced if it is smaller than the reference value.

5. The adaptive routing system according to claim 1 in which the external input means produces the output as an external input of an external stimulus to said respective threshold value elements.

6. The adaptive routing system according to claim 1 wherein said respective threshold logic elements repeat an operation in which the addition result of said weighting means is subjected to a threshold logic, thereby providing a "0" or "1" output, and wherein said balanced state in which the outputs of respective threshold value elements do not change complies with the state in which the energy function of the control network is minimized.

7. The adaptive routing system according to claim 1 wherein the energy function in the network corresponds to the objective function including the sum of the term expressing the distribution of the load in the whole network which uses said packet exchange method and the term representing the total distance to the destination node of the packet to be subjected to routing in the network.

8. The adaptive routing method according to claim 4 wherein a weighting coefficient to be multiplied by each of the outputs of the originating threshold element and adjacent threshold elements in the control network is determined, as a constant.

9. An adaptive routing system for a network using a packet exchange method for performing a communication in a packet form obtained by adding control information including address data and data length to transmission information, and connecting, by means of an input link and an output link, a plurality of nodes having input ports and output ports disposed in a distributed manner, said adaptive routing system comprising:

control network means for assigning threshold logic elements one by one to the input ports and output ports of the nodes, and for mutually connecting the threshold logic elements;

means for communicating the number of transmitting packets of serial data with the total number of packets added to a head packet among adjacent nodes selected from all the packets in the network, when the packets are transmitted from the originating node to adjacent nodes;

external input means of a current network status for inputting a network status information before an output of a packet to said threshold logic elements, said network status information enabling the traffic condition of said network after the output of all the packets to be evaluated before respective nodes output all the packets of series data, and determining means for determining the output direction of the packets from respective nodes, by enabling each said threshold logic elements to add an input from said input means to an output of an adjacent threshold element and to an output of the originating element and adjacent elements in the control network after a weighting process to produce an addition result, and by producing an output of "0" or "1" by applying a threshold logic to the addition result, said determining means repeating said addition and production, and determining the output port assigned to the threshold logic element having the output of "1" from among the threshold value elements assigned to a plurality of output ports of respective nodes in a balanced state in which the outputs of respective threshold logic elements are not changed, as being in the output direction of the packet from respective nodes.

10. The adaptive routing system according to claim 9 wherein neurons are respectively assigned to each of the input and output ports of said nodes as a threshold logic element, said neurons being mutually connected to provide a neural network as a logical control network.

11. The adaptive routing system according to claim 9 wherein said external input means is provided at the nodes, and inputs the number of packets at the originating node, the average number of packets at respective nodes in the network, the number of packets of serial data subjected to a routing in the originating node, the number of packets subjected to a routing at respective adjacent nodes in said network and the number of relay links from the originating node to the destination node of the packet, through respective adjacent nodes, as the information of the external input of current network status, said information enabling the traffic condition of the network after the output of the packet to be evaluated before all the packets is output to respective nodes.

12. The adaptive routing system according to claim 9 wherein the sum of the products of the outputs from the originating element and from the adjacent threshold elements, and the weighting coefficients for said respective outputs is compared with a reference value, with "1" being produced if it is larger than the reference value and "0" being produced if it is smaller than the reference value.

13. The adaptive routing method according to claim 9 in which the external input means produces the output as an external input of an external stimulus to said respective threshold value elements.

14. The adaptive routing system according to claim 9 wherein said respective threshold logic elements repeat an operation in which the addition result of said weighting means is subjected to a threshold logic, thereby providing a "0" or "1" output, and wherein said balanced state in which the outputs of respective threshold value elements do not change complies with the state in which the energy function of the control network is minimized.

15. The adaptive routing system according to claim 9 wherein the energy function in the network corresponds to the objective function including the sum of the term expressing the distribution of the load in the whole network which uses said packet exchange method and the term representing the total distance to the destination node of the packet to be subjected to routing in the network.

16. The adaptive routing system according to claim 12, wherein a weighting coefficient to be multiplied by the outputs of the originating threshold logic element and adjacent threshold value elements is a function of the number of packets of serial data to be subjected to routing at the originating node and of the number of packets to be subjected to routing at adjacent nodes.

17. An adaptive routing system for a network using a packet exchange method for performing a communication in a packet form obtained by adding control information including address data and data length to transmission information, and connecting, by means of an input link and an output link, a plurality of nodes having input ports and output ports disposed in a distributed manner, said adaptive routing system comprising:

control network means for assigning threshold logic elements one by one to the input ports and output ports of the nodes, and for mutually connecting the threshold logic elements;

fault detection means for detecting a fault in any one of a plurality of adjacent nodes adjacent to the originating node and input link and output links connecting the originating node and adjacent nodes and fixing to be "0" both an input value to the threshold logic element corresponding to the input link from the direction of the fault occurrence portion and an output value of the threshold logic element corresponding to the output link toward said direction, in order to realize the routing of the packet to prevent the portion of the fault occurrence during the period from the occurrence of the fault to the recovery of the fault, external input means of a current network status for inputting information of a network status before an output of a packet to said respective threshold logic elements, said information enabling the traffic condition of the network to be evaluated after the packet output and before the respective nodes output packets; and determining means for, under the operation of said fault detecting means, determining the output direction of the packets from respective nodes, by enabling each said threshold logic elements of add an input from said input means to an output of an adjacent threshold element and to an output of the originating element and adjacent elements in the control network after a weighting process, and by producing an output of "0" or "1" by applying a threshold logic to the addition result, said determining means determining after repeating said addition and production the output prot assigned to the threshold logic element having the output of "1" from among the threshold value elements assigned to a plurality of output ports of respective nodes in a balanced state in which the outputs of respective threshold logic elements are not changed, as being in the output direction of the packet from respective nodes.

18. The adaptive routing system according to claim 17, wherein neurons are respectively assigned to each of the input and output ports of said nodes as a threshold logic element, said neurons being mutually connected to provide a neural network as a logical control network.

19. The adaptive routing system according to claim 17, wherein said external input means is provided at the nodes and inputs the number of packets at the originating node, the average number of packets at respective nodes in the network and the number of relay links from the originating node to the destination node of the packet through respective adjacent nodes, as the information of the external input of current network status, said information enabling the traffic condition of the network after the output of the packet to be evaluated before the packet is output to respective nodes.

20. The adaptive routing system according to claim 17, wherein the sum of the products of the outputs from the originating element and from the adjacent threshold elements, and the weighting coefficients for said respective outputs is compared with a reference value, with "1" being produced if it is larger than the reference value and "0" being produced if it is smaller than the reference value.

21. The adaptive routing system according to claim 17, in which the external input means produces the output as an external input of an external stimulus to said respective threshold value elements.

22. The adaptive routing system according to claim 17, wherein said respective threshold logic elements repeat an operation in which the addition result of said weighting means is subjected to a threshold logic, thereby providing a "0" or "1" output, and wherein said balanced state in which the outputs of respective threshold value elements do not change complies with he state in which the energy function of the control network is minimized.

23. The adaptive routing system according to claim 17, wherein the energy function in the network corresponds to the objective function including the sum of the term expressing the distribution of the load in the whole network which uses said packet exchange method and the term representing the total distance to the destination node of the packet to be subjected to routing in the network.

24. The adaptive routing system according to claim 20, wherein a weighting coefficient to be multiplied by each of the outputs of the originating threshold element and adjacent threshold elements in the control network is determined, as a constant.

25. An adaptive routing system for a network using a packet exchange method for performing a communication in a packet form obtained by adding control information including address data and data length to transmission information, and connecting, by means of an input link and an output link, a plurality of nodes having input ports and output ports disposed in a distributed manner, said adaptive routing system comprising:

control network means for assigning threshold logic elements one by one to the input ports and output ports of the nodes, and for mutually connecting the threshold logic elements;

a bandwidth communicating means for communicating information representing the maximum bandwidth used for a virtual call communication, said bandwidth communicating means being added to the packet setting-up the virtual call to be outputted from the originating node, between adjacent nodes selected from among a plurality of nodes constituting the network, external input means for inputting information of a network status before outputting a packet setting-up the virtual call to said respective threshold elements for enabling the traffic condition of the network to be evaluated after the packet output, before respective nodes output a packet setting-up the virtual call, said input means being provide for respective nodes, determining means for determining the output direction of the packets from respective nodes, by enabling each said threshold logic elements to add an input from said input means to an output of an adjacent threshold element and to an output of the originating element and adjacent elements in the control network after a weighting process, and by producing an output of "0" or "1" by applying a threshold logic to the addition result, said determining means repeating said addition and production, and determining the output port assigned to the threshold logic element having the output of "1" from among the threshold value elements assigned to a plurality of output ports of respective nodes in a balanced state in which the outputs of respective threshold logic elements are not changed, as being in the output direction of the packet from respective nodes.

26. A virtual call setting-up packet network routing system which uses a packet exchange method to communicate a packet format by adding control information including address data and the data length to communication information and by connecting nodes to an input link and output link, comprising:

maximum bandwidth communicating means for communicating information representing the maximum bandwidth used for a virtual communication and added to a packet for setting up a virtual call to be output from the originating node, between respective adjacent nodes among a plurality of nodes constituting the network, and means for determining the output link in the output direction of the call setting-up packet from the originating nodes by using information representing the maximum bandwidth added to a setting-up packet subjected to a routing at adjacent nodes and received from the maximum bandwidth communicating means of a plurality of adjacent nodes.

27. The routing system according to claim 25, wherein neurons are respectively assigned to each of the input and output ports of said nodes as a threshold logic element, said neurons being mutually connected to provide a neural network as a logical control network.

28. The adaptive routing system according to claim 25, wherein the nodes are provided with an external input of current network status state input means for inputting to said respective threshold value elements, the sum of the maximum bandwidth assigned to the virtual call at the originating node, the average of the sum of the maximum bandwidth assigned to the virtual call at respective nodes of the network, the number of relay links from the originating node to the destination node through adjacent nodes, and the maximum bandwidth assigned to the call setting-up packet subjected to a routing at adjacent nodes, as information of the network state before the output of the call setting-up packet for evaluating the traffic condition of the network after the output of the call setting-up packet, before the respective node produces respective call setting-up packets, and said external input of current network status input means.

29. The adaptive routing system according to claim 25, wherein the sum of the products of the outputs from the originating element and respective adjacent threshold elements and the constant for said respective outputs is added to an external input, and the result obtained by the addition is compared with a reference value, and "1" is produced if it is larger than the reference value and "0" is produced if it is smaller than the reference value.

30. The adaptive routing system according to claim 25 wherein the input means for inputting the network state before the signal is output, produces the output as the external input to said respective threshold value elements.

31. The adaptive routing system according to claim 25, wherein said respective threshold value elements repeat an operation in which the addition result of said weighting means is subjected to threshold processing, thereby providing a "0" or "1" output, and the balanced state in which the outputs of respective threshold value elements do not change complies with the state in which the energy function of the control network is minimized.

32. The adaptive routing system according to claim 25 wherein the energy function in the network using the packet exchange method is identical to an objective function including a sum of the term representing a distribution of a sum of the maximum bandwidth throughout the whole network and the term representing the sum of the distances to the destination node of the call setting-up packet which is subjected to a routing in the network.

33. The adaptive routing system according to claim 29, wherein the constant to be multiplied by the output of the originating threshold elements and respective adjacent threshold elements in the control network is a function of the maximum bandwidth assigned to a call setting-up packet which is subjected to a routing in the adjacent node.

34. An adaptive network routing system which uses a packet exchange method to perform a communication in packet form by adding control information including address data and data length to the transmission information by connecting a plurality of nodes with a plurality of input ports and output ports distributed by the input link and output link, comprising means for enabling logic control network means to assign threshold value elements one by one to input ports and output ports of respective nodes and for mutually connecting the threshold value element, means for inputting a network state before outputting to said respective threshold elements, said information of the network's state before the output of the packet enabling the traffic condition of the network after the packet is output to be evaluated, before the respective nodes output respective packets, said input means being provided for respective nodes, weighting constant changing means for modifying the constant according to the network's state and the distance to the destination node when said respective threshold value elements add an input from the external input of current network status state input means to an output from the originating threshold value element and adjacent threshold value element on the control network after a weighting processing, and means for determining the output direction of the packet of the respective nodes by repeating the operation in which respective threshold value elements perform a threshold value processing of the result of the weighting addition to provide the output "0" or "1" and by using the output ports to which the threshold value element with the output "1", from among a plurality of threshold value elements is assigned when the output of the respective threshold value does not change to provide a balanced state.

35. The adaptive routing system according to claim 34, wherein a neuron is assigned to each of the input and output ports of said respective nodes as a threshold value element and each said neuron is mutually connected to provide a logical control network.

36. The adaptive routing system according to claim 34, wherein said external input of said current network status state input means inputs to the threshold value elements, the number of packets at the originating node, the average number of packets at respective nodes in the network, the number of relay links from the originating node to the destination nodes through respective adjacent nodes, and the sum of said respective relay links, as the information of external input of current network status state for evaluating the traffic condition of the network after the packet is output, before the respective nodes produce respective packets, and said external input of current network status state input means are provided with regard to respective nodes.

37. The adaptive routing system according to claim 34, wherein the sum of the products of the outputs from the originating element and the adjacent threshold elements, and the constant for said respective outputs is added to an external input, and the result obtained by the addition is compared with a reference value, and "1" is produced if it is larger than the reference value and "0" is produced if it is smaller than the reference value.

38. The adaptive routing system according to claim 34 wherein, a weighting constant changing means is further provided to change the constant to be multiplied by the outputs of the originating threshold element and the adjacent threshold elements in the network, in accordance with the average number of packets at respective nodes in the network and the sum of the relay links from the originating node to the destination node through adjacent nodes, where said respective threshold element adds the input from said external input of current network status state input means to the outputs of the originating threshold element and adjacent respective threshold elements in the network through the weighting processing.

39. The adaptive routing system according to claim 34 wherein the input means for inputting the network state before the signal is output, produces the output as the external input to said respective threshold value elements.

40. The adaptive routing system according to claim 34, wherein said respective threshold value elements repeat an operation in which the addition result of said weighting means is subjected to threshold processing, thereby providing a "0" or "1" output, and the balanced state in which the outputs of respective threshold value elements do not change complies with the state in which the energy function of the control network is minimized.

41. The adaptive routing system according to claim 34 wherein the energy function in the network corresponds to the objective function including the sum of the term expressing the distribution of the load in the whole network which uses said packet exchange method and the term representing the total of the distance to the destination node of the packet to be subjected to routing in the network.

42. An adaptive network routing system which uses a packet exchange method to perform a communication in packet form by adding control information including address data and data links to the transmission information by connecting a plurality of nodes with a plurality of input ports and output ports distributed by the input link and output link, said adaptive routing network comprising:

means for enabling the control network means to assign threshold value elements one by one to the input ports and output ports of the nodes and mutually connecting the threshold value element, means for inputting a network state before outputting to said respective threshold elements, said information of the network's state before the packet is output, enabling the traffic condition of the network after the packet is output to be evaluated before the respective nodes output respective packets, said input means being provided for respective nodes, means for counting how many times the output of respective threshold elements assigned to each of a plurality of output ports at respective nodes becomes "1", by repeating the operation in which said threshold value element adds an input from said input means to an output of the adjacent threshold value element in the control network and an output of the originating element after a weighting processing to produce an addition result, and produces the output of "0" or "1" after applying a threshold processing to the addition result, and means for determining the output direction of the packet using the output port of the threshold value element, the output from which becomes "1" most often within a predetermined time.

43. The adaptive routing system according to claim 42, wherein a neuron is assigned to each of the input and output ports of said respective nodes as a threshold value element and each said neuron is mutually connected to provide a logical control network.

44. The adaptive routing system according to claim 42, wherein said input means for inputting the state of the network before the signal is output, inputs the number of packets at the originating node, the average number of packets at respective nodes in the network and the number of packets in all nodes in the network based on a number of really links from the originating node to the destination node of the packet through respective adjacent nodes, as the information of the external input of current network status state, which is capable of evaluating the traffic condition of the network after the output of the packet, before the packet is output to respective nodes, and said input means is provided at respective nodes.

45. The adaptive routing system according to claim 42, wherein the sum of the products of the outputs from the originating element and the adjacent threshold elements and the constant for said respective outputs is added to an external input, and the result obtained by the addition is compared with a reference value, and "1" is produced if it is larger than the reference value and "0" is produced if it is smaller than the reference value.

46. The adaptive routing system according to claim 42 wherein the input means for inputting the network state before the signal is output, produces the output as the external input to said respective threshold value elements.

47. The adaptive routing system according to claim 42, wherein the energy function in the network complies with the objective function including the sum of the term expressing the distribution of the load in the whole network which uses said packet exchange method and the term representing the total of the distance to the destination node of the packet to be subjected to routing in the network.

48. The adaptive routing system according to claim 45, wherein a weighting coefficients to be multiplied by the output of the originating threshold element and the outputs of adjacent threshold elements in the control network are determined.

49. The adaptive routing system according to claim 42, wherein the respective threshold value elements repeat, predetermined times, an operation of performing a threshold processing of the result of said weighting and addition, thereby producing the outputs "0" and "1" and the output port to which the threshold value element producing the "1" output most often within said predetermined times, is assigned, is selected from a plurality of output ports of a plurality of nodes and determined as to be in the direction in which the packet is produced from each of the respective nodes.

50. An adaptive routing system, comprising:

a communication network having nodes and links for connecting the nodes; and a control network for mutually connecting neurons corresponding to a number of links connected to said nodes in respective nodes of said communication network, thereby connecting outputs of neurons in adjacent nodes in said communication network to inputs of respective neurons in said control network and thus forming a neural network by means of said communication network and control network.

51. The adaptive routing system according to claim 50, wherein an energy function of said neural network is an objective function for expressing a traffic status of the communication network to search on the neural network the balanced status in which said energy function is minimized and to determine the optimum route based on the status of the output value of the neuron in said balanced status.

52. The adaptive routing system according to claim 51, wherein said objective function comprises:

a first term for representing a distribution of a load on the entire network the difference between the number of packets at respective nodes obtained resulting from movement of a single packet from respective nodes to their adjacent nodes and the average value of the number of packets which respective nodes have in the network, a second term for representing a sum of distances for a moving packet to reach a target node, a third term for designating that the packet is not transmitted to any adjacent nodes when the packet does not exist in respective nodes, and a fourth term for representing that a transmission of the packets from respective nodes to the adjacent nodes complies with a receipt of the packets from respective nodes by the adjacent nodes.

53. The adaptive routing system according to claim 4 in which the external input means produces the output as an external input of an external stimulus to said respective threshold value elements.

54. The adaptive routing system according to claim 6 wherein:

the energy function in the network corresponds to the objective function including the sum of the term expressing the distribution of the load in the whole network which uses said packet exchange method and the term representing the total distance to the destination node of the packet to be subjected to routing in the network.

55. The adaptive routing system according to claim 12 in which the external input means produces the output as an external input of an external stimulus to said respective threshold value elements.

56. The adaptive routing system according to claim 14 wherein:

the energy function in the network corresponds to the objective function including the sum of the term expressing the distribution of the load in the whole network which uses said packet exchange method and the term representing the total distance to the destination node of the packet to be subjected to routing in the network.

57. The adaptive routing system according to claim 20 in which the external input means produces the output as an external input of an external stimulus to said respective threshold value elements.

58. The adaptive routing system according to claim 22 wherein:

the energy function in the network corresponds to the objective function including the sum of the term expressing the distribution of the load in the whole network which uses said packet exchange method and the term representing the total distance to the destination node of the packet to be subjected to routing in the network.

59. The adaptive routing system according to claim 29 wherein:

the input means for inputting the network state before the signal is output, produces the output as the external input to said respective threshold value elements.

60. The adaptive routing system according to claim 31 wherein:

the energy function in the network using the packet exchange method is identical to an objective function including a sum of the term representing a distribution of a sum of the maximum bandwidth throughout the whole network and the term representing the sum of the distance to the destination node of the call setting-up packet which is subjected to a routing in the network.

61. The adaptive routing system according to claim 37, wherein:

a weighting constant changing means is further provided to change the constant to be multiplied by the outputs of the originating threshold element and the adjacent threshold elements in the network, in accordance with the average number of packets at respective nodes in the network and the sum of the relay links from the originating node to the destination node through adjacent nodes, where said respective threshold element adds the input from said external input of current network status state input means to the outputs of the originating threshold element and adjacent respective threshold elements in the network through the weighting processing.

62. The adaptive routing system according to claim 37, wherein:

the input means for inputting the network state before the signal is output, produces the output as the external input to said respective threshold value elements.

63. The adaptive routing system according to claim 40 wherein:

the energy function in the network corresponds to the objective function including a sum of the term expressing the distribution of the load in the whole network which uses said packet exchange method and the term representing the total of the distance to the destination node of the packet to be subjected to routing in the network.

64. The adaptive routing system according to claim 45, wherein:

the input means for inputting the network state before the signal is output, produces the output as the external input to said respective threshold value elements.

* * * * *